(12) United States Patent
Choi et al.

(10) Patent No.: US 11,350,101 B2
(45) Date of Patent: May 31, 2022

(54) IMAGE DECODING METHOD USING RESIDUAL INFORMATION IN IMAGE CODING SYSTEM, AND DEVICE FOR SAME

(71) Applicant: LG Electronics Inc., Seoul (KR)

(72) Inventors: Jungah Choi, Seoul (KR); Jaehyun Lim, Seoul (KR); Jin Heo, Seoul (KR); Sunmi Yoo, Seoul (KR); Ling Li, Seoul (KR); Jangwon Choi, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/373,114

(22) Filed: Jul. 12, 2021

(65) Prior Publication Data

US 2021/0409716 A1 Dec. 30, 2021

Related U.S. Application Data

(63) Continuation of application No. PCT/KR2020/000621, filed on Jan. 13, 2020.
(Continued)

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11);
(Continued)

(58) Field of Classification Search
CPC .. H04N 19/132; H04N 19/105; H04N 19/176; H04N 19/18; H04N 19/46; H04N 19/70; H04N 19/88
See application file for complete search history.

(56) References Cited

U.S. PATENT DOCUMENTS

2013/0177069 A1 7/2013 Sze et al.
2013/0343448 A1 12/2013 He et al.

FOREIGN PATENT DOCUMENTS

KR 10-2015-003 9721 4/2015
KR 10-2018-0074773 7/2018
WO WO2020141856 7/2020

OTHER PUBLICATIONS

Schwarz et al., "CE7: Transform coefficient coding with reduced number of regular-coded bins (tests 7.1.3a, 7.1.3b)," Presented at Joint Video Experts Team (JVET) of ITU-T SG 16 WP 3 and ISO/IEC JTC 1/SC 29/WG 11, 12th Meeting: Macao, CN, Oct. 3-12, 2018, 19 pages.

(Continued)

*Primary Examiner* — Jae N Noh
(74) *Attorney, Agent, or Firm* — Fish & Richardson P.C.

(57) ABSTRACT

An image decoding method performed by a decoding device, according to the present document, comprises the steps of: receiving a bitstream including residual information of a current block; deriving a specific number of context-encoding bins for context syntax elements for a current sub-block of the current block; decoding the context syntax elements for the current sub-block included in the residual information on the basis of the specific number; deriving transform coefficients for the current sub-block on the basis of the decoded context syntax elements; deriving residual samples for the current block on the basis of the transform coefficients; and generating a reconstructed picture on the basis of the residual samples.

15 Claims, 23 Drawing Sheets

Related U.S. Application Data

(60) Provisional application No. 62/791,747, filed on Jan. 12, 2019.

(51) Int. Cl.
    *H04N 19/88*       (2014.01)
    *H04N 19/176*     (2014.01)
    *H04N 19/70*       (2014.01)
    *H04N 19/18*       (2014.01)
    *H04N 19/46*       (2014.01)

(52) U.S. Cl.
    CPC .............. *H04N 19/18* (2014.11); *H04N 19/46* (2014.11); *H04N 19/70* (2014.11); *H04N 19/88* (2014.11)

(56) References Cited

OTHER PUBLICATIONS

Bross et al., "Non-CE8: Unified Transform Type Signalling and Residual Coding for Transform Skip," JVET-M0464-v2, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 13 pages.

Extended European Search Report in European Appln. No. 20738668.1, dated Jan. 28, 2022, 12 pages.

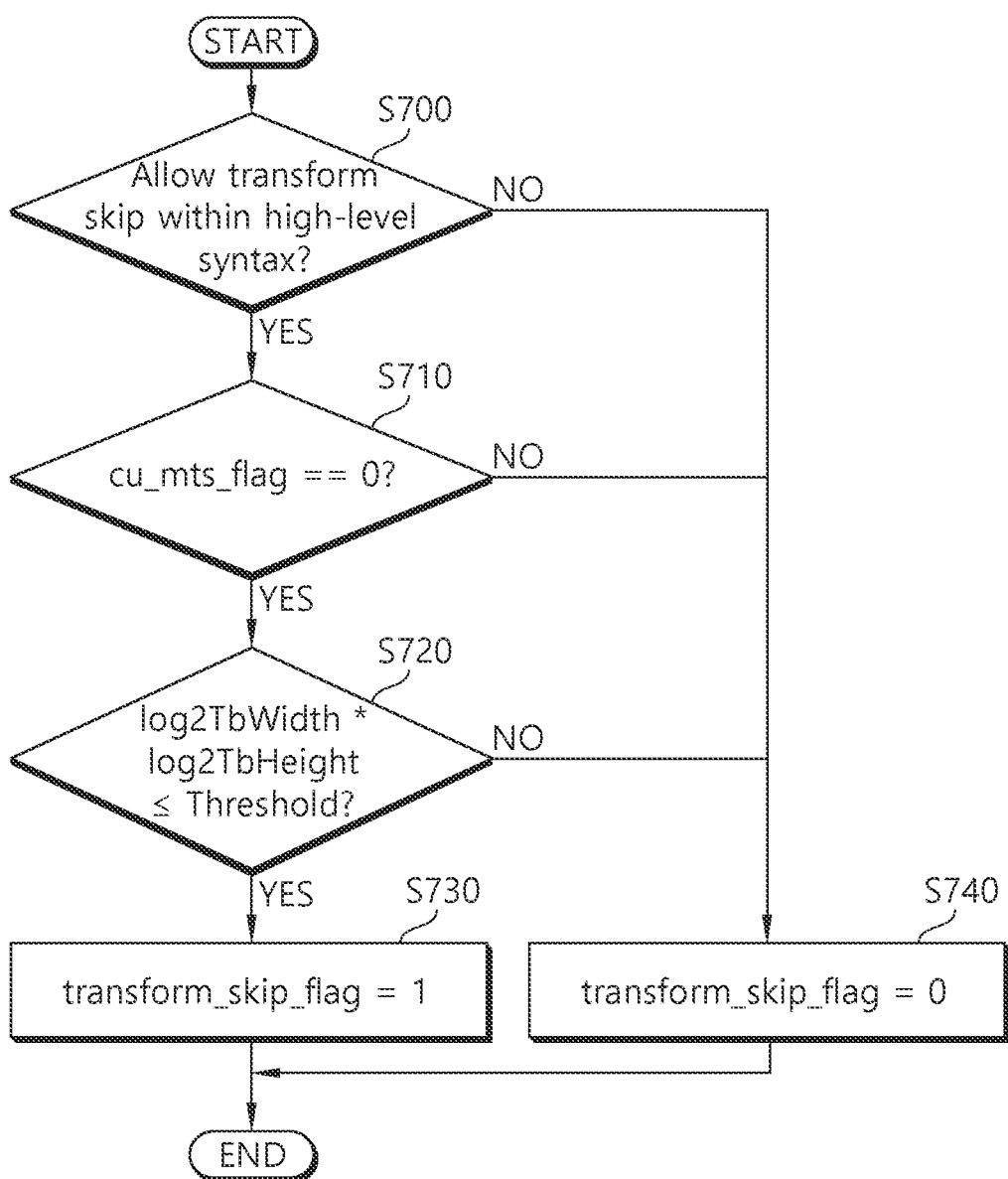

(a)

(b)

(a)

(b)

(a)

(b)

(a)

(b)

(a)

(b)

IMAGE DECODING METHOD USING RESIDUAL INFORMATION IN IMAGE CODING SYSTEM, AND DEVICE FOR SAME

CROSS-REFERENCE TO RELATED APPLICATIONS

Pursuant to 35 U.S.C. § 119(e), this application is a continuation of International Application PCT/KR2020/000621, with an international filing date of Jan. 13, 2020, which claims the benefit of U.S. Provisional Patent Application No. 62/791,747, filed on Jan. 12, 2019, the contents of which are hereby incorporated by reference herein in their entirety.

BACKGROUND OF THE DISCLOSURE

Field of the Disclosure

The present disclosure relates to an image coding technology, and more particularly, to an image decoding method for coding residual information including syntax elements for transform coefficients of residuals in an image coding system, and an apparatus thereof.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for increasing image coding efficiency.

The present disclosure also provides a method and apparatus for increasing efficiency of residual coding.

The present disclosure also provides a method and apparatus for determining and adjusting the sum of the number of context-coded bins for context syntax elements in adjusting the number of context-coded bins for a current sub-block in coding residual information.

In an aspect, an image decoding method performed by a decoding apparatus is provided. The method includes: receiving a bitstream including residual information of a current block; deriving a specific number of context-coded bins for context syntax elements for a current sub-block of the current block; decoding the context syntax elements for the current sub-block included in the residual information based on the specific number; deriving transform coefficients for the current sub-block based on the decoded context syntax elements; deriving residual samples for the current block based on the transform coefficients; and generating a reconstructed picture based on the residual samples, wherein when a number of context coded bins for context syntax elements of transform coefficients derived before a specific transform coefficient of the current sub-block reaches the specific number, a bypass syntax element for the specific transform coefficient included in the residual information is decoded.

In another aspect, a decoding apparatus for performing image decoding is provided. The decoding apparatus includes: an entropy decoder configured to receive a bitstream including residual information of a current block, to derive a specific number of context-coded bins for context syntax elements for a current sub-block of the current block, to decode the context syntax elements for the current sub-block included in the residual information based on the specific number, and to derive transform coefficients for the current sub-block based on the decoded context syntax elements; an inverse-transformer configured to derive residual samples for the current block based on the transform coefficients, and an adder configured to generating a reconstructed picture based on the residual samples for the current block, wherein when a number of context coded bins for context syntax elements of transform coefficients derived before a specific transform coefficient of the current sub-block reaches the specific number, a bypass syntax element for the specific transform coefficient included in the residual information is decoded.

In another aspect, an image encoding method performed by an encoding apparatus is provided. The method includes: deriving residual samples for a current block; deriving transform coefficients in a current sub-block of the current block based on the residual samples; deriving a specific number of context-coded bins for context syntax elements for the current sub-block; encoding the context syntax elements based on the specific number; and generating a bitstream including residual information for the current block including the encoded context syntax elements, wherein when a number of context coded bins for context syntax elements of transform coefficients derived before a specific transform coefficient of the current sub-block reaches the specific number, a bypass syntax element for the specific transform coefficient included in the residual information is encoded.

In another aspect, a video encoding apparatus is provided. The encoding apparatus includes: a subtractor configured to derive residual samples for a current block; a transformer configured to derive transform coefficients in a current sub-block of the current block based on the residual samples; an entropy encoder configured to derive a specific number of context-coded bins for context syntax elements for the current sub-block, to encode the context syntax elements based on the specific number, and to generate a bitstream including residual information for the current block including the encoded context syntax elements, wherein when a number of context coded bins for context syntax elements of transform coefficients derived before a specific transform coefficient of the current sub-block reaches the specific number, a bypass syntax element for the specific transform coefficient included in the residual information is encoded.

Effects of the Disclosure

According to this document, overall image/video compression efficiency may be improved.

According to this document, efficiency of residual coding may be increased.

According to this document, context-based coded data may be reduced by limiting the sum of the number of context-coded bins of context syntax elements with respect to transform coefficients in the current block included in residual information to a predetermined maximum value or less.

According to this document, in adjusting the number of context-coded bins for the current sub-block, instead of determining for each context syntax element coding, the sum of the number of context-coded bins of context syntax elements is determined, whereby residual coding complexity may be reduced and overall coding efficiency may be improved.

BRIEF DESCRIPTION OF THE DRAWINGS

FIGS. 7a and 7b illustrate an embodiment for determining whether to parse a transform skip flag based on the number of samples of a current block and a decoding apparatus performing the embodiment.

DESCRIPTION OF EXEMPLARY EMBODIMENTS

Figure 1:
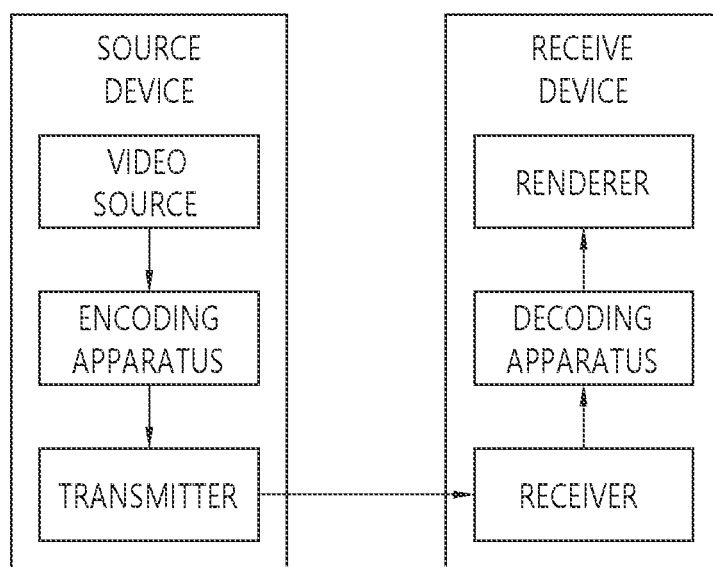
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
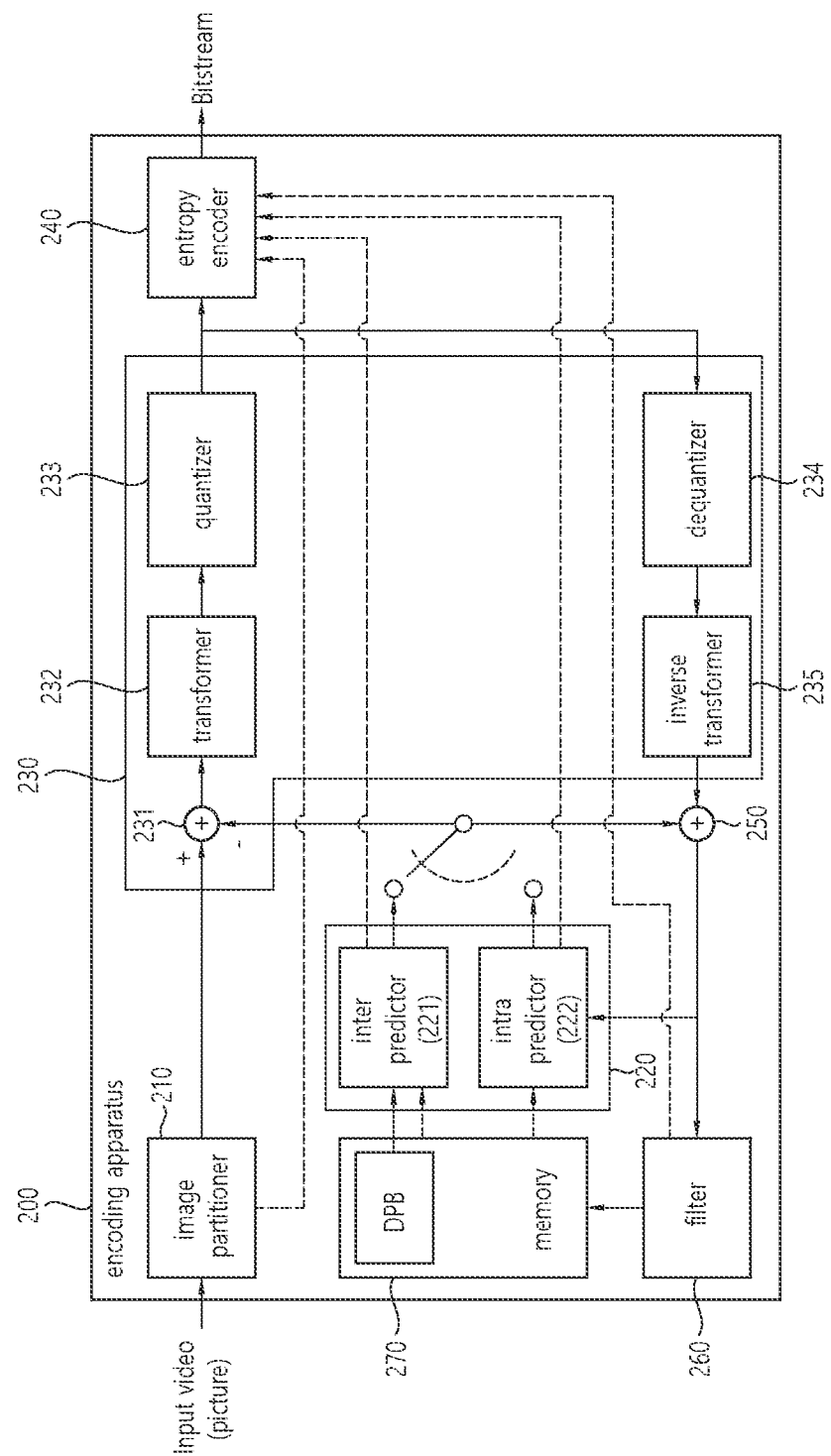
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
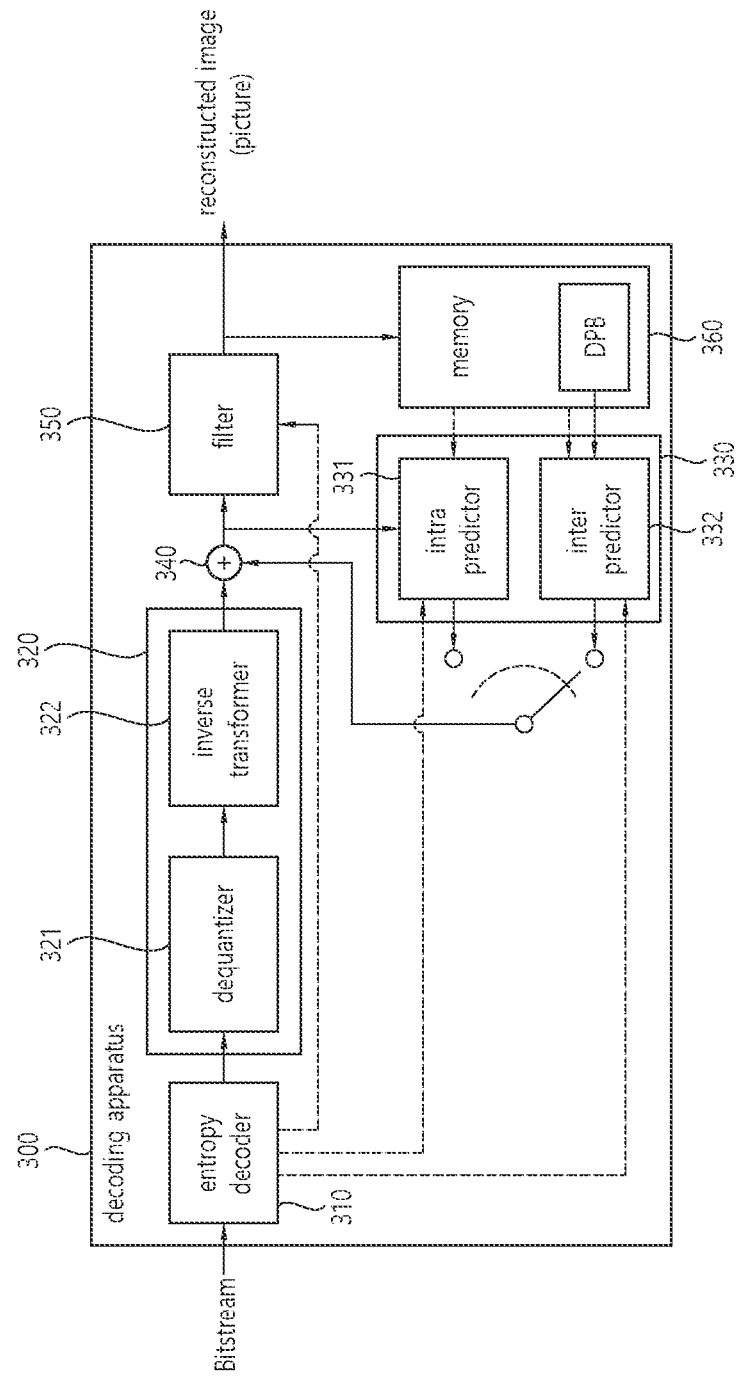
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 4:
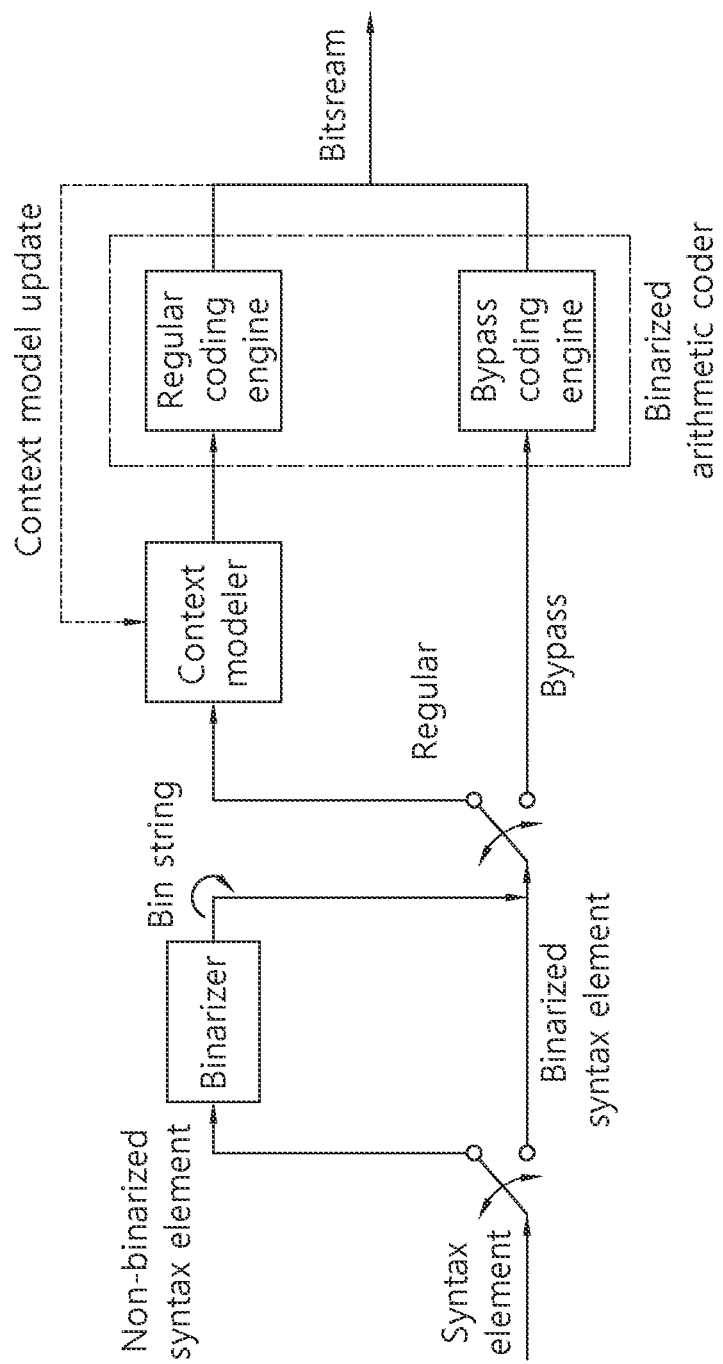
FIG. 4 exemplarily shows context-adaptive binary arithmetic coding (CABAC) for encoding a syntax element.

FIG. 4 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

For example, the (quantized) transformation coefficients (i.e., the residual information) may be encoded and/or decoded based on syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag1, abs_remainder, coeff_sign_flag, dec_abs_level, mts_idx. Syntax elements related to residual data encoding/decoding may be represented as shown in the following table.

TABLE 1

| | Descriptor |
|---|---|
| residual coding( x0, y0, log2TbWidth, log2TbHeight, cIdx ) { | |
|   if( transform_skip_enabled_flag && ( cIdx != 0 \| !tu_mts_flag[ x0 ][ y0 ] = = 0 ) && | |
|     ( log2TbWidth <= 2 ) && ( log2TbHeight {= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3) | |
|     last_sig_coeff_x_suffix | ae(v) |
|   if( last_sig_coeff_y_prefix > 3) | |
|     last_sig_coeff_y_suffix | ae(v) |
|   log2SbSize = ( Min( log2TbWidth, log2TbHeight ) <2 ? 1 : 2) | |
|   numSbCoeff =1 <<( log2SbSize <<1) | |
|   lastScanPos = numSbCoeff | |
|   lastSubBlock = ( 1 << ( log2TbWidth + log2TbHeight − 2 * log2SbSize ) ) − 1 | |
|   do { | |
|     if( lastScanPos = =0 ) { | |
|       lastScanPos = numSbCoeff | |
|       lastSubBlock − − | |
|     } | |
|     lastScanPos − − | |
|     xS = DiagScanOrder[ log2TbWidth − log2SbSize ][ log2TbHeight − log2SbSize ] | |
|       [ lastSubBlock ][ 0 ] | |
|     yS = DiagScanOrder[ log2TbWidth − log2SbSize ][ log2TbHeight − log2SbSize ] | |
|       [ lastSubBlock ][ 1 ] | |
|     xC = ( xS << log2SbSize ) + | |
|       DiagScanOrder[ log2SbSize ][ log2SbSize ][ lastScanPos ][ 0 ] | |
|     yC = ( yS << log2SbSize ) + | |
|       DiagScanOrder[ log2SbSize ][ log2SbSize ][ lastScanPos ][ 1 ] | |
|   } while( ( xC != LastSignificantCoeffX ) \| \| (yC != LastSignificantCoeffY ) ) | |
|   numSigCoeff = 0 | |
|   QState = 0 | |
|   for( i = lastSubBlock; i >= 0; i− − ) { | |
|     startQStateSb = QState | |
|     xS = DiagScanOrder[ log2TbWidth − log2SbSize ][ log2TbHeight − log2SbSize ] | |
|       [ lastSubBlock ][ 0 ] | |
|     yS = DiagScanOrder[ log2TbWidth − log2SbSize ][ log2TbHeight − log2SbSize] | |
|       [ lastSubBlock ][ 1 ] | |
|     inferSbDcSigCoeffFlag = 0 | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     firstSigScanPosSb = numSbCoeff | |
|     lastSigScanPosSb = − 1 | |
|     remBinsPass1 = ( log2SbSize < 2 ? 6 : 28) | |
|     remBinsPass2 = ( log2SbSize < 2 ? 2 : 4) | |
|     firstPosMode0 = ( i = = lastSubBlock ? lastScanPos − 1 : numSbCoeff − 1) | |
|     firstPosMode1 = −1 | |
|     firstPosMode2 = −1 | |
|     for( n = ( i = = firstPosMode0; n >= 0 && remBinsPass1 >= 3; n− − ) { | |
|       xC = ( xS <<log2SbSize ) + DiagScanOrder[ log2SbSize ][ log2SbSize ][ n ][ 0 ] | |
|       yC = ( yS <<log2SbSize ) + DiagScanOrder[ log2SbSize ][ log2SbSize ][ n ][ 1 ] | |
|       if( coded_sub_block_flag[ xS ][ yS ] && ( n > 0 \| \| !inferSbDcSigCoeffFlag ) ) { | |
|         sig_coeff_flag[ xC ][ yC ] | ae(v) |
|         remBinsPass1− − | |
|         if( sig_coeff_flag[ xC ][ yC ] ) | |
|           inferSbDcSigCoeffFlag = 0 | |
|       } | |

TABLE 1-continued

| | Descriptor |
|---|---|
| ```
if( sig_coeff_flag[ xC ][ yC ]) {
  numSigCoeff++
  abs_level_gt1_flag[ n ]
``` | ae(v) |
| ```
  remBinsPass1- -
  if( abs_level_gt1_flag[ n ]) {
    par_level_flag[ n ]
``` | ae(v) |
| ```
    remBinsPass1- -
    if( remBinsPass2 > 0 ) {
      remBinsPass2- -
      if( remBinsPass2 = = 0 )
      firstPosModel = n − 1
    }
  }
  if( lastSigScanPosSb = = −1)
    lastSigScanPosSb = n
  firstSigScanPosSb = n
}
AbsLevelPass1[ xC ][ yC ] =
  sig coeff flag[ xC ][ yC ] + par level flag[ n ] + abs level gt1 flag[ n ]
if( dep quant enabled flag )
  QState = QStateTransTable[ QState ][ AbsLevelPass1[ xC ][ yC ] & 1 ]
if( remBinsPass1 < 3 )
  firstPosMode2 = n − 1
}
if( firstPosModel < firstPosMode2 )
firstPosModel = firstPosMode2
for( n = numSbCoeff − 1; n }>= firstPosMode2; n− − )
  if( abs level gt1 flag[ n ] )
    abs level gt3 flag[ n ]
``` | ae(v) |
| ```
for( n = numSbCoeff − 1; n >= firstPosModel; n− − ) {
  xC = ( xS << log2SbSize ) + DiagScanOrder[ log2SbSize ][ log2SbSize ][ n ][ 0 ]
  yC = ( yS << log2SbSize ) + DiagScanOrder[ log2SbSize ][ log2SbSize ][ n ][ 1 ]
  if( abs level gt3 flag[ n ])
    abs remainder[ n ]
``` | ae(v) |
| ```
  AbsLevel[ xC ][ yC ] = AbsLevelPass1 [ xC ][ yC ] +
    2 * ( abs level gt3 flag[ n ] + abs remainder[ n ] )
}
for( n = firstPosModel; n > firstPosMode2; n− − ) {
  xC = ( xS <<log2SbSize ) + DiagScanOrder[ log2SbSize ][ log2SbSize ][ n ][ 0 ]
  yC = ( yS <<log2SbSize ) + DiagScanOrder[ log2SbSize ][ log2SbSize ][ n ][ 1 ]
  if( abs level gt1 flag[ n ] )
    abs remainder[ n ]
``` | ae(v) |
| ```
  AbsLevel[ xC ][ yC ] = AbsLevelPass1 [ xC ][ yC ] + 2 * abs remainder[ n ]
}
for( n = firstPosMode2; n >= 0; n− − ) {
  xC = ( xS << log2SbSize ) + DiagScanOrder[ log2SbSize ][ log2SbSize ][ n ][ 0 ]
  yC = ( yS << log2SbSize ) + DiagScanOrder[ log2SbSize ][ log2SbSize ][ n ][ 1 ]
  dec abs level[ n ]
``` | ae(v) |
| ```
  if(AbsLevel[ xC ][ yC ] > 0 )
    firstSigScanPosSb = n
  if( dep quant enabled flag )
    QState = QStateTransTable[ QState ][ AbsLevel[ xC ][ yC ] & 1]
}
if( dep quant enabled flag | | !sign data hiding enabled flag )
signHidden = 0
else
signHidden = ( lastSigScanPosSb − firstSigScanPosSb > 3 ? 1 : 0 )
for( n = numSbCoeff − 1; n >= 0; n− − ) {
  xC = ( xS <<log2SbSize ) + DiagScanOrder[ log2SbSize ][ log2SbSize ][ n ][ 0 ]
  yC = ( yS <<log2SbSize ) + DiagScanOrder[ log2SbSize ][ log2SbSize ][ n ][ 1]
  if( sig_coeff_flag[ xC ][ yC ] &&
    ( !signHidden | | ( n != firstSigScanPosSb ) ) )
    coeff sign flag[ n ]
``` | ae(v) |
| ```
}
if( dep quant enabled flag) {
  QState = startQStateSb
  for( n = numSbCoeff − 1; n >= 0; n− − ) {
    xC =( xS << log2SbSize ) +
      DiagScanOrder[ log2SbSize ][ log2SbSize ][ n ][ 0 ]
    yC = ( yS << log2SbSize ) +
      DiagScanOrder log2SbSize ][ log2SbSize ][ n ][ 1 ]
``` | |

TABLE 1-continued

Descriptor

```
        if( sig_coeff_flag[ xC ][ yC ] )
          TransCoeffLevel[ x0 ][ y0 ][ cIdx][ xC ][ yC ] =
            ( 2 * AbsLevel[ xC ][ yC ] - ( QState >1 ? 1 : 0 ) ) *
            ( 1 - 2 * coeff_sign_flag[ n ] )
        QState = QStateTransTable[ QState ][ par_level_flag[ n ] ]
      } else {
      sumAbsLevel = 0
      for( n = numSbCoeff - 1; n >= 0; n- - ) {
        xC = ( xS << log2SbSize ) +
          DiagScanOrder[ log2SbSize ][ log2SbSize ][ n ][ 0 ]
        yC = ( yS << log2SbSize ) +
          DiagScanOrder[ log2SbSize ][ log2SbSize ][ n ][ 1 ]
        if( sig_coeff_flag[ xC ][ yC ]) {
        TransCoeffLevel[ x0 ][ y0 ][ cIdx][ xC ][ yC ] =
          AbsLevel[ xC ][ yC ] * ( 1 - 2 * coeff_sign_flag[ n ] )
        if( signHidden ) {
          sumAbsLevel += AbsLevel[ xC ] [ yC ]
          if( ( n = = firstSigScanPosSb ) && ( sumAbsLevel % 2) = = 1 ) )
            TransCoeffLevel[ x0 ][ y0 ][ cIdx ][ xC ][ yC ] =
              -TransCoeffLevel[ x0 ][ y0 ][ cIdx ][ xC ][ yC ]
        }
       }
      }
     }
    }
   }
  if( tu_mts_flag[ x0 ][ y0 ] && ( cIdx = = 0 ) )
    mts_idx[ x0 ][ y0 ][ cIdx ]                                          ae(v)
 }
``` transform_skip_flag indicates whether transform is skipped in an associated block. The transform_skip_flag may be a syntax element of a transform skip flag. The associated block may be a coding block (CB) or a transform block (TB). Regarding transform (and quantization) and residual coding procedures, CB and TB may be used interchangeably. For example, as described above, residual samples may be derived for CB, and (quantized) transform coefficients may be derived through transform and quantization for the residual samples, and through the residual coding procedure, information (e.g., syntax elements) efficiently indicating a position, magnitude, sign, etc. of the (quantized) transform coefficients may be generated and signaled. The quantized transform coefficients may simply be called transform coefficients. In general, when the CB is not larger than a maximum TB, a size of the CB may be the same as a size of the TB, and in this case, a target block to be transformed (and quantized) and residual coded may be called a CB or a TB. Meanwhile, when the CB is greater than the maximum TB, a target block to be transformed (and quantized) and residual coded may be called a TB. Hereinafter, it will be described that syntax elements related to residual coding are signaled in units of transform blocks (TBs) but this is an example and the TB may be used interchangeably with coding blocks (CBs as described above.

In an embodiment, the encoding apparatus may encode (x, y) position information of the last non-zero transform coefficient in a transform block based on the syntax elements last_sig_coeff_x_prefix, last_sig_coeff_y_prefix, last_sig_coeff_x_suffix, and last_sig_coeff_y_suffix. More specifically, the last_sig_coeff_x_prefix represents a prefix of a column position of a last significant coefficient in a scanning order within the transform block, the last_sig_coeff_y_prefix represents a prefix of a row position of the last significant coefficient in the scanning order within the transform block, the last_sig_coeff_x_suffix represents a suffix of a column position of the last significant coefficient in the scanning order within the transform block, and the last_sig_coeff_y_suffix represents a suffix of a row position of the last significant coefficient in the scanning order within the transform block. Here, the significant coefficient may represent a non-zero coefficient. In addition, the scanning order may be a right diagonal scanning order. Alternatively, the scanning order may be a horizontal scanning order or a vertical scanning order. The scanning order may be determined based on whether intra/inter prediction is applied to a target block (a CB or a CB including a TB) and/or a specific intra/inter prediction mode.

Thereafter, the encoding apparatus may divide the transform block into 4×4 sub-blocks, and then indicate whether there is a non-zero coefficient in the current sub-block using a 1-bit syntax element coded_sub_block_flag for each 4×4 sub-block.

If a value of coded_sub_block_flag is 0, there is no more information to be transmitted, and thus, the encoding apparatus may terminate the encoding process on the current sub-block. Conversely, if the value of coded_sub_block_flag is 1, the encoding apparatus may continuously perform the encoding process on sig_coeff_flag. Since the sub-block including the last non-zero coefficient does not require encoding for the coded_sub_block_flag and the sub-block including the DC information of the transform block has a high probability of including the non-zero coefficient, coded_sub_block_flag may not be coded and a value thereof may be assumed as 1.

If the value of coded_sub_block_flag is 1 and thus it is determined that a non-zero coefficient exists in the current sub-block, the encoding apparatus may encode sig_coeff_flag having a binary value according to a reverse scanning order. The encoding apparatus may encode the 1-bit syntax element sig_coeff_flag for each transform coefficient according to the scanning order. If the value of the transform coefficient at the current scan position is not 0, the value of sig_coeff_flag may be 1. Here, in the case of a subblock including the last non-zero coefficient, sig_coeff_flag does not need to be encoded for the last non-zero coefficient, so the coding process for the sub-block may be omitted. Level information coding may be performed only when sig_coeff_flag is 1, and four syntax elements may be used in the level information encoding process. More specifically, each sig_coeff_flag[xC][yC] may indicate whether a level (value) of a corresponding transform coefficient at each transform coefficient position (xC, yC) in the current TB is non-zero. In an embodiment, the sig_coeff_flag may correspond to an example of a syntax element of a significant coefficient flag indicating whether a quantized transform coefficient is a non-zero significant coefficient.

A level value remaining after encoding for sig_coeff_flag may be derived as shown in the following equation. That is, the syntax element remAbsLevel indicating a level value to be encoded may be derived from the following equation.

$$remAbsLevel=|coeff|-1 \quad \text{[Equation 1]}$$

Herein, coeff means an actual transform coefficient value.

Additionally, abs_level_gt1_flag may indicate whether or not remAbsLevel' of the corresponding scanning position (n) is greater than 1. For example, when the value of abs_level_gt1_flag is 0, the absolute value of the transform coefficient of the corresponding position may be 1. In addition, when the value of the abs_level_gt1_flag is 1, the remAbsLevel indicating the level value to be encoded later may be derived as shown in the following equation.

$$remAbsLevel=remAbsLevel-1 \quad \text{[Equation 2]}$$

In addition, the least significant coefficient (LSB) value of remAbsLevel described in Equation 2 described above may be encoded as in Equation 3 below through par_level_flag.

$$par\_level\_flag=remAbsLevel \ \& \ 1 \quad \text{[Equation 3]}$$

Herein, par_level_flag[n] may indicate a parity of a transform coefficient level (value) at a scanning position n.

A transform coefficient level value remAbsLevel that is to be encoded after performing par_level_flag encoding may be updated as shown below in the following equation.

$$remAbsLevel'=remAbsLevel>>1 \quad \text{[Equation 4]}$$

abs_level_gt3_flag may indicate whether or not remAbsLevel' of the corresponding scanning position (n) is greater than 3. Encoding for abs_remainder may be performed only in a case where rem_abs_gt3_flag is equal to 1. A relationship between the actual transform coefficient value coeff and each syntax element may be as shown below in the following equation.

$$|coeff|=sig\_coeff\_flag+abs\_level\_gt1\_flag+par\_level\_flag+2*(abs\_level\_gt3\_flag+abs\_remainder) \quad \text{[Equation 5]}$$

Additionally, the following table indicates examples related to the above-described Equation 5.

TABLE 2

| \|coeff\| | sig_coeff_flag | abs_level_gt1_flag | par_level_flag | abs_level_gt3_flag | abs_remainder/ dec_abs_level |
|---|---|---|---|---|---|
| 0 | 0 | | | | |
| 1 | 1 | 0 | | | |
| 2 | 1 | 1 | 0 | | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | | |

Herein, |coeff| indicates a transform coefficient level (value) and may also be indicates as an AbsLevel for a transform coefficient. Additionally, a sign of each coefficient may be encoded by using coeff_sign_flag, which is a 1-bit symbol.

In addition, the dec_abs_level may represent an intermediate value coded with a Golomb-Rice code at the corresponding scanning position (n). The dec_abs_level may be signaled for a scanning position that satisfies the conditions disclosed in Table 2 above. In this case, the absolute value AbsLevel (i.e., |coeff|) of the corresponding transform coefficient is derived as one of 0, dec_abs_level+1, dec_abs+level depending on the condition.

Also, the coeff_sign_flag may indicate the sign of the transform coefficient level at the corresponding scanning position (n). That is, the coeff_sign_flag may indicate the sign of the transform coefficient at the corresponding scanning position (n).

In addition, the mts_idx may indicate transform kernels applied in a horizontal direction and a vertical direction to residual samples in a current transform block.

Figure 5:
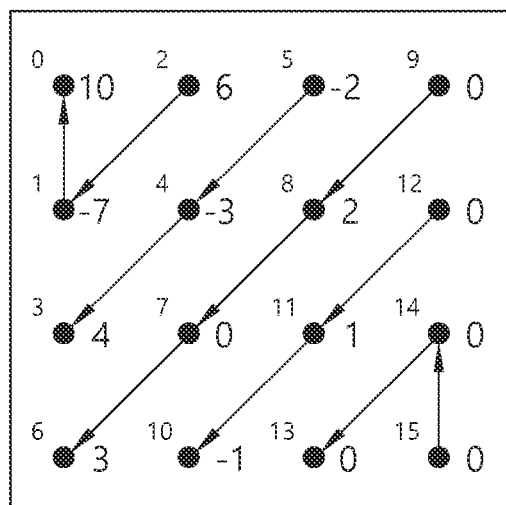
FIG. 5 is a diagram showing exemplary transform coefficients within a 4×4 block.

FIG. 5 illustrates an example of transform coefficients within a 4×4 block.

The 4×4 block of FIG. 5 illustrates one example of quantized coefficients. The block shown in FIG. 5 may be a 4×4 transform block or a 4×4 sub-block of 8×8, 16×16, 32×32, and 64×64 transform blocks. The 4×4 block of FIG. 5 may represent a luma block or a chroma block.

For example, the following table shows an encoding result for the inverse diagonally scanned coefficients illustrated in FIG. 5.

TABLE 3

| scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| coefficients | 0 | 0 | 0 | 0 | 1 | -1 | 0 | 2 | 0 | 3 | -2 | -3 | 4 | 6 | -7 | 10 |
| sig_coeff_flag | 0 | 0 | 0 | 0 | 1 | 1 | 0 | 1 | 0 | 1 | 1 | 1 | 1 | 1 | | |
| abs_level_gt1_flag | | | | | 0 | 0 | | 1 | | 1 | 1 | 1 | 1 | 1 | | |

TABLE 3-continued

| | | | | | | | | | | | | | | | |
|---|---|---|---|---|---|---|---|---|---|---|---|---|---|---|---|
| par_level_flag | | | | | | | | | 0 | | 1 | 0 | 1 | 0 | 0 |
| abs_level_gt3_flag | | | | | | | | | | | | | | 1 | 1 |
| abs_remainder | | | | | | | | | | | | | | 0 | 1 |
| dec_abs_level | | | | | | | | | | | | | | 7 | 10 |
| coeff_sign_flag | 0 | 0 | 0 | 0 | 0 | 1 | 0 | 0 | 0 | 0 | 1 | 1 | 0 | 0 | 1 | 0 |

In Table 3, scan_pos represents the position of a coefficient according to the inverse diagonal scan. The scan_pos 15 may represent the transform coefficient scanned first in the 4×4 block, namely, the transform coefficient of the bottom-right corner, and scan_pos 0 may be the transform coefficient scanned last, namely, the transform coefficient of the top-left corner. Meanwhile, in one embodiment, the scan_pos may be referred to as a scan position. For example, the scan_pos 0 may be referred to as scan position 0.

Meanwhile, CABAC provides high performance but has a disadvantage of poor throughput performance. This characteristic is caused by the regular coding engine of the CABAC, where the regular coding (namely, encoding through the regular coding engine of the CABAC) uses a updated probabilistic state and range through coding of the previous bin, thereby showing high data dependency and taking a lot of time to read a probabilistic section and determine the current state. The CABAC's throughput problem may be solved by limiting the number of context-coded bins. For example, as shown in Table 1, the sum of bins used to express the sig_coeff_flag, the abs_level_gt1_flag, and the par_level_flag may be limited by a number depending on the size of the corresponding block. In one example, when the corresponding block is a 4×4 sized block, the sum of bins for the sig_coeff_flag, the abs_level_gt1_flag, and the par_level_flag may be limited to 28. On the other hand, when the corresponding block is a 2×2 sized block, the sum of bins for the sig_coeff_flag, the abs_level_gt1_flag, and the par_level_flag may be limited to 6. The remBinsPass1 may express the limited numbers of bins. Also, the numbers due to the size of the corresponding blocks may limit the number of context-coded bins for the abs_level_gt3_flag. For example, in the case of a 4×4 sized block, the number of bins for the abs_level_gt3_flag may be limited to 4 while, in the case of a 2×2 sized block, the number of bins for the abs_level_gt3_flag may be limited to 2. The remBinsPass2 may express the limited numbers of bins for the abs_level_gt3_flag. In this case, when the encoding apparatus uses all of the limited number of context-coded bins to code context elements, the remaining coefficients may be binarized without using the CABAC through a binarization method for the coefficients described later to perform bypass encoding.

Meanwhile, as described above, when an input signal is received in the form of a syntax element rather than a binary value, the encoding apparatus may convert the input signal into a binary value by binarization. Also, the decoding apparatus may decode the syntax element to derive a binarized value (namely, a binarized bin) of the syntax element and inversely binarize the binarized value to derive the value of the syntax element. The binarization process may be performed using a Truncated Tice (TR) binarization process, a k-th order Exp-Golomb (EGk) binarization process, or a Fixed Length (FL) binarization process. Also, the inverse binarization process may refer to a process of deriving the value of the syntax element by performing the TR binarization process, the EGk binarization process, or the FL binarization process.

For example, the TR binarization process may be performed as follows.

The input of the TR binarization process may be a request for TR binarization and cMax and cRiceParam for a syntax element. Also, an output of the TR binarization process may be TR binarization for a value symbolVal corresponding to a bin string.

Specifically, as one example, in the presence of a suffix bin string for a syntax element, a TR bin string for the syntax element may be a concatenation of a prefix bin string and a suffix bin string; in the absence of the suffix bin string, the TR bin string for the syntax element may be the prefix bin string. For example, the prefix bin string may be derived as follows.

A prefix value of the symbolVal for the syntax element may be derived to satisfy the following equation.

$$\text{prefixVal} = \text{symbolVal} >> \text{cRiceParam} \quad \text{[Equation 6]}$$

In Eq. 6, prefixVal represents a prefix value of the symbolVal. The prefix (namely, a prefix bin string) of the TR bin string of the syntax element may be derived as follows.

For example, when the prefixVal is less than cMax>>cRiceParam, the prefix bin string may be a bit string of length prefixVal+1 indexed by binIdx. In other words, when the prefixVal is less than cMax>>cRiceParam, the prefix bin string may be a bit string having prefixVal+1 bits indicated by binIdx. The bin corresponding to binIdx less than prefixVal may be equal to 1. Also, the bin corresponding to binIdx having the same value as prefixVal may be equal to 0.

For example, bin strings derived through unary binarization for the prefixVal may be given as follows.

TABLE 4

| prefixVal | Bin string. | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

Meanwhile, when the prefixVal is not less than cMax>>cRiceParam, the prefix bin string may be a bit string of length cMax>>cRiceParam and all bins of which are 1.

Also, when cMax is greater than symbolVal, and cRiceParam is greater than 0, a suffix bin string of a TR bin string may be present. For example, the suffix bin string may be derived as described later.

The suffix value of the symbolVal for the syntax element may be derived by the following equation.

$$\text{suffixVal} = \text{symbolVal} - ((\text{prefixVal}) << \text{cRiceParam}) \quad \text{[Equation 7]}$$

Here, suffixVal may represent the suffix value of the symbolVal.

The suffix (namely, the suffix bin string) of a TR bin string may be derived based on the FL binarization process for the suffixVal where the cMax value is (1<<cRiceParam)−1.

Meanwhile, if the value of the input parameter cRiceParam is 0, the TR binarization may be precisely truncated unary binarization, and a cMax value equal to the maximum possible value of a syntax element which is always decoded may be used.

Also, for example, the EGk binarization process may be performed as follows. A syntax element coded by ue(v) may be an Exp-Golumb coded syntax element.

In one example, the 0-th order Exp-Golomb (EG0) binarization process may be performed as follows.

A parsing process for the syntax element may be started by reading bits starting from a bitstream's current position, including the first non-zero bit, and counting the number of leading bits such as 0. The following table describes the process above.

TABLE 5 leadingZeroBits = −1
for( b = 0; !b; leadingZeroBits++ )
  b = read bits( 1 )

Also, the variable codeNum may be derived by the following equation.

$$\text{codeNum} = 2^{\text{leadingZeroBits}} - 1 + \text{read\_bits}(\text{leadingZeroBits})$$ [Equation 8]

Here, the value returned by read_bits(leadingZeroBits), namely, the value represented by read_bits(leadingZeroBits), may be interpreted as a binary representation of an unsigned integer for the most significant bit recorded first.

The table below shows a structure of the Exp-Golomb code in which a bit string is divided into "prefix" bits and "suffix" bits.

TABLE 6

| Bit string form | Range of codeNum |
|---|---|
| 1 | 0 |
| 0 1 $x_0$ | 1 ... 2 |
| 0 0 1 $x_1$ $x_0$ | 3 ... 6 |
| 0 0 0 1 $x_2$ $x_1$ $x_0$ | 7 ... 14 |
| 0 0 0 0 1 $x_3$ $x_2$ $x_1$ $x_0$ | 15 ... 30 |
| 0 0 0 0 0 1 $x_4$ $x_3$ $x_2$ $x_1$ $x_0$ | 31 ... 62 |
| ... | ... |

The "prefix" bit may be a bit parsed as described above to calculate leadingZeroBits and may be represented by 0 or 1 of the bit string in Table 6. In other words, the bit string started with 0 or 1 in Table 6 above may represent a prefix bit string. The "suffix" bit may be a bit parsed from the calculation of codeNum and may be denoted by $x_i$ in Table 6 above. In other words, a bit string started with $x_i$ in Table 6 above may represent a suffix bit string. Here, i may be a value ranging from 0 to LeadingZeroBits−1. Also, each $x_i$ may correspond to 0 or 1.

The table below shows bit strings assigned to the codeNum.

TABLE 7

| Bit string | codeNum |
|---|---|
| 1 | 0 |
| 0 1 0 | 1 |

TABLE 7-continued

| Bit string | codeNum |
|---|---|
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

When the descriptor of a syntax element is ue(v), that is, when the syntax element is coded by ue(v), the value of the syntax element may be the same as codeNum.

Also, for example, the EGk binarization process may be performed as follows.

An input to the EGk binarization process may be a request for EGk binarization. Also, an output of the EGk binarization process may be EGk binarization for the simbolVal corresponding to a bin string.

A bit string of the EGk binarization process for symbolVal may be derived as follows.

TABLE 8 absV = Abs( symbolVal )
stopLoop = 0
do
  if( absV >= ( 1 {<< k ) ) {
    put( 1 )
    absV = absV − ( 1 <<k )
    k++
  } else {
    put( 0 )
    while( k− − )
      put( ( absV >> k ) & 1 )
    stopLoop = 1
  }
while( !stopLoop )

Referring to Table 8 above, a binary value X may be added to the end of a bin string through each call of put(X). Here, X may be 0 or 1.

Also, for example, the FL binarization process may be performed as follows.

An input to the FL binarization process may be a request for FL binarization and cMax for the syntax element. Also, an output of the FL binarization process may be FL binarization for symbolVal corresponding to a bin string.

FL binarization may be carried out using a bit string having bits corresponding to a fixed length of the symbol value symbolVal. Here, the fixed length bit may be an unsigned integer bit string. That is, a bit string for the symbol value symbolVal may be derived through FL binarization, and the bit length (namely, the number of bits) of the bit string may be a fixed length.

For example, the fixed length may be derived by the following equation.

$$\text{fixedLength} = \text{Ceil}(\text{Log }2(c\text{Max}+1))$$ [Equation 9]

Indexing of bins for FL binarization may use a value increasing in the order from the most significant bit to the least significant bit. For example, a bin index related to the most significant bit may be binIdx=0.

Meanwhile, a binarization process for the syntax element abs_remainder among the residual information may be performed as follows.

An input to the binarization process for the abs_remainder and the dec_abs_level is a request for binarization of the syntax element abs_remainder[n] or the syntax element dec_abs_level[n], color component cIdx, luma position (x0, y0), current coefficient scan position (xC, yC), log 2TbWidth, which is the binary logarithm of the width of the transform block, and log 2TbHeight, which is the binary logarithm of the height of the transform block. The luma location (x0, y0) may indicate a top-left sample of the current luma transform block based on the top-left luma sample of a picture.

An output of the binarization process for the abs_remainder (or the dec_abs_level) may be binarization of the abs_remainder (or the dec_abs_level) (namely, a binarized bin string of the abs_remainder (or the dec_abs_level)). Available bin strings for the abs_remainder (or the dec_abs_level) may be derived through the binarization process.

The Rice parameter cRiceParam for the abs_remainder (or the dec_abs_level) may be derived through a Rice parameter derivation process performed using the color component cIdx, the luma position (x0, y0), the current coefficient scan position (xC, yC), and log 2TbHeight, which is the binary logarithm of the height of the transform block, as inputs. A detailed description of the Rice parameter derivation process will be described later.

Also, for example, cMax for the abs_remainder (or the dec_abs_level) may be derived based on the Rice parameter cRiceParam. The cMax may be derived by the following equation.

$$c\text{Max} = (c\text{RiceParam} == 1 ? 6:7) << c\text{RiceParam} \quad \text{[Equation 10]}$$

Referring to Eq. 10 above, if the value of cRiceParam is 1, the cMax may be derived as 6<<cRiceParam, and if the value of cRiceParam is not 1, the cMax may be derived as 7<<cRiceParam.

On the other hand, in the presence of a suffix bin string, binarization for the abs_remainder (or the dec_abs_level), namely, a bin string for the abs_remainder (or the dec_abs_level), may be a concatenation of a prefix bin string and a suffix bin string. Also, in the absence of the suffix bin string, the bin string for the abs_remainder (or the dec_abs_level) may be the prefix bin string.

For example, the prefix bin string may be derived as described later.

The prefix value prefixVal of the abs_remainder may be derived by the following equation.

$$\text{prefixVal} = \text{Min}(c\text{Max}, \text{abs\_remainder}[n]) \quad \text{[Equation 11]}$$

The prefix of the bin string of the abs_remainder (namely, the prefix bin string) may be derived through the TR binarization process for the prefixVal using the cMax and the cRiceParam as inputs.

If the prefix bin string is the same as a bit string, all bits of which are 1 and the bit length of which is 4, a suffix bin string of the bin string of the abs_remainder may be present and may be derived as described below.

The suffix value suffixVal of the abs_remainder may be derived by the following equation.

$$\text{suffixVal} = \text{abs\_remainder}[n] - c\text{Max} \quad \text{[Equation 12]}$$

The suffix bin string of the bin string of the abs_remainder may be derived through the EGk binarization process for the suffixVal in which k is set to cRiceParam+1.

Meanwhile, the Rice parameter derivation process described above may be as follows.

An input to the Rice parameter derivation process is a color component index cIdx, a luma position (x0, y0), a current coefficient scan position (xC, yC), log 2TbWidth, which is binary logarithm of the width of the transform block, and log 2TbHeight, which is binary logarithm of the height of the transform block. The luma location (x0, y0) may indicate a top-left sample of the current luma transform block based on the top-left luma sample of a picture. Also, an output of the Rice parameter derivation process may be the Rice parameter cRiceParam.

For example, the variable locSumAbs may be derived based on the given syntax elements sig_coeff_flag[x][y], the component index cIdx, and an array AbsLevel[x][C] for the transform block at the top-left luma position (x0, y0) according to the pseudo-code shown in the following table.

TABLE 9

```
locSumAbs = 0
if( xC < (1 << log2TbWidth) - 1) {
 locSumAbs += AbsLevel[ xC + 1 ][ yC ] - sig_coeff_flag[ xC + 1 ]
  [ yC ]
 if( xC < (1 << log2TbWidth) - 2)
  locSumAbs += AbsLevel[ xC + 2 ][ yC ] - sig_coeff_flag[ xC + 2 ]
   [ yC ]
 if( yC < (1 <<log2TbHeight) - 1)
  locSumAbs += AbsLevel[ xC + 1 ][ yC + 1 ] - sig_coeff_flag[ xC + 1 ]
   [ yC + 1 ]
}
if( yC < (1 << log2TbHeight) - 1) {
 locSumAbs += AbsLevel[ xC ][ yC + 1 ] - sig_coeff_flag[ xC ]
  [ yC + 1 ]
 if( yC < (1 << log2TbHeight) - 2)
  locSumAbsPass1 += AbsLevelPass1 [ xC ][ yC + 2 ] - sig_coeff_flag
   [ xC ][ YC + 2 ]
}
```

The Rice parameter cRiceParam may be derived as follows.

For example, when the locSumAbs is less than 12, the cRiceParam may be set to 0. Alternatively, when the above condition is not met, and the locSumAbs is less than 25 (namely, when the locSumAbs is greater than or equal to 12 and less than 25), the cRiceParam may be set to 1. Or, when the above condition is not met (namely, when the locSumAbs is greater than or equal to 25), the cRiceParam may be set to 2.

Meanwhile, a method of signaling tu_mts_idx may be proposed, unlike the embodiment of transmitting the syntax elements described above.

Specifically, a method of signaling tu_mts_idx in the existing VVC Draft 3 may be compared with a method of signaling the proposed tu_mts_idx may be compared as follows.

TABLE 10

| VVC Draft 3<br>transform unit( ) | Proposed<br>transform unit( ) |
|---|---|
| tu_cbf_luma<br>. . .<br>if( . . . tu_cbf_luma &&<br>  ( tbWidth <= 32 ) &&<br>  ( tbHeight <= 32 ) . . . )<br>  tu_mts_flag | tu_cbf_luma<br>if( . . . tu_cbf_luma &&<br>  ( tbWidth <= 32 ) &&<br>  ( tbHeight <= 32 ) . . . )<br>  tu_mts_idx |
| residual_coding( cldx ) | |
| if( ( cldx != 0 \| \| !tu_mts_flag ) &&<br>  ( log2TbWidth <= 2 ) &&<br>  ( log2TbHeight <= 2 ) )<br>  transform_skip_flag[ cldx ]<br>. . . /* coefficient parsing */ . . .<br>if( tu_mts_flag && cldx == 0 )<br>  mts_idx | |

As shown in Table 10, according to the existing scheme, the MTS flag for the current block is first parsed, and then, the transform skip flag is parsed, and thereafter, the MTS index coding may be performed. Here, the coding for the MTS index may be performed through fixed-length binarization, and a fixed bit length for the MTS index may be 2.

Alternatively, according to the proposed scheme, the MTS index may be coded without parsing the transform skip flag and the MTS flag separately, and truncated unary binarization may be used for coding the MTS index. Here, the MTS index may indicate whether transform is applied to the residual information of the current block, and may indicate whether the MTS is applied. That is, in the proposed scheme, a scheme of signaling the transform skip flag, the MTS flag, and the MTS index as one syntax element may be proposed. In the proposed scheme, a first bin of the MTS index may indicate whether transform is applied to residual information of the current block, and a second bin of the MTS index may indicate whether the MTS is applied and an applied transform kernel.

The meaning and binarization value indicated by the value of the MTS index in the proposed method may be as shown in the following table.

TABLE 11

| | transform type | | binarization | | |
|---|---|---|---|---|---|
| tu_mts_idx | horizontal | vertical | MTS & TS enabled | MTS enabled | TS enabled |
| 0 | DCT-II | DCT-II | 0 | 0 | 0 |
| 1 | SKIP | SKIP | 10 | — | 1 |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

For example, when the value of the MTS index is 0, the MTS index may indicate that transform is applied to the current block, MTS is not applied, and a horizontal transform kernel type and a vertical transform kernel type are DCT-2. In addition, when the value of the MTS index is 1, the MTS index may indicate that no transform is applied to the current block (i.e., MTS is not applied and no transform kernel type is indicated). Also, when the value of the MTS index is 2, the MTS index may indicate that transform and MTS for the current block are applied, and the horizontal transform kernel type and the vertical transform kernel type are DST-7. In addition, when the value of the MTS index is 3, the MTS index may indicate that transform and MTS for the current block are applied, the horizontal transform kernel type is DCT-8, and the vertical transform kernel type is DST-7. Also, when the value of the MTS index is 4, the MTS index may indicate that transform and MTS for the current block are applied, the horizontal transform kernel type is DST-7, and the vertical transform kernel type is DCT-8. Also, when the value of the MTS index is 5, the MTS index may indicate that transform and MTS for the current block are applied and the horizontal transform kernel type and the vertical transform kernel type are DCT-8.

Alternatively, another example of the meaning and the binarization value indicated by the value of the MTS index may be as shown in the following table.

TABLE 12

| | transform type | | binarization | | |
|---|---|---|---|---|---|
| tu_mts_idx | horizontal | vertical | MTS & TS enabled | MTS enabled | TS enabled |
| 0 | SKIP | SKIP | 0 | — | 0 |
| 1 | DCT-II | DCT-II | 10 | 0 | 1 |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

For example, when the value of the MTS index is 0, the MTS index may indicate that transform for the current block is not applied (i.e., MTS is not applied and a transform kernel type is not indicated). Also, when the value of the MTS index is 1, the MTS index may indicate that the transform for the current block is applied, the MTS is not applied, and the horizontal transform kernel type and the vertical transform kernel type are DCT-2. Also, when the value of the MTS index is 2, the MTS index may indicate that transform and MTS for the current block are applied and the horizontal transform kernel type and the vertical transform kernel type are DST-7. In addition, when the value of the MTS index is 3, the MTS index may indicate that transform and MTS for the current block are applied, the horizontal transform kernel type is DCT-8, and the vertical transform kernel type is DST-7. Also, when the value of the MTS index is 4, the MTS index may indicate that transform and MTS for the current block are applied, the horizontal transform kernel type is DST-7, and the vertical transform kernel type is DCT-8. Also, when the value of the MTS index is 5, the MTS index may indicate that transform and MTS for the current block are applied and the horizontal transform kernel type and the vertical transform kernel type are DCT-8.

Meanwhile, the number of context models may not be changed, and a method of designating a context index increment ctxInc for each bin of tu_mts_idx may be as shown in the following table.

TABLE 13

| | binIdx | | | | | |
|---|---|---|---|---|---|---|
| Syntax element | 0 | 1 | 2 | 3 | 4 | >= 5 |
| tu_mts_idx (MTS & TS) | 0 | 1 . . . 6 (1 + cqtDepth) | 7 | 8 | 9 | na |
| tu_mts_idx (MTS) | 1 . . . 6 (1 + cqtDepth) | 7 | 8 | 9 | na | na |
| tu_mts_idx (TS) | 0 | na | na | na | na | na |

In addition, this document proposes a method of modifying the contents described later in the existing residual coding method to apply statistics and signal characteristics of the transform skip level (i.e., the residual in the spatial domain) representing a quantized prediction residual to residual coding.

No position of the last non-zero transform coefficient: Since the residual signal (i.e., residual sample) reflects a spatial residual and energy compression by transform is not performed by transform skip after prediction, a high probability for a posterior zero or an insignificant level at the bottom-right of the transform block may no longer occur. Accordingly, in this case, signaling information on a scanning position of the last non-zero transform coefficient may be omitted. Instead, a first sub-block to be coded first may be a bottom-right sub-block in the transform block. Meanwhile, the non-zero transform coefficient may be referred to as a significant coefficient.

Sub-block CBF: In the absence of signaling of information on the scanning position of the last non-zero transform coefficient, transform skip is applied, and CBF signaling of the sub-block having coded_sub_block_flag should be modified as follows.

Due to quantization, the above-mentioned non-critical level sequence may still occur locally within the transform block. Accordingly, information on the scanning position of the last non-zero transform coefficient may be removed as described above, and coded_sub_block_flag may be coded for all sub-blocks.

In addition, the coded_sub_block_flag for the sub-block (top-left sub-block) for the DC frequency position may indicate a special case. For example, in VVC Draft 3, coded_sub_block_flag for the top-left sub-block is not signaled and may always be derived to be equal to 1. When the scanning position of the last non-zero transform coefficient is located in a sub-block other than the top-left sub-block, it may indicate that there is at least one significant level outside the DC sub-block (i.e., the top-left sub-block). As a result, the coded_sub_block_flag for the DC sub-block is derived as 1 but may include only 0/non-significant level. As described above, if transform skip is applied to the current block and there is no information on the scanning position of the last non-zero transform coefficient, coded_sub_block_flag for each sub-block may be signaled. Here, coded_sub_block_flag for DC sub-blocks may also be included, except when coded_sub_block_flag for all sub-blocks other than the DC sub-block is already 0. In this case, it may be derived that the coded_sub_block_flag for the DC sub-block is equal to 1 (inferDcSbCbf=1). Accordingly, since the DC sub-block should have at least one valid level, if all sig_coeff_flags other than sig_coeff_flag for a first position of (0,0) in the DC sub-block are 0, sig_coeff_flag for the first position of (0,0) is not signaled and may be derived to be equal to 1 (inferSbDcSigCoeffFlag=1).

In addition, context modeling of coded_sub_block_flag may be changed. For example, the context model index may be calculated by the sum of coded_sub_block_flag of the right sub-block of the current sub-block and coded_sub_block_flag of the lower sub-block of the current sub-block and logical separation of the coded_sub_block_flags.

sig_coeff_flag context modeling: A local template of the sig_coeff_flag context modeling may be modified to include only a right position NB0 and a lower position NB1 of the current scanning position. The context model offset may be derived as the number of sig_coeff_flag [NB0]+sig_coeff_flag [NB1] of an effective peripheral position. Accordingly, selection of different context sets according to a diagonal d of the current transform block may be eliminated. As a result, three context models and a single context model may be set to code sig_coeff_flag.

abs_level_gt1_flag and par_level_flag context modeling: A single context model may be used for abs_level_gt1_flag and par_level_flag.

abs_remainder coding: An empirical distribution of a transform skip residual absolute level still fits the Laplacian or geometric distribution, but there may be instabilities greater than the transform coefficient absolute level. In particular, a variance within a window of successive realizations may be higher for a residual absolute level. Accordingly, the binarization and context modeling of abs_remainder may be modified as follows.

For example, a higher cutoff value may be used for binarization of abs_remainder. Through this, higher compression efficiency may be provided in a dedicated context model for each bin position and a transition point from coding using sig_coeff_flag, abs_level_gt1_flag, par_level_flag and abs_level_gt3_flag to Rice code for abs_remainder. If the cutoff is increased, more flags "greater than X" (e.g., abs level gt5 flag, abs level gt7 flag, etc.) may occur until the cutoff is reached. The cutoff may be fixed to 5 (numGtFlags=5).

Also, a template for Rice parameter derivation may be modified. That is, only a right peripheral position and a lower peripheral position of a current scanning position may be considered as a local template of sig_coeff_flag context modeling.

coeff_sign_flag context modeling: Due to instability within a sign sequence and prediction residual being often biased, the sign-related information may be coded using a context model even when a global empirical distribution is almost uniformly distributed. A single dedicated context model may be used for coding of the sign-related information, and the sign-related information may be parsed after sig_coeff_flag and maintained together with all context coded bins.

Reduction of context-coded bins: Transmission of syntax elements for the first scanning pass, that is, sig_coeff_flag, abs_level_gt1_flag and par_level_flag may not be changed. However, a limit of a maximum of context coded bins per sample (CCBs) may be removed and may be adjusted to be different. CCB reduction may be derived by designating an invalid mode in case of CCB>k. Here, k may be a positive integer. For example, in the case of a regular level coding mode, k may be 2 (k=2). The above-mentioned limitation may correspond to a reduction of a quantization space.

Syntax elements related to residual data coded by applying the above-described modifications may be represented as shown in the following table.

TABLE 14

| | Descriptor |
|---|---|
| residual_ts_coding( x0, y0, log2TbWidth, log2TbHeight, cIdx ) { | |
| log2SbSize = ( Min( log2TbWidth, log2TbHeight ) < 2 ? 1 : 2 ) | |
| numSbCoeff = 1 << ( log2SbSize << 1 ) | |
| lastSubBlock = ( 1 << ( log2TbWidth +log2TbHeight − 2 * log2SbSize ) ) − 1 | |
| /* Loop over subblocks from last to the top−left (DC) subblock */ | |
| inferDcSbCbf = 1 | |

TABLE 14-continued

Descriptor

```
for( i = lastSubBlock; i >= 0; i- - ) {
  xS = DiagScanOrder[ log2TbWidth - log2SbSize ][ log2TbHeight - log2SbSize ][ lastSubBlock ][ 0 ]
  yS = DiagScanOrder [log2TbWidth - log2SbSize ][ log2TbHeight - log2SbSize ][ lastSubBlock ][ 1 ]
  if( ( i > 0 || !inferDcSbCbf )
    coded sub block flag[ xS ][ yS ]                                                              ae(v)
  if( coded sub block flag[ xS ][ yS ] && i > 0)
    inferDcSbCbf = 0
  }
/* First scan pass */
inferSbDcSigCoeffFlag = 1
for( n = ( i = = numSbCoeff - 1; n >= 0; n- - ) {
  xC = ( xS << log2SbSize ) + DiagScanOrder[ log2SbSize ][ log2SbSize ][ n ][ 0 ]
  yC = ( yS << log2SbSize ) + DiagScanOrder[ log2SbSize ][ log2SbSize ][ n ][ 1 ]
  if( coded sub block flag[ xS ][ yS ] && ( n > 0 || !inferSbDcSigCoeffFlag ) ) {
    sig_coeff_flag[ xC ][ yC ]                                                                    ae(v)
    if( sig coeff flag[ xC ][ yC ] )
      inferSbDcSigCoeffFlag = 0
  }
  if( sig coeff flag[ xC ][ yC ] ) {
    coeff_sign_flag[ n ]                                                                          ae(v)
    abs_level_gtX_flag[ n ][ 0 ]                                                                  ae(v)
    if( abs level gtX flag[ n ][ 0 ] )
      par_level_flag[ n ]                                                                         ae(v)
  }
  AbsLevelPassX[ xC ][ yC ] =
    sig coeff flag[ xC ][ yC ] + par level flag[ n ] + abs level gtX flag[ n ][ 0 ]
}
/* Greater than X scan passes (numGtXFlags=5) */
for( i = 1; i <= numGtXFlags - 1 && abs level gtX flag[ n ][i - 1]; i++) {
  for( n = numSbCoeff - 1; n >= 0; n- - ) {
    xC = ( xS <<log2SbSize ) + DiagScanOrder[ log2SbSize ][ log2SbSize ][ n ][ 0 ]
    yC = ( yS <<log2SbSize ) + DiagScanOrder[ log2SbSize ][ log2SbSize ][ n ][ 1 ]
    abs level gtX flag[ n ][ i ]                                                                  ae(v)
    AbsLevelPassX[ xC ][ yC ] + =2 * abs level gtX flag[ n ][ i ]
  }
}
/* remainder scan pass */
for( n = numSbCoeff - 1; n >=0; n- - ) {
  xC = ( xS <<log2SbSize ) + DiagScanOrder[ log2SbSize ][ log2SbSize ][ n ][ 0 ]
  yC = ( yS <<log2SbSize ) + DiagScanOrder[ log2SbSize ][ log2SbSize ] [n ][ 1 ]
  if( abs level gtX flag[ n ][ numGtXFlags - 1 ] )
    abs remainder[ n ]                                                                            ae(v)
  TransCoeffLevel[ x0 ][ y0 ][ cIdx ][ xC ][ yC ] = ( 1 - 2 * coeff_sign_flag[ n ] ) *
    ( AbsLevelPassX[ xC ][ yC ] + abs remainder[ n ] )
  }
 }
}
```

Meanwhile, as shown in Table 1 above, according to a VVC standard, before encoding/decoding a residual signal (i.e., residual information), whether the transform of the corresponding block is applied may be transmitted first. That is, before residual information of the current block is parsed, a transform skip flag (i.e., transform_skip_flag) indicating whether transform is applied may be parsed first. The transform skip flag may be referred to as a transform or non transform flag or a transform application flag.

By expressing correlation between residual signals in a transform domain, data is compressed (data compaction) and delivered to the decoding apparatus, but if the correlation between the residual signals is insufficient, data compaction may not occur sufficiently. In this case, the conversion process including the complicated calculation process may be omitted and the residual signal in a pixel domain (spatial domain) may be transmitted to the decoding apparatus. Since the residual signal in the pixel domain to which no transform is applied has different characteristics (e.g., a distribution of residual signals, an absolute level of each residual signal, etc.) from the residual signal in the general transform domain, a residual signal encoding/decoding method for efficiently delivering a signal to the decoding apparatus is proposed.

Figure 6:
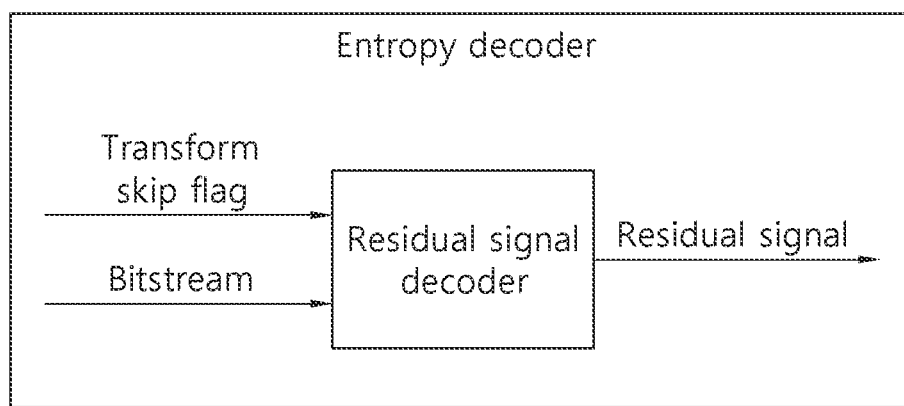
FIG. 6 illustrates a decoding apparatus performing a method for delivering a residual signal of the pixel domain according to the present disclosure.

FIG. 6 exemplarily shows a decoding apparatus for performing the proposed method of transmitting a residual signal of a pixel domain.

The transform skip flag may be transmitted in units of transform blocks. Here, referring to Table 1 above, the transform skip flag may be parsed by limiting it to a specific block size. That is, referring to Table 1 above, the transform skip flag may be parsed only for transform blocks having a block size equal to or less than a specific size. For example, when the size of the current transform block is less than or equal to the 4×4 size, the transform skip flag for the current transform block may be parsed.

In this regard, as an example, this document proposes an embodiment in which the size of a block for determining whether to parse the transform skip flag is variously configured. Specifically, the sizes of Log 2TbWidth and log 2TbHeight may be determined by variables wN and hN, and according to an existing scheme, wN and hN may be selected from one of the following.

wN={2, 3, 4, 5, 6}
hN={2, 3, 4, 5, 6}

That is, wN may be selected from one of 2, 3, 4, 5, and 6, and hN may be selected from one of 2, 3, 4, 5, and 6.

A method of parsing the transform skip flag according to the present embodiment may be represented as shown in the following table.

TABLE 15

```
if( transform_skip_enabled_flag &&
  ( cldx != 0 || cu_mts_flag[ x0 ][ y0 ] == 0 ) &&
    ( log2TbWidth <= wN ) && ( log2TbHeight <= hN ) )
  transform_skip_flag[ x0 ][ y0 ][ cldx ]                ae(v)
```

According to the present embodiment disclosed in Table 15, when log 2TbWidth indicating a width of the current block (i.e., the current transform block) is wN or less, and log 2TbHeight indicating a height of the current block is hN or less, a transform skip flag for the current block may be parsed. A method of decoding the residual signal of the current block may be determined based on the transform skip flag. Through the proposed embodiment, complexity of an entropy decoding process may be reduced and encoding efficiency may be improved by efficiently processing signals having different statistical characteristics.

Alternatively, referring to Table 1 above, an embodiment in which the transform skip flag is parsed by limiting it to a specific block size but a condition for determining whether to parse the transform skip flag are defined as the number of samples of a block, not width and height information of the corresponding block may be proposed. That is, for example, a method of using the product of log 2TbWidth and log 2TbHeight as a condition for determining whether to parse the syntax element transform skip flag of the transform skip flag may be proposed.

log 2TbWidth and log 2TbHeight may be selected from one of the following.

log 2TbWidth={1, 2, 3, 4, 5, 6}
log 2TbHeight={1, 2, 3, 4, 5, 6}

That is, log 2TbWidth may be selected from one of 1, 2, 3, 4, 5, and 6, and log 2TbHeight may be selected from one of 1, 2, 3, 4, 5, and 6.

Figure 7B:
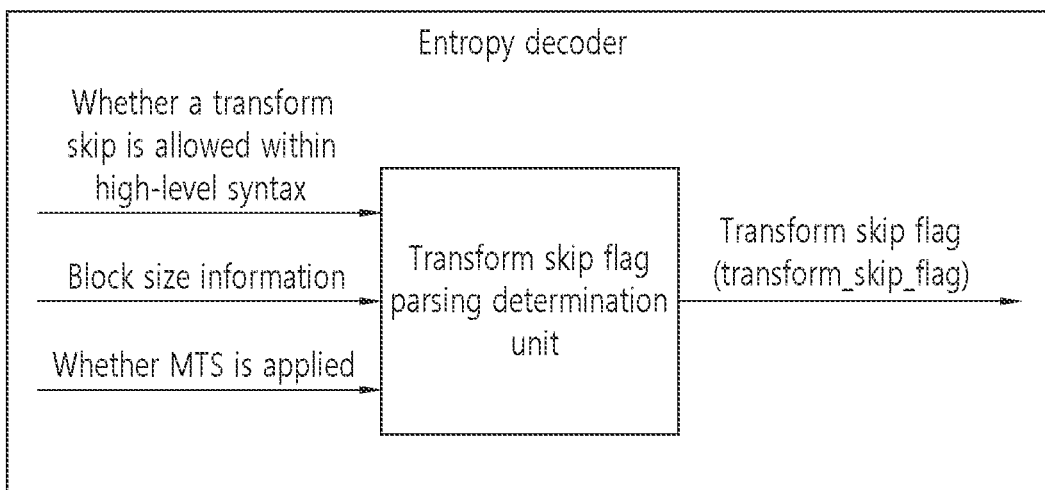

FIGS. 7A and 7B exemplarily show an embodiment of determining whether to parse a transform skip flag based on the number of samples of a current block and a decoding apparatus performing the embodiment.

Referring to FIG. 7A, the decoding apparatus may determine whether determination of whether to skip transform of the current block is allowed in a high level syntax (S700). When it is allowed to determine whether to skip the transform of the current block in the high level syntax, the decoding apparatus may determine whether a value of the syntax element cu_mts_flag is 0 (S710).

When the value of cu_mts_flag is 0, the decoding apparatus may determine whether the product of log 2TbWidth and log 2TbHeight for the current block is equal to or less than a threshold (S720). That is, the decoding apparatus may determine whether the number of samples of the current block is equal to or less than the threshold.

When the product of log 2TbWidth and log 2TbHeight is equal to or less than the threshold, the decoding apparatus may parse the value of the syntax element transform skip flag of the transform skip flag as 1 (S730).

Meanwhile, when the conditions of steps S700 to S720 are not met, the decoding apparatus may derive the value of the syntax element transform skip flag of the transform skip flag as 0 (S740).

FIG. 7B exemplarily shows a decoding apparatus for performing the embodiment of determining whether to transform the block by the number of samples in the block.

Referring to FIG. 7B, the decoding apparatus may determine whether to parse the transform skip flag for the block based on whether transform skip is allowed in the high level syntax, block size information, and whether MTS is applied.

In a case in which whether to transform is determined based on the number of samples in the block, blocks having various shapes may be included in a transform exclusion block than controlling whether to transform by the width and height of the block. For example, if both log 2TbWidth and log 2TbHeight are defined as 2 in the embodiment of controlling whether to transform with the width and height of the block described above, only a block having a size of 2×4, a block having a size of 4×2, and a block having a size of 4×4 may be included in the transform exclusion block. However, if whether to transform is controlled by the number of samples, a block having a size of 2×8 and a block having a size of 8×2 may also be included as a transform exclusion block.

A method of decoding a residual signal may be determined based on the transform skip flag. In addition, by efficiently processing signals having different statistical characteristics through the proposed embodiment, complexity in the entropy decoding process may be reduced and encoding efficiency may be improved.

For example, an embodiment of encoding and decoding a residual signal in the following in consideration of statistical characteristics in a case where no transform is applied to the residual signal for the current block may be proposed.

In general, in case of a transform block to which transform is applied and quantized (i.e., transform coefficients to which transform is applied and quantized), energy is concentrated near top-left of the transform block by the transform and a level of energy decreases in a direction toward a bottom-right (high frequency region) by quantization. In consideration of the aforementioned characteristics, a diagonal scanning technique has been introduced for efficient residual encoding as shown in FIG. 5. However, in the case of the transform skip block, that is, the transform block including the residual coefficients to which the transform is not applied, energy may be uniformly present throughout the block without being concentrated on the top-left corner and the size of the level is also random. Therefore, it may be inefficient to encode using the diagonal scanning technique. Thus, this embodiment proposes a residual scanning scheme suitable for the transform skip block characteristics. Here, the residual coefficients may refer to the transform coefficients.

In addition, as another feature of the transform skip block, when a prediction mode applied to the transform skip block to be currently coded is an intra prediction mode, the size of residual samples increases in a direction toward the bottom-right in which a distance between a prediction sample and a reference sample is large. In consideration of these properties, the present embodiment proposes a method in which residual signals are rearranged and encoded so that they may be scanned from the top-left of the transform block and the decoding apparatus parses the residual signals and rearranges them back to their original positions. That is, this embodiment proposes a method in which the residual signals are rearranged and encoded so that a residual signal having a large size may be scanned from top-left of the transform block and the decoding apparatus parses the residual signals and rearranges them back to their original positions. As a similar effect, a method of defining a new scanning method in the residual signal encoding and decoding step may be considered. However, when the residual signals are rearranged as in the method proposed in this embodiment, the existing residual encoding module may be used without modification.

A point to consider when rearranging the residuals while maintaining the existing residual coding module is that the scanning order should be defined from the top-left region to the bottom-right region.

As an example of the rearrangement method, a method of rotating the current block by 180 degrees may be defined.

Figure 8:
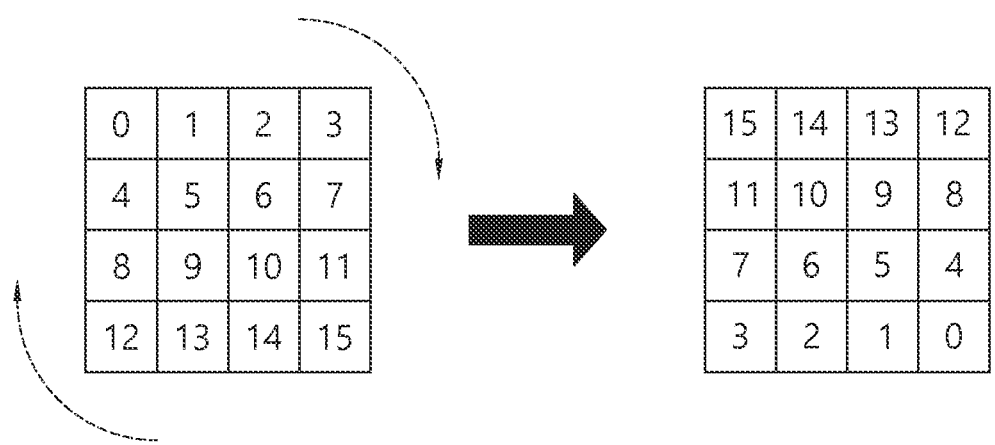
FIG. 8 exemplarily shows residual coefficients of a current block to which a rearrangement method of rotating 180 degrees is applied.

FIG. 8 exemplarily shows residual coefficients of a current block to which a rearrangement method of rotation by 180 degrees is applied.

The numbers in the current block shown in FIG. 8 indicate pixel positions in the block in raster scanning order. Referring to FIG. 8, the residual coefficients in the top-left positions may be rearranged to the bottom-right positions, which are positions rotated by 180 degrees. Referring to FIG. 8, the residual coefficients may be rearranged to positions symmetrical with respect to the center of the transform block through the rearrangement process rotated by 180 degrees. After the rearrangement, a general residual coefficient scanning order may be applied, and due to the rearrangement, the residual coefficients located at the bottom-right may be considered first, and the residual coefficients located at the top-left may be scanned later due to the rearrangement.

Alternatively, as another example of the rearrangement method, a method of mirroring the current block may be defined. Meanwhile, the method may be divided into antidiagonal mirroring and main diagonal mirroring according to a direction of mirroring.

Figure 9:
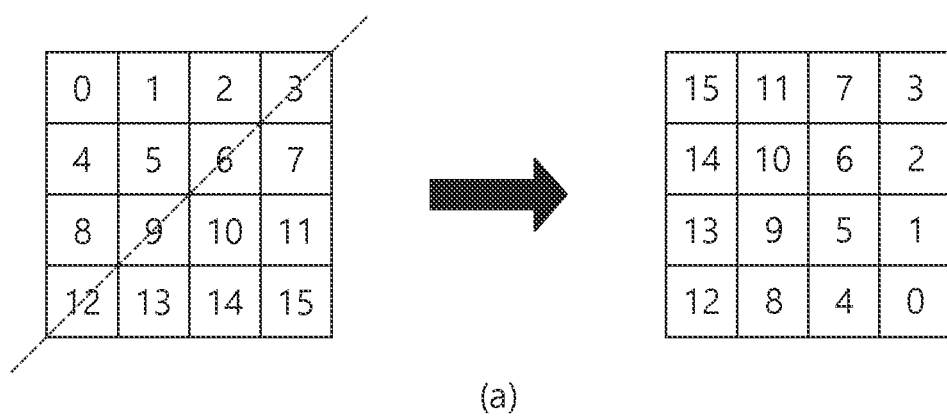
FIG. 9 exemplarily shows residual coefficients of a current block to which a mirroring rearrangement method is applied.
Figure 9:
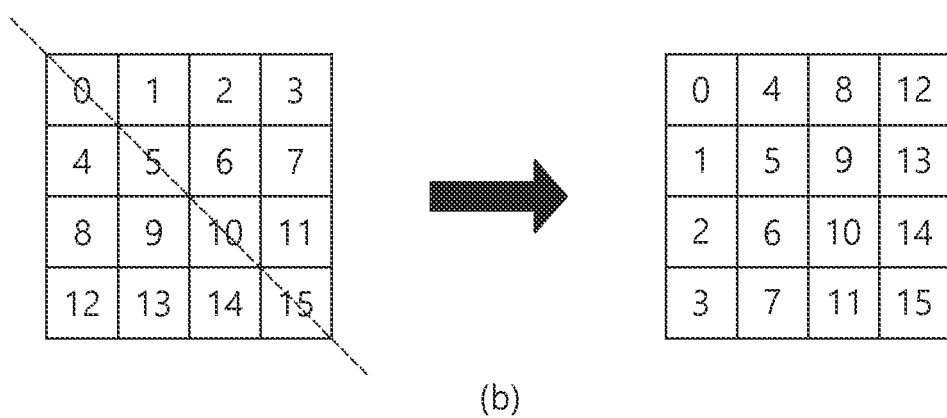

FIG. 9 exemplarily shows residual coefficients of a current block to which a mirroring rearrangement method is applied. (a) of FIG. 9 illustrates an example of rearranging the residual coefficients of the current block by antidiagonal mirroring, and (b) of FIG. 9 illustrates an example of rearranging the residual coefficients of the current block by main diagonally mirroring the main diagonal.

Referring to (a) of FIG. 9, the residual coefficients may be rearranged to positions symmetrical with respect to the right-upward diagonal of the current block through the rearrangement process of antidiagonal mirroring. Here, the right-upward diagonal may represent a diagonal in a right-upward direction passing through the center of the current block. For example, the residual coefficients at the top-left positions may be rearranged to the bottom-right positions, which are antidiagonally mirrored positions. Also, for example, #1 residual coefficient (i.e., a residual coefficient adjacent to the right of a residual coefficient of the top-left position) may be rearranged to a position adjacent to bottom-right position which is the antidiagonally mirrored position. That is, when the width and height of the current block are 4 and an x component and a y component at the top-left sample position of the current block are 0, the residual coefficient at the position (1, 0) is may be rearranged to a position (3, 3) which is an antidiagonally mirrored position.

Also, referring to (b) of FIG. 9, the residual coefficients may be rearranged to positions symmetrical with respect to the left-upward diagonal of the current block. through the rearrangement process of the main diagonal mirroring. Here, the left-upward diagonal may indicate a left-upward diagonal passing through the center of the current block. For example, the residual coefficients in the top-right positions may be rearranged to the bottom-left positions, which are main diagonally mirrored positions. Also, for example, #1 residual coefficient (i.e., a residual coefficient adjacent to the right of the residual coefficient in the top-left position) may be rearranged to a position adjacent to the lower side of the top-left position, which is a main diagonally mirrored position. That is, when the width and height of the current block are 4 and the x component and the y component of the top-left sample position of the current block are 0, the residual coefficient in the position (1, 0) may be rearranged to the (0, 1) position, which is the main diagonally mirrored position.

Alternatively, as another example of the rearrangement method, a method of flipping the current block may be defined. Meanwhile, a vertical flip and a horizontal flip may be separately defined according to an axis used as a reference for flipping.

Figure 10:
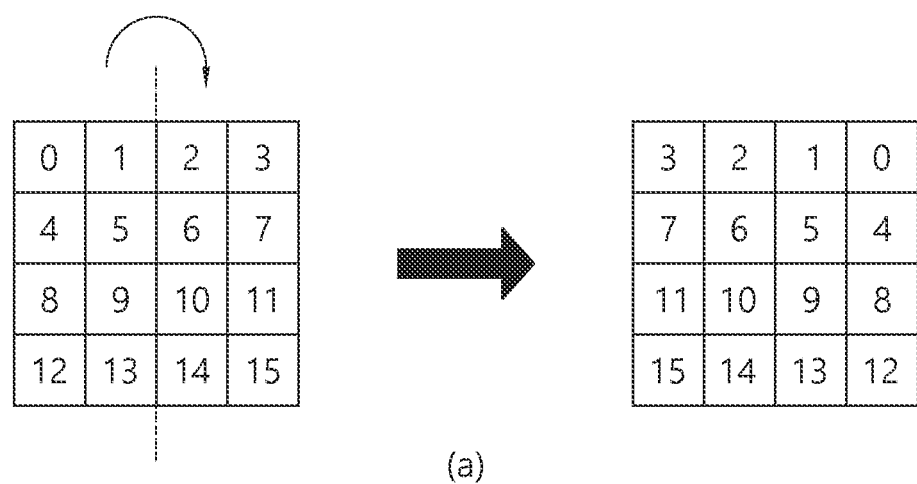
FIG. 10 exemplarily shows residual coefficients of a current block to which a flip rearrangement method is applied.
Figure 10:
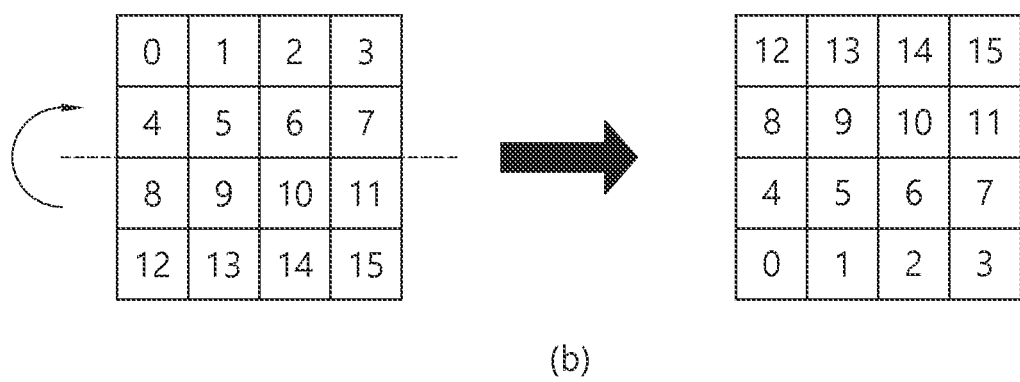

FIG. 10 exemplarily shows residual coefficients of a current block to which a flip rearrangement method is applied. (a) of FIG. 10 illustrates an example of rearranging the residual coefficients of the current block by vertically flipping, and FIG. 9B illustrates an example of rearranging the residual coefficients of the current block by horizontal flipping.

Referring to (a) of FIG. 10, the residual coefficients may be rearranged to positions symmetrical with respect to a vertical axis of the current block through a vertical flip rearrangement process. Here, the vertical axis may represent a vertical line passing through the center of the current block. For example, residual coefficients in top-left positions may be rearranged to top-right positions, which are vertically flipped positions. Also, for example, #1 residual coefficient (i.e., a residual coefficient adjacent to the right of a residual coefficient in the top-left position) may be rearranged to a position adjacent to the left of the top-right position, which is the vertically-flipped position. That is, when the width and height of the current block are 4, and the x component and the y component of the top-left sample position of the current block are 0, a residual coefficient in the position (1, 0) may be rearranged to a (2, 0) position, which is the vertically flipped position.

Also, referring to (b) of FIG. 10, the residual coefficients may be rearranged to positions symmetrical with respect to the horizontal axis of the transform block through a rearrangement process of horizontal flipping. Here, the horizontal axis may represent a horizontal line passing through the center of the current block. For example, the residual coefficients in the top-right positions may be rearranged to the bottom-right positions, which are horizontally flipped positions. Also, for example, #1 residual coefficient (i.e., a residual coefficient adjacent to the right of the residual coefficient in the top-left position) may be rearranged to a position adjacent to the right of the bottom-left position, which is a horizontally flipped position. That is, when the width and height of the current block are 4 and the x component and the y component of the top-left sample position of the current block are 0, the residual coefficient of the position (1, 0) may be rearranged to (1, 3) position, which is the horizontally flipped position.

Alternatively, as another example of the rearrangement method, a method of rearranging residual coefficients of a current block according to a distance to a reference sample of intra prediction may be proposed. For example, layers may be defined in a TU according to a distance between the reference sample and a prediction block, and the encoding apparatus may determine whether to scan the residual coefficients in each layer transverse-first scan or longitudinal-first scan, and may rearrange the residual coefficients in reverse raster order (from right to left, from bottom to top) according to the scanned order. That is, the layers of the current block may be defined based on the distance to the reference sample, and the encoding apparatus/decoding apparatus may determine the scanning order of residual coefficients in each layer as a transverse-first scan or a longitudinal-first scan and rearrange the residual coefficients in reverse raster order (from right to left, from bottom to top) according to the scanned order. Meanwhile, the decoding apparatus may derive the existing residual coefficients by performing the above-described rearrangement process in reverse order.

Figure 11:
FIG. 11 exemplarily shows residual coefficients of a current block to which the embodiment in which a layer distinguished based on a distance to a reference sample is derived and rearranged in a position according to a reverse raster order is applied.
Figure 11:

FIG. 11 exemplarily shows residual coefficients of a current block to which the above embodiment is applied, in which layers divided based on a distance from a reference sample are derived and rearranged in positions according to a reverse raster order. (a) of FIG. 11 illustrates an example in which residual coefficients in each layer are rearranged at positions according to a reverse raster order in the transverse-first scanned order, and (b) of FIG. 11 illustrates an example in which residual coefficients in each layer are rearranged at positions according to a reverse raster order in a longitudinal-first scanning order.

Referring to FIG. 11, the layers of the current block include a first layer adjacent to at least one reference sample, a second layer having a distance of 1 to the nearest reference sample, a third layer having a distance of 2 to the nearest reference sample, and a fourth layer having a distance of 3 to the nearest reference sample. That is, the first layer may include residual coefficients adjacent to at least one reference sample (e.g., #0 to #4 residual coefficients, #8 residual coefficient, and #12 residual coefficient of the current block before rearrangement illustrated in FIG. 11) (in other words, the first layer may include residual coefficients having a distance of 1 to the nearest reference sample), the second layer may include residual coefficients having a distance of 2 to the nearest reference sample (e.g., #5 to #7 residual coefficients, #9 residual coefficient, and #13 residual coefficient of the current block before the rearrangement illustrated in FIG. 11), the third layer may include residual coefficients having a distance of 3 to the nearest reference sample (e.g., #10 and #11 residual coefficients and #14 residual coefficient of the current block before the rearrangement illustrated in FIG. 11), and the fourth layer may include a residual coefficient having a distance of 4 to the nearest reference sample (e.g., #15 residual coefficient of the current block before the rearrangement illustrated in FIG. 11).

When the layers for the current block are defined as described above, the encoding apparatus may determine one of a transverse-first scan and a longitudinal-first scan as a scan method for the layers of the current block.

For example, when the transverse-first scan is determined as the scan method for the layers of the current block, rearrangement of the residual coefficients may be performed as shown in (a) of FIG. 11.

Specifically, the encoding apparatus may scan from the first layer to the fourth layer in order, may scan from the residual coefficients at the top-left positions to the longitudinal side in the corresponding layer, may scan all the residual coefficients on the transverse side, and may scan the remaining residual coefficients on the longitudinal side from top to bottom.

For example, the transverse residual coefficients in the first layer may include #0 to #3 residual coefficients, and the longitudinal residual coefficients in the first layer may include #4 residual coefficient, #8 residual coefficient, and #12 residual coefficient. The encoding apparatus/decoding apparatus may scan the transverse residual coefficients in the first layer in order from left to right (scan in order of #1, #2, and #3 residual coefficients), and thereafter, the encoding apparatus/decoding apparatus may scan the longitudinal residual coefficients in the first layer in order from top to bottom (scan in order of #4, #8, and #12 residual coefficients). Next, the second layer may be scanned. The transverse residual coefficients in the second layer may include #5 to #7 residual coefficients, and the longitudinal residual coefficients in the second layer may include #9 and #13 residual coefficients. The encoding apparatus may scan the transverse residual coefficients in the second layer from left to right (scan in order of #5, #6, and #7 residual coefficients), and then scan the transverse residual coefficients in the second layer from top to bottom (scan in order of #9 and #13 residual coefficients). Next, the third layer may be scanned. The transverse residual coefficients in the third layer may include #10 and #11 residual coefficients, and the longitudinal residual coefficients in the third layer may include #14 residual coefficient. The encoding apparatus may scan the transverse residual coefficients in the third layer in order from left to right (scan in order of #10 and #11 residual coefficients), and then scan the longitudinal residual coefficients in the third layer from top to bottom (scan in order of #14 residual coefficient). Next, the fourth layer may be scanned. The transverse residual coefficients in the fourth layer may include #15 residual coefficient. The encoding apparatus may scan the transverse residual coefficient in the fourth layer in order from left to right (scan #15 residual coefficient).

Thereafter, referring to (a) of FIG. 11, the encoding apparatus may rearrange the residual coefficients in the scanned order at positions according to the reverse raster order (from right to left, from bottom to top). The scanned order of the residual coefficients may be an order #0, #1, #2, #3, #4, #8, #12, #5, #6, #7, #9, #13, #10, #11, #14, and #15 residual coefficients. The residual coefficients may be rearranged to positions according to the reverse raster order in the current block in the scanned order. For example, #0 residual coefficient may be rearranged in the bottom-right position, the #1, #2, and #3 residual coefficients may be rearranged in the leftward direction of the bottom-right position, #4, #8, #12, and #5 residual coefficients may be rearranged in order from the right to the left in an upper row (i.e., third row of the current block) of the bottom-right positions, #6, #7, #9, and #13 residual coefficients may be rearranged in order from the right to the left in a second row of the current block, and #10, #11, #14, and #15 residual coefficients may be rearranged in order from the right to the left in a first row of the current block.

Also, for example, when the longitudinal-first scan is determined as a scan method for the layers of the current block, rearrangement of the residual coefficients is performed as shown in (b) of FIG. 11.

Specifically, the encoding apparatus may scan from the first layer to the fourth layer in order, may scan from the residual coefficients at the top-left positions to the longitudinal side in the corresponding layer, may scan all the residual coefficients on the longitudinal side, and may scan the remaining residual coefficients on the longitudinal side from top to bottom.

For example, the longitudinal residual coefficients in the first layer may include #0 residual coefficient, #4 residual coefficient, #8 residual coefficient, and #12 residual coefficient in the first layer, and the transverse residual coefficients in the first layer may include #1 to #3 residual coefficients. The encoding apparatus may scan the longitudinal residual coefficients in the first layer in order from top to bottom (scan in order of #0, #4, #8, and #12 residual coefficients), and thereafter, the encoding apparatus may scan the transverse residual coefficients in the first layer from left to right (scan in order of #1, #2, and #3 residual coefficients). Next, the second layer may be scanned. The longitudinal residual coefficients in the second layer may include #5, #9, and #13 residual coefficients and the transverse residual coefficients in the second layer may include #6 and #7 residual coefficients. The encoding apparatus may scan the longitudinal residual coefficients in the second layer in order from top to bottom (scan #5, #9, and #13 residual coefficients in order), and then scan the transverse residual coefficients in the second layer from left to right (scan in order of #6 and #7 residual coefficients). Next, the third layer may be scanned. The longitudinal residual coefficients in the third layer may include #10 and #14 residual coefficients, and the transverse residual coefficients in the third layer may include #11 residual coefficient. The encoding apparatus may scan the longitudinal residual coefficients in the third layer from top to bottom (scans in order of #10 and #14 residual coefficients), and then scan the transverse residual coefficients in the third layer from left to right (scan in order of #11 residual coefficient). Next, the fourth layer may be scanned. The longitudinal residual coefficient in the fourth layer may include #15 residual coefficient. The encoding apparatus may scan the longitudinal residual coefficients in the fourth layer from the top to the bottom in order of the #15 residual coefficient.

Thereafter, referring to (b) of FIG. 11, the encoding apparatus may rearrange the residual coefficients in the scanned order at positions according to a reverse raster order (from right to left, from bottom to top). The scanned order of the residual coefficients may be order of #0, #4, #8, #12, #1, #2, #3, #5, #9, #13, #6, #7, #10, #14, #11, and #15 residual coefficients. The residual coefficients may be rearranged to positions according to the reverse raster order in the current block in the scanned order. For example, #0 residual coefficient may be rearranged at a bottom-right position, and #4, #8, and #12 residual coefficients may be rearranged in the leftward direction of the bottom-right position, #1, #2, #3, and #5 residual coefficients may be rearranged in order from the right to the left in an upper row (third row of the current block) of the bottom-right position, #9, #13, #6, and #7 residual coefficients may be rearranged in order from the right to the left in a second row of the current block, and #10, #14, #11, and #15 residual coefficients may be rearranged in order from the right to the left in a first row of the current block.

Alternatively, another embodiment of rearranging the residual coefficients of the current block according to a distance from a reference sample of intra prediction may be proposed. For example, layers may be defined in a TU according to a distance between the reference sample and a prediction block, and the encoding apparatus may determine whether to scan the residual coefficients in each layer transverse-first scan or longitudinal-first scan, and may rearrange the residual coefficients in diagonal scanning order according to the scanned order. That is, the layers of the current block may be defined based on the distance to the reference sample, and the encoding apparatus may determine the scanning order of residual coefficients in each layer as a transverse-first scan or a longitudinal-first scan and rearrange the residual coefficients to positions in diagonal scanning order according to the scanned order. Meanwhile, the decoding apparatus may derive the existing residual coefficients by performing the above-described rearrangement process in reverse order.

Figure 12:
FIG. 12 exemplarily shows residual coefficients of a current block to which the embodiment in which a layer distinguished based on a distance to a reference sample is derived and rearranged in a position according to a diagonal scanning order is applied.
Figure 12:

FIG. 12 exemplarily shows residual coefficients of a current block to which the above embodiment is applied, in which layers divided based on a distance from a reference sample are derived and rearranged in positions according to a diagonal scanning order. (a) of FIG. 12 illustrates an example in which residual coefficients in each layer are rearranged at positions according to a diagonal scanning order in the transverse-first scanned order, and (b) of FIG. 12 illustrates an example in which residual coefficients in each layer are rearranged at positions according to a diagonal scanning order in a longitudinal-first scanning order.

Referring to FIG. 12, the layers of the current block include a first layer adjacent to at least one reference sample, a second layer having a distance of 1 to the nearest reference sample, a third layer having a distance of 2 to the nearest reference sample, and a fourth layer having a distance of 3 to the nearest reference sample. That is, the first layer may include residual coefficients adjacent to at least one reference sample (e.g., #0 to #4 residual coefficients, #8 residual coefficient, and #12 residual coefficient of the current block before rearrangement illustrated in FIG. 12) (in other words, the first layer may include residual coefficients having a distance of 1 to the nearest reference sample), the second layer may include residual coefficients having a distance of 2 to the nearest reference sample (e.g., #5 to #7 residual coefficients, #9 residual coefficient, and #13 residual coefficient of the current block before the rearrangement illustrated in FIG. 12), the third layer may include residual coefficients having a distance of 3 to the nearest reference sample (e.g., #10 and #11 residual coefficients and #14 residual coefficient of the current block before the rearrangement illustrated in FIG. 12), and the fourth layer may include a residual coefficient having a distance of 4 to the nearest reference sample (e.g., #15 residual coefficient of the current block before the rearrangement illustrated in FIG. 12).

When the layers for the current block are defined as described above, the encoding apparatus may determine one of a transverse-first scan and a longitudinal-first scan as a scan method for the layers of the current block.

For example, when the transverse-first scan is determined as the scan method for the layers of the current block, rearrangement of the residual coefficients may be performed as shown in (a) of FIG. 12.

Specifically, the encoding apparatus may scan from the first layer to the fourth layer in order, may scan from the residual coefficients at the top-left positions to the longitudinal side in the corresponding layer, may scan all the residual coefficients on the transverse side, and may scan the remaining residual coefficients on the longitudinal side from top to bottom.

For example, the transverse residual coefficients in the first layer may include #0 to #3 residual coefficients, and the longitudinal residual coefficients in the first layer may include #4 residual coefficient, #8 residual coefficient, and #12 residual coefficient. The encoding apparatus may scan the transverse residual coefficients in the first layer in order from left to right (scan in order of #1, #2, and #3 residual coefficients), and thereafter, the encoding apparatus/decoding apparatus may scan the longitudinal residual coefficients in the first layer in order from top to bottom (scan in order of #4, #8, and #12 residual coefficients). Next, the second layer may be scanned. The transverse residual coefficients in the second layer may include #5 to #7 residual coefficients, and the longitudinal residual coefficients in the second layer may include #9 and #13 residual coefficients. The encoding apparatus may scan the transverse residual coefficients in the second layer from left to right (scan in order of #5, #6, and

7 residual coefficients), and then scan the transverse residual coefficients in the second layer from top to bottom (scan in order of #9 and #13 residual coefficients). Next, the third layer may be scanned. The transverse residual coefficients in the third layer may include #10 and #11 residual coefficients, and the longitudinal residual coefficients in the third layer may include #14 residual coefficient. The encoding apparatus may scan the transverse residual coefficients in the third layer in order from left to right (scan in order of #10 and #11 residual coefficients), and then scan the longitudinal residual coefficients in the third layer from top to bottom (scan in order of #14 residual coefficient). Next, the fourth layer may be scanned. The transverse residual coefficients in the fourth layer may include #15 residual coefficient. The encoding apparatus may scan the transverse residual coefficient in the fourth layer in order from left to right (scan #15 residual coefficient).

Thereafter, referring to (a) of FIG. 12, the encoding apparatus may rearrange the residual coefficients in the scanned order at positions according to the diagonal scanning order (from top-right to bottom-left, from bottom-right to top-left). The scanned order of the residual coefficients may be an order #0, #1, #2, #3, #4, #8, #12, #5, #6, #7, #9, #13, #10, #11, #14, and #15 residual coefficients. The residual coefficients may be rearranged to positions according to the diagonal scanning order in the current block in the scanned order. For example, #0 residual coefficient may be rearranged at the bottom-right position positioned on the first top-right diagonal, #1 and #2 residual coefficients may be rearranged in order from the top-right side to top-left side in a second top-right diagonal (i.e., top-left side top-rightward diagonal of the first top-right diagonal) of the current block, #3, #4, and #8 residual coefficients may be rearranged in order from the top-right side to top-left side in a third top-rightward diagonal (i.e., top-left side top-rightward diagonal of the second top-right diagonal), #12, #5, #6, and #7 residual coefficients may be rearranged in order from the top-right side to top-left side in a fourth top-rightward diagonal (i.e., top-left side top-rightward diagonal of the third top-right diagonal), #9, #13, and #10 residual coefficients may be rearranged in order from the top-right side to top-left side in a fifth top-rightward diagonal (i.e., top-left side top-rightward diagonal of the fourth top-right diagonal), #11 and #14 residual coefficients may be rearranged in order from the top-right side to top-left side in a sixth top-rightward diagonal (i.e., top-left side top-rightward diagonal of the fifth top-right diagonal), and #15 residual coefficient may be rearranged at a top-left position positioned in a seventh top-rightward diagonal (i.e., top-left side top-rightward diagonal of the sixth top-right diagonal).

Also, for example, when the longitudinal-first scan is determined as a scan method for the layers of the current block, rearrangement of the residual coefficients is performed as shown in (b) of FIG. 12.

Specifically, the encoding apparatus may scan from the first layer to the fourth layer in order, may scan from the residual coefficients at the top-left positions to the longitudinal side in the corresponding layer, may scan all the residual coefficients on the longitudinal side, and may scan the remaining residual coefficients on the longitudinal side from top to bottom.

For example, the longitudinal residual coefficients in the first layer may include #0 residual coefficient, #4 residual coefficient, #8 residual coefficient, and #12 residual coefficient in the first layer, and the transverse residual coefficients in the first layer may include #1 to #3 residual coefficients. The encoding apparatus may scan the longitudinal residual coefficients in the first layer in order from top to bottom (scan in order of #0, #4, #8, and #12 residual coefficients), and thereafter, the encoding apparatus may scan the transverse residual coefficients in the first layer from left to right (scan in order of #1, #2, and #3 residual coefficients). Next, the second layer may be scanned. The longitudinal residual coefficients in the second layer may include #5, #9, and #13 residual coefficients and the transverse residual coefficients in the second layer may include #6 and #7 residual coefficients. The encoding apparatus may scan the longitudinal residual coefficients in the second layer in order from top to bottom (scan #5, #9, and #13 residual coefficients in order), and then scan the transverse residual coefficients in the second layer from left to right (scan in order of #6 and #7 residual coefficients). Next, the third layer may be scanned. The longitudinal residual coefficients in the third layer may include #10 and #14 residual coefficients, and the transverse residual coefficients in the third layer may include #11 residual coefficient. The encoding apparatus may scan the longitudinal residual coefficients in the third layer from top to bottom (scans in order of #10 and #14 residual coefficients), and then scan the transverse residual coefficients in the third layer from left to right (scan in order of #11 residual coefficient). Next, the fourth layer may be scanned. The longitudinal residual coefficient in the fourth layer may include #15 residual coefficient. The encoding apparatus may scan the longitudinal residual coefficients in the fourth layer from the top to the bottom in order of the #15 residual coefficient.

Thereafter, referring to (b) of FIG. 12, the encoding apparatus may rearrange the residual coefficients in the scanned order at positions according to a diagonal scanning order (from top-right to bottom-left, from bottom-right to top-left). The scanned order of the residual coefficients may be order of #0, #4, #8, #12, #1, #2, #3, #5, #9, #13, #6, #7, #10, #14, #11, and #15 residual coefficients. The residual coefficients may be rearranged to positions according to the diagonal scan in the current block in the scanned order. For example, #0 residual coefficient may be rearranged at the bottom-right position positioned on the first top-right diagonal, #4 and #8 residual coefficients may be rearranged in order from the top-right side to top-left side in a second top-right diagonal (i.e., top-left side top-rightward diagonal of the first top-right diagonal) of the current block, #12, #1, and #2 residual coefficients may be rearranged in order from the top-right side to top-left side in a third top-rightward diagonal (i.e., top-left side top-rightward diagonal of the second top-right diagonal), #3, #5, #9, and #13 residual coefficients may be rearranged in order from the top-right side to top-left side in a fourth top-rightward diagonal (i.e., top-left side top-rightward diagonal of the third top-right diagonal), #6, #7, and #10 residual coefficients may be rearranged in order from the top-right side to top-left side in a fifth top-rightward diagonal (i.e., top-left side top-rightward diagonal of the fourth top-right diagonal), #14 and #11 residual coefficients may be rearranged in order from the top-right side to top-left side in a sixth top-rightward diagonal (i.e., top-left side top-rightward diagonal of the fifth top-right diagonal), and #15 residual coefficient may be rearranged at a top-left position positioned in a seventh top-rightward diagonal (i.e., top-left side top-rightward diagonal of the sixth top-right diagonal).

Alternatively, another embodiment of rearranging the residual coefficients of the current block according to a distance from a reference sample of intra prediction may be proposed. For example, a method of setting a reference sample (a left reference sample or a top reference sample) as a reference, defining layers of the current block based on a distance from the set reference sample, scanning residual coefficients, and subsequently rearranging the residual coefficients at positions according to a diagonal scanning order in a scanned order may be proposed. Here, the residual coefficients in the layer defined based on the distance from the left reference sample may be scanned by a longitudinal-first scan, and the residual coefficients within the layer defined based on the distance from the top reference sample may be scanned with a transverse-first scan.

Figure 13:
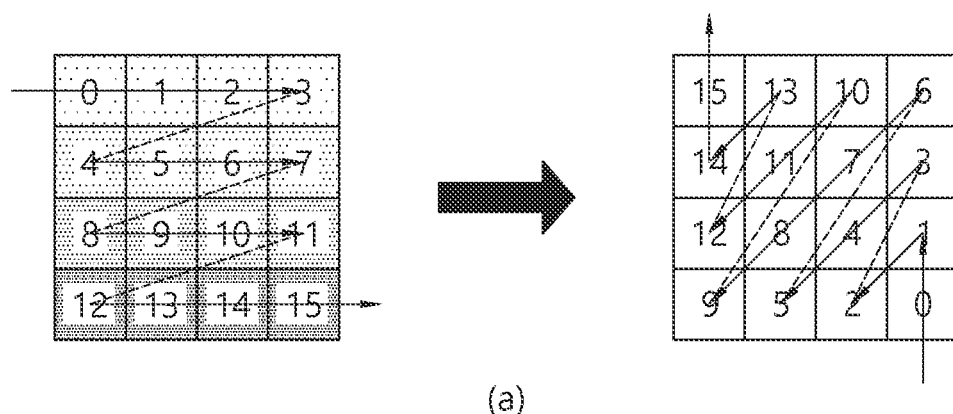
FIG. 13 exemplarily shows residual coefficients of a current block to which the embodiment in which a layer distinguished based on a distance to a specific reference sample is derived and rearranged in a position according to a diagonal scanning order is applied.
Figure 13:
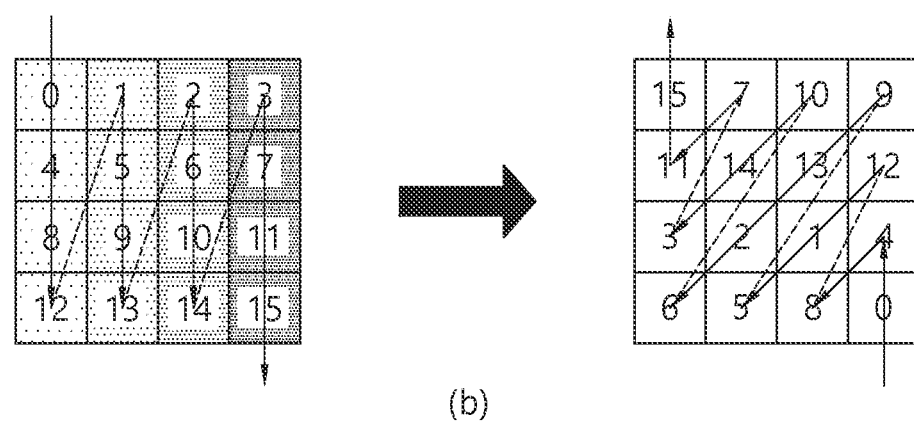

FIG. 13 exemplarily shows residual coefficients of a current block to which the above embodiment is applied, in which layers divided based on a distance from a specific reference sample are derived and rearranged in positions according to a diagonal scanning order. (a) of FIG. 13 illustrates an example in which residual coefficients in a layer set based on the distance from the top reference sample are rearranged at positions according to a diagonal scanning order in the transverse-first scanned order, and (b) of FIG. 13 illustrates an example in which residual coefficients in a layer set based on the distance to the top reference sample are rearranged at positions according to a diagonal scanning order in a longitudinal-first scanning order. Meanwhile, the decoding apparatus may derive the existing residual coefficients by performing the above-described rearrangement process in a reverse order.

Referring to (a) of FIG. 13, the layers of the current block include a first layer adjacent to at least one top reference sample, a second layer having a distance of 1 to the nearest top reference sample, a third layer having a distance of 2 to the nearest top reference sample, and a fourth layer having a distance of 3 to the nearest top reference sample. That is, the first layer may include residual coefficients adjacent to at least one top reference sample (e.g., #0 to #3 residual coefficients of the current block before rearrangement illustrated in (a) FIG. 13) (in other words, the first layer may include residual coefficients having a distance of 1 to the nearest top reference sample), the second layer may include residual coefficients having a distance of 2 to the nearest top reference sample (e.g., #4 to #7 residual coefficients of the current block before the rearrangement illustrated in (a) FIG. 13), the third layer may include residual coefficients having a distance of 3 to the nearest top reference sample (e.g., #8 and #11 residual coefficients of the current block before the rearrangement illustrated in (a) of FIG. 13), and the fourth layer may include a residual coefficient having a distance of 4 to the nearest top reference sample (e.g., #15 residual coefficient of the current block before the rearrangement illustrated in (a) FIG. 13). In other words, the first layer may be derived as a first row of the current block, the second layer may be derived as a second row of the current block, the third layer may be derived as a third row of the current block, and the fourth layer may be derived as a fourth row of the current block.

When the layers for the current block are defined as described above, the encoding apparatus may determine a scanning method for the layers of the current block as a transverse-first scan. Thereafter, as shown in (a) of FIG. 13, rearrangement of the residual coefficients may be performed.

Specifically, the encoding apparatus may scan from the first layer to the fourth layer in order, and in the corresponding layer, may scan from the residual coefficient of the left position to the right.

As an example, the encoding apparatus may scan may scan the residual coefficients in the first layer in order from left to right (scan in order of #0, #1, #2, and #3 residual coefficients). Next, the second layer may be scanned. The encoding apparatus may scan the residual coefficients in the second layer from left to right (scan in order of #4, #5, #6, and #7 residual coefficients). Next, the third layer may be scanned. The encoding apparatus may scan the residual coefficients in the third layer in order from left to right (scan in order of #8, #9, #10 and #11 residual coefficients). Next, the fourth layer may be scanned. The encoding apparatus may scan the residual coefficients in the fourth layer in order from left to right (scan #13, #14, and #15 residual coefficients).

Thereafter, referring to (a) of FIG. 13, the encoding apparatus may rearrange the residual coefficients in the scanned order at positions according to the diagonal scanning order (from top-right to bottom-left, from bottom-right to top-left). The scanned order of the residual coefficients may be an order #0, #1, #2, #3, #4, #5, #6, #7, #8, #9, #10, #11, #12, #13, #14, and #15 residual coefficients. The residual coefficients may be rearranged to positions according to the diagonal scanning order in the current block in the scanned order. For example, #0 residual coefficient may be rearranged at the bottom-right position positioned on the first top-right diagonal, #1 and #2 residual coefficients may be rearranged in order from the top-right side to top-left side in a second top-right diagonal (i.e., top-left side top-rightward diagonal of the first top-right diagonal) of the current block, #3, #4, and #5 residual coefficients may be rearranged in order from the top-right side to top-left side in a third top-rightward diagonal (i.e., top-left side top-rightward diagonal of the second top-right diagonal), #6, #7, #8, and #9 residual coefficients may be rearranged in order from the top-right side to top-left side in a fourth top-rightward diagonal (i.e., top-left side top-rightward diagonal of the third top-right diagonal), #10, #11, and #12 residual coefficients may be rearranged in order from the top-right side to top-left side in a fifth top-rightward diagonal (i.e., top-left side top-rightward diagonal of the fourth top-right diagonal), #13 and #14 residual coefficients may be rearranged in order from the top-right side to top-left side in a sixth top-rightward diagonal (i.e., top-left side top-rightward diagonal of the fifth top-right diagonal), and #15 residual coefficient may be rearranged at a top-left position positioned in a seventh top-rightward diagonal (i.e., top-left side top-rightward diagonal of the sixth top-right diagonal).

Also, referring to (b) of FIG. 13, the layers of the current block include a first layer adjacent to at least one left reference sample, a second layer having a distance of 1 to the nearest left reference sample, a third layer having a distance of 2 to the nearest left reference sample, and a fourth layer having a distance of 3 to the nearest left reference sample. That is, the first layer may include residual coefficients adjacent to at least one left reference sample (e.g., #0, #4, #8, and #12 residual coefficients of the current block before rearrangement illustrated in (b) FIG. 13) (in other words, the first layer may include residual coefficients having a distance of 1 to the nearest left reference sample), the second layer may include residual coefficients having a distance of 2 to the nearest left reference sample (e.g., #1, #5, #9, and #13 residual coefficients of the current block before the rearrangement illustrated in (v) FIG. 13), the third layer may include residual coefficients having a distance of 3 to the nearest left reference sample (e.g., #2, #6, #10, and #14 residual coefficients of the current block before the rearrangement illustrated in (b) FIG. 13), and the fourth layer may include a residual coefficient having a distance of 4 to the nearest left reference sample (e.g., #3, #7, #11, and #15 residual coefficients of the current block before the rearrangement illustrated in (b) FIG. 13). In other words, the first layer may be derived as a first column of the current block, the second layer may be derived as a second column of the current block, the third layer may be derived as a third column of the current block, and the fourth layer may be derived as a fourth column of the current block.

When the layers for the current block are defined as described above, the encoding apparatus may determine a scanning method for the layers of the current block as a longitudinal-first scan. Thereafter, as shown in (b) of FIG. 13, rearrangement of the residual coefficients may be performed.

Specifically, the encoding apparatus may scan from the first layer to the fourth layer in order and may scan from the residual coefficient of the upper position to the lower side in the corresponding layer.

As an example, the encoding apparatus may scan may scan the residual coefficients in the first layer in order from top to bottom (scan in order of #0, #4, #8, and #12 residual coefficients). Next, the second layer may be scanned. The encoding apparatus may scan the residual coefficients in the second layer from top to bottom (scan in order of #1, #5, #9, and #13 residual coefficients). Next, the third layer may be scanned. The encoding apparatus may scan the residual coefficients in the third layer in order from top to bottom (scan in order of #2, #6, #10 and #14 residual coefficients). Next, the fourth layer may be scanned. The encoding apparatus may scan the residual coefficients in the fourth layer in order from top to bottom (scan #3, #7, #11 and #15 residual coefficients).

Thereafter, referring to (b) of FIG. 13, the encoding apparatus may rearrange the residual coefficients in the scanned order at positions according to the diagonal scanning order (from top-right to bottom-left, from bottom-right to top-left). The scanned order of the residual coefficients may be an order #0, #4, #8, #12, #1, #5, #9, #13, #2, #6, #10, #14, #3, #7, #11, and #15 residual coefficients. The residual coefficients may be rearranged to positions according to the diagonal scanning order in the current block in the scanned order. For example, #0 residual coefficient may be rearranged at the bottom-right position positioned on the first top-right diagonal, #4 and #8 residual coefficients may be rearranged in order from the top-right side to top-left side in a second top-right diagonal (i.e., top-left side top-rightward diagonal of the first top-right diagonal) of the current block, #12, #1, and #5 residual coefficients may be rearranged in order from the top-right side to top-left side in a third top-rightward diagonal (i.e., top-left side top-rightward diagonal of the second top-right diagonal), #9, #13, #2, and #6 residual coefficients may be rearranged in order from the top-right side to top-left side in a fourth top-rightward diagonal (i.e., top-left side top-rightward diagonal of the third top-right diagonal), #10, #14, and #3 residual coefficients may be rearranged in order from the top-right side to top-left side in a fifth top-rightward diagonal (i.e., top-left side top-rightward diagonal of the fourth top-right diagonal), #7 and #11 residual coefficients may be rearranged in order from the top-right side to top-left side in a sixth top-rightward diagonal (i.e., top-left side top-rightward diagonal of the fifth top-right diagonal), and #15 residual coefficient may be rearranged at a top-left position positioned in a seventh top-rightward diagonal (i.e., top-left side top-rightward diagonal of the sixth top-right diagonal).

Meanwhile, for example, the above-described rearrangement method may be performed when no transform is applied to the residual coefficients of the current block. That is, whether to apply the rearrangement method may be determined based on whether the transform of the residual coefficients is applied. In other words, whether to apply the rearrangement method may be determined based on the transform skip flag for the current block.

Figure 14A:
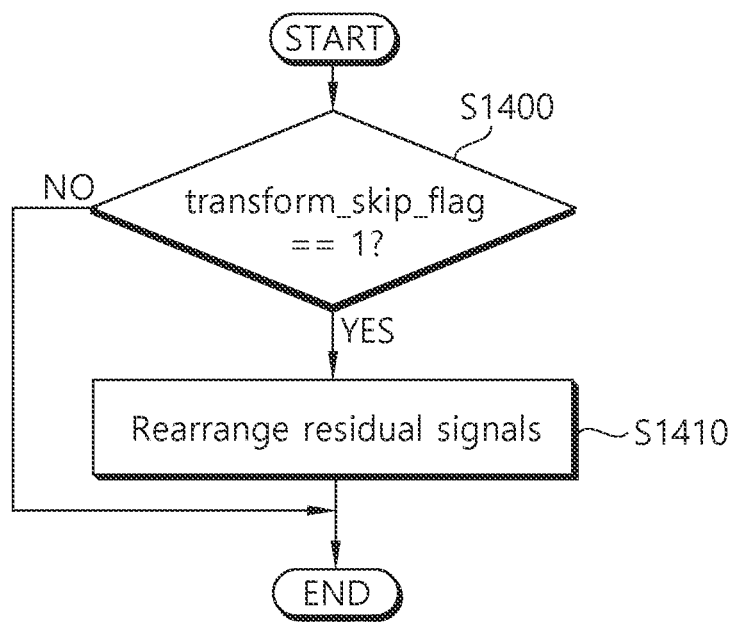
FIGS. 14A and 14B show an embodiment of determining whether to apply the rearrangement method based on a transform skip flag for the current block, and an encoding apparatus and a decoding apparatus performing the embodiment.
Figure 14B:
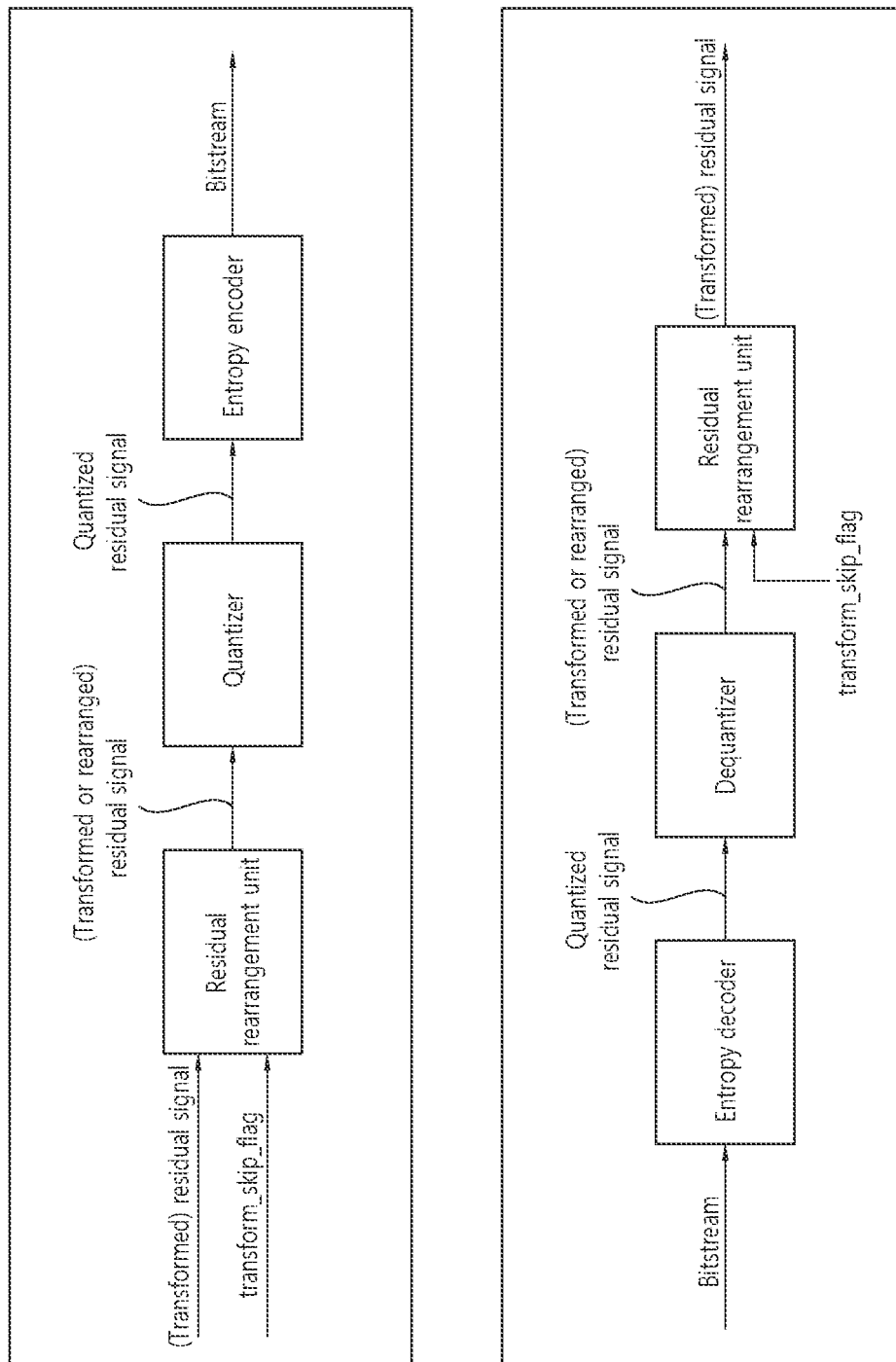

FIGS. 14A and 14B show an embodiment of determining whether to apply the rearrangement method based on a transform skip flag for the current block, and an encoding apparatus and a decoding apparatus performing the embodiment.

Referring to FIG. 14A, the encoding apparatus and the decoding apparatus may determine whether a value of the transform skip flag for the current block is 1 (S1400). When the value of the transform skip flag is 1, the encoding apparatus and the decoding apparatus may perform the rearrangement method on the residual coefficients of the current block (S1410). Meanwhile, when the value of the transform skip flag is not 1 (i.e., when the value of the transform skip flag is 0), the encoding apparatus and the decoding apparatus may not perform the rearrangement method on the residual coefficients of the current block. The transform skip flag may indicate whether a transform is applied to residual the coefficients of the current block. That is, the transform skip flag may indicate whether a transform is applied to the residual coefficients. A syntax element representing the transform skip flag may be the transform skip flag described above.

Also, referring to FIG. 14B, an encoding apparatus and a decoding apparatus that determine whether to apply the rearrangement method based on the transform skip flag for the current block and perform a corresponding operation may be exemplarily shown. A residual rearranging unit of the encoding apparatus may determine whether to rearrange the residual coefficients based on the transform skip flag for the current block, and when the value of the transform skip flag is 1, the residual rearranging unit may rearrange the residual coefficients. A quantization unit and an entropy encoder of the encoding apparatus may quantize and entropy-encode the rearranged residual coefficients to generate residual information and output the encoded residual information through a bitstream. Also, an entropy decoder of the decoding apparatus may receive the bitstream including residual information of the current block and decode the residual information to derive quantized residual coefficients. Thereafter, a dequantizer of the decoding apparatus may dequantize (i.e., scale) the quantized residual coefficients to derive residual coefficients. A residual rearranging unit of the decoding apparatus may determine whether to rearrange the residual coefficients based on the transform skip flag for the current block, and when the value of the transform skip flag is 1, the residual rearranging unit may rearrange the residual coefficients.

As another example, methods of using the rearrangement method described above in combination under various conditions may be proposed.

As an example, a rearrangement method or whether to rearrange may be determined based on a size of the current block. Here, the size of the current block may indicate the number of samples of the current block or a width and height of the current block. For example, when the number of samples of the current block is less than 64, the rearrangement method of rotating the residual coefficients of the current block by 180 degrees may be applied, and when the number of samples of the current block is 64 or more, the rearrangement method of mirroring residual coefficients of the current block described above may be applied. Alternatively, as another example, when the number of samples of the current block is less than 64, one of the rearrangement methods described above may be applied to residual coefficients of the current block, and when the number of samples of the current block is 64 or more, the rearrangement method may not be applied. Meanwhile, for example, a process of determining a rearrangement method or whether to rearrange based on the condition described above may be performed only when the value of the transform skip flag of the current block is 1. In other words, when the value of the transform skip flag of the current block is 1, the rearrangement method or whether to rearrange may be determined based on the size (the number of samples or the width and height) of the current block.

Alternatively, as another example, a rearrangement method or whether to rearrange may be determined based on a shape of the current block. For example, when the current block is a square block (i.e., when the width and height of the current block are the same), the rearrangement method mirroring the residual coefficients of the current block may be applied. When the current block is a non-square block (i.e., when the width and height values of the current block are different), the a rearrangement method of rotating by 180 degrees described above may be applied to the residual coefficients of the current block. Meanwhile, for example, the process of determining a rearrangement method or whether to rearrange based on the condition described above may be performed only when the value of the transform skip flag of the current block is 1. In other words, when the value of the transform skip flag of the current block is 1, a rearrangement method or whether to rearrange may be determined based on a shape of the current block.

Alternatively, as another example, a rearrangement method or whether to rearrange may be determined based on a ratio of a width to a height of the current block. For example, when the ratio of the width to the height of the current block is 2 or more or ½ or less (i.e., when a value obtained by dividing the width of the current block by the height is 2 or more or ½ or less), the mirroring rearrangement method may be applied to the residual coefficients of the current block, and when the ratio of the width to the height of the current block is less than 2 and greater than ½ (i.e., the value obtained by dividing the width of the current block by the height is less than 2 and greater than ½), the rearrangement method of rotating 180 degrees with respect to the residual coefficients of the current block described above may be applied. Or, for example, when the ratio of the width to the height of the current block is 2 or more or ½ or less (i.e., when the value obtained by dividing the width of the current block by the height is 2 or more or ½ or less), the mirroring rearrangement method described above may be applied to the residual coefficients of the current block, and when the ratio of the width to the height of the current block is less than 2 and greater than ½ (i.e., when the value obtained by dividing the width of the current block by the height is less than 2 and greater than ½) the rearrangement method described above may not be applied to the residual coefficients of the current block. Meanwhile, the process of determining the rearrangement method or whether to rearrange based on the condition described above may be performed only when the value of the transform skip flag of the current block is 1. In other words, when the value of the transform skip flag of the current block is 1, the rearrangement method or whether to rearrange may be determined based on the ratio of the width to the height of the current block.

Alternatively, as another example, when intra prediction is applied to the current block, a rearrangement method or whether to rearrange may be determined based on an intra prediction mode for the current block. For example, when a prediction direction of the intra prediction mode for the current block is close to a horizontal direction or a vertical direction, the left reference sample or the top reference sample is mainly used for prediction, so that a prediction error is concentrated on one reference sample direction, and thus, an embodiment in which a rearrangement method is determined in consideration of the characteristics may be proposed. For example, when the prediction direction of the intra prediction mode for the current block is a horizontal direction or the intra prediction mode for the current block is an intra prediction mode mainly predicted using a left reference sample, the rearrangement method of vertically flipping described above may be applied, and when the prediction direction of the intra prediction mode for the current block is a vertical direction or the intra prediction mode for the current block is an intra prediction mode mainly predicted using a top reference sample, the rearrangement method of horizontally flipping described above may be applied. Meanwhile, for example, a process of determining a rearrangement method or whether to rearrange based on the condition described above may be performed only when the value of the transform skip flag of the current block is 1. In other words, when the value of the transform skip flag of the current block is 1, a rearrangement method or whether to rearrange may be determined based on the intra prediction mode for the current block.

Alternatively, as another example, a rearrangement method or whether to rearrange may be determined based on a high level syntax in a bitstream transmitted from the encoding apparatus. For example, a flag indicating whether to rearrange may be transmitted through a high-level syntax such as a sequence parameter set (SPS) or a picture parameter set (PPS), and whether to rearrange in the lower syntax referring to the high level syntax and a rearrangement method may be determined based on the flag. Meanwhile, for example, a process of determining a rearrangement method or whether to rearrange based on the condition described above may be performed only when the value of the transform skip flag of the current block is 1. In other words, when the value of the transform skip flag of the current block is 1, a flag indicating whether to rearrange may be transmitted through the high-level syntax such as the SPS or the PPS, and a rearrangement method or whether to rearrange may be determined based on the flag.

Alternatively, as another example, a rearrangement method or whether to rearrange may be determined based on a prediction mode of the current block. For example, an embodiment in which a residual rearrangement method is not used for the inter prediction mode in which the residual signal is relatively less generated and the rearrangement method is used only for the residual signal of a block predicted by the intra prediction mode may be proposed. In other words, when inter prediction is applied to the current block, the rearrangement method for residual coefficients of the current block may not be applied, and when intra prediction is applied to the current block, the rearrangement method for residual coefficients of the current block may be applied. Meanwhile, for example, a process of determining a rearrangement method or whether to rearrange based on the condition described above may be performed only when the value of the transform skip flag of the current block is 1. In other words, when the value of the transform skip flag of the current block is 1, the rearrangement method or whether to rearrange may be determined based on the prediction mode for the current block.

Alternatively, as another example, the rearrangement method or whether to rearrange may be determined based on whether quantization is performed. For example, in lossless coding in which quantization is not applied, the above-described residual rearrangement method may not be performed, and in lossy coding in which quantization is applied, the above-described residual rearrangement method may be performed. In other words, when quantization is not applied to the residual coefficients of the current block, the rearrangement method may not be applied to the residual coefficients of the current block, and when quantization is applied to the residual coefficients of the current block, the rearrangement method may be applied to the residual coefficients of the current block. Meanwhile, for example, a process of determining a rearrangement method or whether to rearrange based on the condition described above may be performed only when the value of the transform skip flag of the current block is 1. In other words, when the value of the transform skip flag of the current block is 1, a rearrangement method or whether to rearrange the residual coefficients of the current block may be determined based on whether quantization is applied.

Meanwhile, as described above, a block on which transform encoding is not performed, that is, a transform block including residual coefficients to which transform is not applied, has different characteristics of residual information from a block on which general transform encoding is performed, and thus, there is a need for an efficient residual data encoding method for the block on transform encoding is not performed.

Accordingly, this document proposes embodiments of encoding/decoding residual information on a transform skip block. Here, the transform skip flag indicating whether transform is applied may be transmitted in units of transform blocks, and a size of the transform block is not limited in the embodiments of this document. For example, when the value of the transform skip flag is 1, the method of encoding/decoding residual information proposed in this document may be performed. When the value of the transform skip flag is 0, the method of encoding/decoding existing residual information such as syntax elements for the residual information disclosed in Table 1 described above may be performed.

Figure 15:
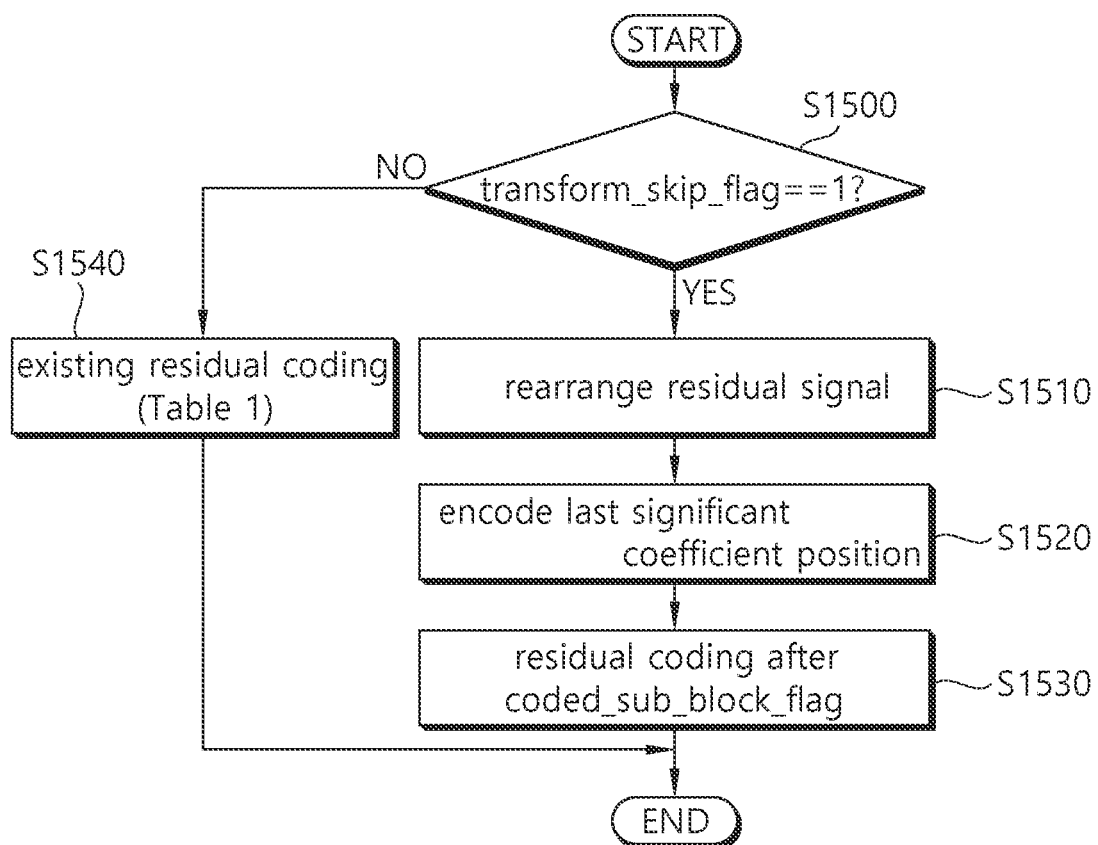
FIG. 15 shows an example of determining a method of coding residual information based on a transform skip flag.

FIG. 15 shows an example of determining a method of coding residual information based on a transform skip flag.

Referring to FIG. 15, the encoding apparatus may determine whether the value of the transform skip flag for the current block is 1 (S1500).

When the value of the transform skip flag is 1, the encoding apparatus may rearrange the residual coefficients of the current block (S1510). Here, as a method of rearranging the residual coefficients, at least one of the above-described embodiments may be used. Also, for example, whether to rearrange the residual coefficients may be determined based on whether a prediction mode of the current block is an inter prediction mode or an intra prediction mode. Also, for example, in the case of performing intra prediction on the current block, a method of rearranging the residual coefficients may be selected or whether to rearrange the residual coefficients may be determined based on the intra prediction mode applied to the current block or a distance between a reference sample used in the intra prediction mode and the current block. Also, for example, a method of rearranging the residual coefficients may be selected or whether to rearrange the residual coefficients may be determined based on a size of the current block (e.g., the number of samples of the current block or a width and height of the current block), a shape of the current block (e.g., whether the current block is a square block or a non-square block), a ratio of a horizontal length to the vertical length of the current block and/or whether a quantization is applied to the current block.

Thereafter, the encoding apparatus may encode information indicating a position of the last non-zero residual coefficient of the current block (S1520). A syntax element indicating information indicating the position of the last non-zero residual coefficient may be last_sig_coeff_x_prefix, last_sig_coeff_y_prefix, last_sig_coeff_x_suffix, and last_sig_coeff_y_suffix.

Thereafter, the encoding apparatus may encode residual information below coded_sub_block_flag of the current block, that is, residual information encoded after the coded_sub_block_flag (S1530). For example, the residual information may be encoded together with the syntax elements shown in Table 14 above.

Meanwhile, when the value of the transform skip flag is 0, the encoding apparatus may encode the residual information of the current block as in the related art method (S1540). For example, residual information encoded as in the related art scheme may be the same as the syntax elements disclosed in Table 1 above.

Meanwhile, unified transform type information proposed in Table 10 above may be signaled. The syntax element of the transform type information may be tu_mts_idx. In this case, a method of coding residual information may be determined based on the tu_mts_idx. Through the proposed embodiment, complexity of a process of encoding residual information for a block on which transform encoding is not performed may be reduced and encoding efficiency for the residual information may be improved.

Figure 16:
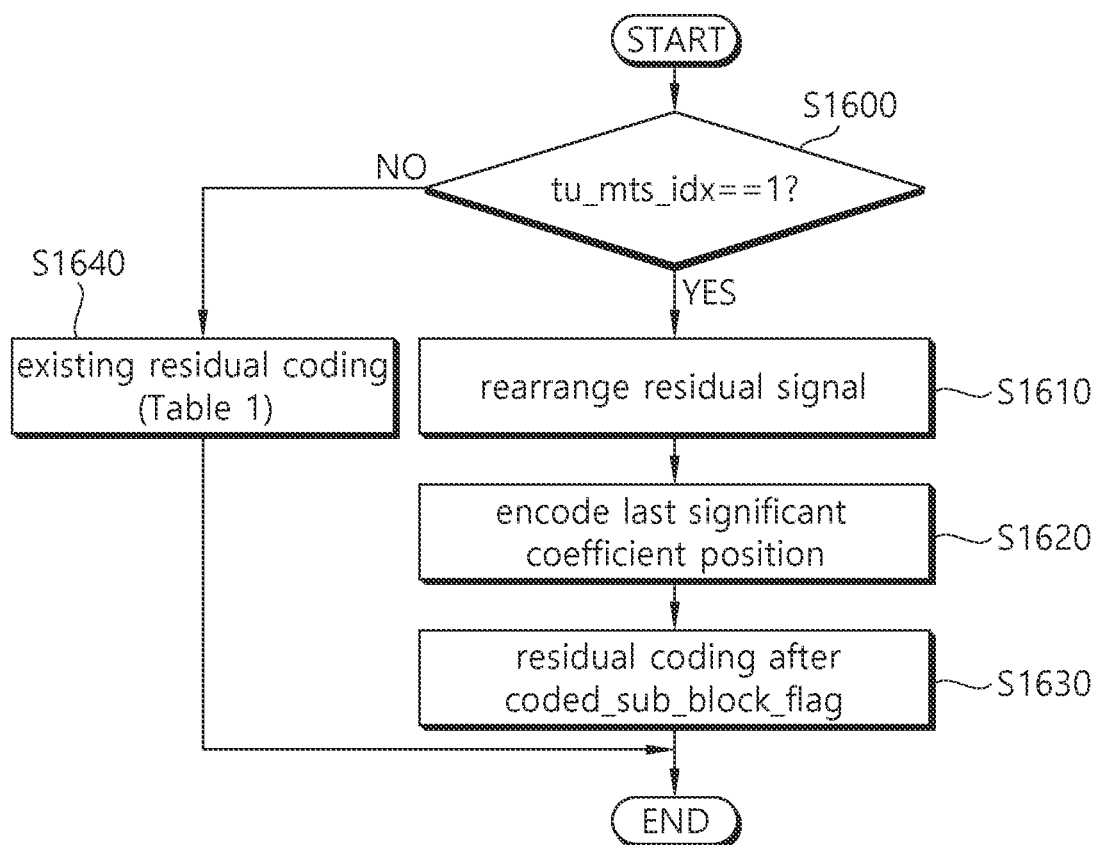
FIG. 16 shows an example of determining a method of coding residual information based on integrated transform type information.

FIG. 16 shows an example of determining a method of coding residual information based on integrated transform type information.

Referring to FIG. 16, the encoding apparatus may determine whether the value of integrated transform type information for the current block is 1 (S1600). A syntax element of the unified transform type information may be the tu_mts_idx.

When the value of the integrated transform type information is 1, the encoding apparatus may rearrange the residual coefficients of the current block (S1610). Here, as a method of rearranging the residual coefficients, at least one of the above-described embodiments may be used. Also, for example, whether to rearrange the residual coefficients may be determined based on whether A prediction mode of the current block is an inter prediction mode or an intra prediction mode. Also, for example, when intra prediction is performed on the current block, a method for rearranging the residual coefficients may be selected or whether to rearrange the residual coefficients may be determined based on the intra prediction mode applied to the current block or a distance between a reference sample used for the intra prediction mode and the current block. Also, for example, a method for rearranging the residual coefficients may be selected or whether to rearrange the residual coefficients may be determined based on a size of the current block (e.g., the number of samples of the current block or a width and height of the current block), a shape of the current block (e.g., whether the current block is a square block or a non-square block), a ratio between a horizontal length and a vertical length of the current block, and/or whether quantization of the current block is applied.

Thereafter, the encoding apparatus may encode information indicating the position of the last non-zero residual coefficient of the current block (S1620). The syntax element indicating information indicating the position of the last non-zero residual coefficient may be last_sig_coeff_x_prefix, last_sig_coeff_y_prefix, last_sig_coeff_x_suffix, and last_sig_coeff_y_suffix.

Thereafter, the encoding apparatus may encode residual information below coded_sub_block_flag of the current block, that is, residual information encoded after the coded_sub_block_flag (S1630). For example, the residual information may be encoded like the syntax elements shown in Table 14 above.

Meanwhile, when the value of the integrated transform type information is 0, the encoding apparatus may encode the residual information of the current block as in the related art method (S1640). For example, residual information encoded like in the related art method may be the same as the syntax elements disclosed in Table 1 above. In addition, as disclosed in Table 10 above, the syntax elements transform_skip_flag and/or mts_idx may be omitted. Through the proposed embodiment, complexity of a process of encoding residual information for a block on which transform encoding is not performed may be reduced and encoding efficiency for the residual information may be improved.

Meanwhile, the decoding apparatus may derive residual coefficients of the current block based on the residual information as described above, and determine whether residual rearrangement (residual coefficient rearrangement) is applied to the current block. Whether the residual rearrangement is applied may be determined, for example, based on the value of the transform skip flag (i.e., transform_skip_flag) or the integrated transform type information (i.e., tu_mts_idx) as shown in FIG. 15 or 16. When residual rearrangement is applied to the current block, the decoding apparatus may rearrange the residual coefficients based on the residual rearrangement method determined according to the above-described criteria, and derive residual samples for the current block based on the rearranged residual coefficients. The rearranged residual coefficients may be derived as the residual samples, or dequantization may be applied to the rearranged residual coefficients as necessary to derive residual samples. Thereafter, as described above, the reconstructed samples for the current block may be generated based on the residual samples and the prediction samples for the current block.

Meanwhile, as described above, in the residual coding for the current block, the main syntax element in the 4×4 size sub-block or the 2×2 sub-block unit of the current block may be sig_coeff_flag, coeff_sign_flag, abs_level_gt1_flag, par_level_flag, abs_level_gtX_flag, and abs_remainder. Among them, bins for sig_coeff_flag, coeff_sign_flag, abs_level_gt1_flag, par_level_flag, and abs_level_gtX_flag may be context-coded bins coded based on the regular encoding engine, and the bins for the abs_remainder may be bypass bins coded based on a bypass encoding engine.

The context-coded bin shows high data dependence because it is coded using an updated probability state and range while processing the previous bin. That is, in the case of the context-coded bin, since encoding/decoding of a next bin may be performed after all encoding/decoding of the current bin is performed, there may be a difficult in parallel processing. Also, a process of deriving a probability interval and determining a current state may take a lot of time. Accordingly, this document proposes an embodiment of improving CABAC processing efficiency by reducing the number of context-coded bins and increasing the number of bypass bins.

Through the embodiments of this document, the coding process for the syntax elements coded as the context-coded bins may be quickly switched to the coding process for the syntax element abs_remainder coded based on the bypass coding engine, that is, coded as the bypass bins, and the number of context-coded bins may be reduced.

As an embodiment, this document proposes a method of limiting the number of residual coefficients coded with sig_coeff_flag, coeff_sign_flag, abs_level_gt1_flag, and par_level_flag in the current sub-block. That is, the present embodiment proposes a method of limiting the number of bins allocated to the sig_coeff_flag, coeff_sign_flag, abs_level_gt1_flag, and par_level_flag to a maximum of N. According to this embodiment, residual coding may be performed on residual coefficients in a current sub-block according to a scanning order, and when the number of bins coded with sig_coeff_flag, coeff_sign_flag, abs_level_gt1_flag, par_level_flag, that is, the number of coded context-coded bins reaches N, if abs_level_gt1_flag is not coded in subsequent residual coding, abs_level_gtX_flag is not coded either and it may be switched to coding for abs_remainder. N may be represented as a maximum number of context-coded bins.

For example, when the current sub-block is a 4×4 size sub-block, N may be derived as one of 0 to 64, and when the current sub-block is a 2×2 size sub-block, N may be derived as one of 0 to 16. N may be selected by the encoding apparatus. Alternatively, N may be adaptively determined according to the size of the current block and/or a position of the current sub-block in the current block. Alternatively, when the current sub-block is a 4×4 sub-block, N may be set to any one of 0 to 64. When the current sub-block is a 2×2 sub-block, N may be set to any value of any one of 0 to 16.

Also, as an embodiment, this document proposes a method of limiting the number of residual coefficients coded with abs_level_gtX_flag in the current sub-block. Referring to Table 14 above, a maximum of four abs_level_gtX_flags may be derived for one residual coefficient in residual coding. That is, when the current sub-block is a 4×4 sub-block, a maximum of 64 abs_level_gtX_flags may be coded for the current sub-block. When the current sub-block is a 2×2 sub-block, a maximum of 16 abs_level_gtX_flags may be coded for the current sub-block.

Accordingly, the present embodiment proposes a method in which residual coding is performed on residual coefficients in the current sub-block to reduce the number of context-coded bins and abs_level_gtX_flag is coded to a maximum of N. That is, the present embodiment proposes a method of limiting the number of bins allocated for the abs_level_gtX_flag to a maximum of N. N may be represented as a maximum number of syntax elements abs_level_gtX_flag. For example, the N may be selected by the encoding apparatus. Alternatively, N may be adaptively determined according to the size of the current block and/or the position of the current sub-block in the current block. Alternatively, when the current sub-block is a 4×4 sub-block, N may be set to any one of 0 to 64. When the current sub-block is a 2×2 sub-block, N may be set to any value of any one of 0 to 16. According to the present embodiment, residual coding may be performed on residual coefficients in the current sub-block according to a scanning order, and when the number of syntax elements abs_level_gtX_flag reaches N, the residual coding may be switched to coding for abs_remainder thereafter. In other words, residual coding may be performed on the residual coefficients in the current sub-block according to the scanning order, and when the number of bins coded with the syntax element abs_level_ gtX_flag, that is, the coded context-coded bins reaches N, residual coding may be switched to coding for abs_remainder.

Also, as an embodiment, this document may propose a method combining the above-described embodiment limiting the sum of the numbers of sig_coeff_flag, coeff_sign_flag, abs_level_gt1_flag, and par_level_flag with the embodiment limiting the number of abs_level_gtX_flags. According to this embodiment, the sum of the numbers of sig_coeff_flag, coeff_sign_flag, abs_level_gt1_flag, and par_ level_flag for the current sub-block may be limited to M, and the number of abs_level_gtX_flags may be limited to N. That is, the present embodiment proposes a method of limiting the sum of bins allocated for sig_coeff_flag, coef f_sign_flag, abs_level_gt1_flag, and par_level_flag to a maximum of M and limiting the number of bins allocated for the abs_level_gtX_flag to a maximum of N. Here, when the current sub-block is a 4×4 sub-block, M and N may each be derived as one of 0 to 64. When the current sub-block is a 2×2 sub-block, the M and N may each be derived as one of 0 to 16.

Figure 17:
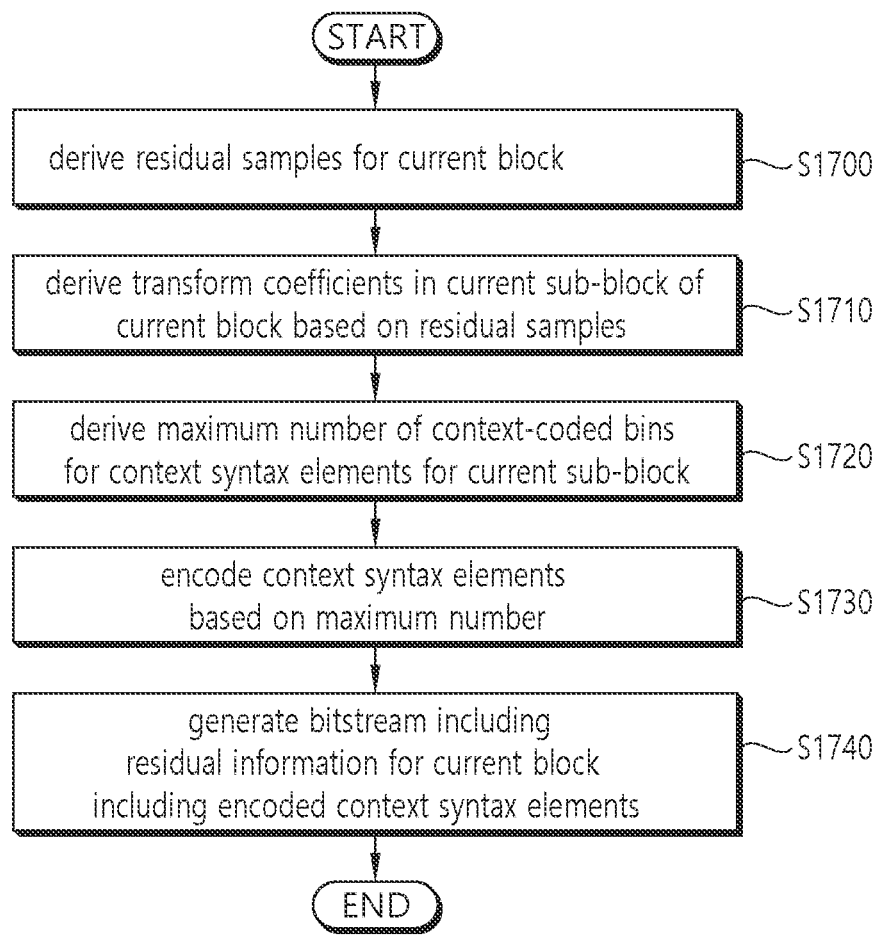
FIG. 17 schematically shows an image encoding method by an encoding apparatus according to the present document.

FIG. 17 schematically shows an image encoding method by an encoding apparatus according to the present document. The method disclosed in FIG. 17 may be performed by the encoding apparatus disclosed in FIG. 2. Specifically, for example, S1700 of FIG. 17 may be performed by a subtractor of the encoding apparatus, S1710 may be performed by the transformer and the quantizer of the encoding apparatus, and S1720 to S1740 may be performed by the entropy encoder of the encoding apparatus. In addition, although not shown, the process of deriving a prediction sample may be performed by a predictor of the encoding apparatus, and the process of deriving reconstructed samples of the current block based on residual samples and prediction samples of the current block may be performed by the adder of the encoding apparatus, and the process of encoding the prediction information on the current block may be performed by the entropy encoder of the encoding apparatus.

The encoding apparatus derives residual samples for the current block (S1700). The encoding apparatus may determine whether to perform inter prediction or intra prediction on the current block, and may determine a specific inter prediction mode or a specific intra prediction mode based on an RD cost. According to the determined mode, the encoding apparatus may derive prediction samples for the current block and may derive the residual samples by subtracting the prediction samples from the original samples for the current block.

The encoding apparatus derives transform coefficients in the current sub-block of the current block based on the residual samples (S1710). The encoding apparatus may derive the transform coefficients based on the residual samples in the current sub-block of the current block.

For example, the encoding apparatus may determine whether a transform is applied to the residual samples. When no transform is applied to the residual samples, the encoding apparatus may derive the derived residual samples as the transform coefficients. Also, when transform is applied to the residual samples, the encoding apparatus may derive the transform coefficients by performing transform on the derived residual samples. The transform coefficients may be included in a current sub-block of the current block. The current sub-block may be referred to as a current coefficient group (CG). Also, the size of the current sub-block of the current block may be a 4×4 size or a 2×2 size. That is, the current sub-block of the current block may include a maximum of 16 non-zero transform coefficients or a maximum of 4 non-zero transform coefficients.

Meanwhile, the encoding apparatus may generate and encode a transform skip flag indicating whether transform of transform coefficients of the current block is applied. A bitstream may include a transform skip flag for the current block. The transform skip flag may indicate whether transform is applied to transform coefficients of the current block. That is, the transform skip flag may indicate whether transform is applied to the transform coefficients. A syntax element representing the transform skip flag may be the transform_skip_flag described above.

Meanwhile, when the value of the transform skip flag for the current block is 1, the encoding apparatus may rearrange the transform coefficients. In this case, the encoding apparatus may generate and encode residual information on the rearranged transform coefficients. For example, the encoding apparatus may rearrange the transform coefficients through various rearrangement methods. That is, the encoding apparatus may move the transform coefficients from the derived positions to other positions through various rearrangement methods.

As an example, the encoding apparatus may rearrange the transform coefficients through a rearrangement method of rotating by 180 degrees. Specifically, for example, the encoding apparatus may rearrange the transform coefficients of the current block to positions symmetrical with respect to a center of the current block.

Alternatively, as an example, the encoding apparatus may rearrange the transform coefficients through a rearrangement method of antidiagonal mirroring. Specifically, for example, the encoding apparatus may rearrange the transform coefficients to positions symmetrical with respect to the right-upward diagonal of the current block. Here, the right-upward diagonal may represent a right-upward diagonal passing through the center of the current block.

Alternatively, as an example, the encoding apparatus may rearrange the transform coefficients through a rearrangement method of main diagonal mirroring. Specifically, for example, the encoding apparatus may rearrange the transform coefficients to positions symmetrical with respect to the top-leftward diagonal of the current block. Here, the top-leftward diagonal may indicate a top-leftward diagonal passing through the center of the current block.

Alternatively, as an example, the encoding apparatus may rearrange the transform coefficients through a rearrangement method of vertical flipping. Specifically, for example, the encoding apparatus may rearrange the transform coefficients of the current block to positions symmetrical with respect to a vertical axis of the current block. Here, the vertical axis may be a vertical line passing through the center of the current block.

Alternatively, as an example, the encoding apparatus may rearrange the transform coefficients through a rearrangement method of horizontal flipping. The encoding apparatus may rearrange the transform coefficients of the current block to positions symmetrical with respect to a horizontal axis of the current block. Here, the horizontal axis may be a horizontal line passing through the center of the current block.

Alternatively, as an example, the encoding apparatus may rearrange the transform coefficients through a method of deriving layers distinguished based on the distance from the reference sample of the current block and rearranging the layers according to a reverse raster order.

For example, the encoding apparatus may set layers for the current block based on a distance from reference samples of the current block. Here, the reference samples may include top reference samples and left reference samples of the current block. For example, when a size of the current block is N×N and an x component and a y component of a top-left sample position of the current block are 0, the left reference samples may be p[−1][0] to p[−1][2N−1] and the top reference samples may be p[0][−1] to p[2N−1][−1]. When the size of the current block is N×N, the layers may include a first layer to an N-th layer. The N-th layer may be the last layer, and N may be equal to a value of a width or a height of the current block. For example, the first layer may include positions having a distance of 1 from the nearest reference sample, the second layer may include positions having a distance of 2 from the nearest reference sample, and the N-th layer may include positions having a distance of N from the nearest reference sample.

Thereafter, the encoding apparatus may scan the transform coefficients in a reverse raster order. In other words, the encoding apparatus may scan the transform coefficients of the current block in a direction from right to left and from bottom to top. Next, the encoding apparatus may rearrange the transform coefficients in the layers in a scanned order. Here, the rearrangement of the transform coefficients may be performed in order of the first layer to the N-th layer. In addition, the transform coefficients may be rearranged based on a transverse-first scan or a longitudinal-first scan in the rearranged layers.

For example, the transform coefficients may be preferentially rearranged from right to left at transverse positions of the top-left position of the rearranged layers, and when longitudinal positions of the top-left positions of the rearranged layers exist, the transform coefficients may be rearranged from top to bottom at the longitudinal positions of the top-left positions of the rearranged layers after rearrangement at the transverse positions. Alternatively, for example, the transform coefficients may be preferentially rearranged from top to bottom at longitudinal positions of the top-left positions of the rearranged layers, and when transverse positions of the top-left positions of the rearranged layers exist, the transform coefficients may be rearranged from left to right at the transverse positions of the top-left positions of the rearranged layers after rearrangement at the longitudinal positions.

Alternatively, as an example, the encoding apparatus may rearrange the transform coefficients through a method of deriving layers distinguished based on the distance from the reference sample of the current block and rearranging the layers according to a diagonal scanning order.

For example, the encoding apparatus may set layers for the current block based on the distance from reference samples of the current block. Here, the reference samples may include top reference samples and left reference samples of the current block. For example, when the size of the current block is N×N and an x component and a y component of the top-left sample positions of the current block are 0, the left reference samples may be p[−1][0] to p[−1][2N−1] and the top reference samples may be p[0][−1] to p[2N−1][−1]. When the size of the current block is N×N, the layers may include a first layer to an N-th layer. The N-th layer may be the last layer, and N may be equal to a value of a width or a height of the current block. For example, the first layer may include positions having a distance of 1 from the nearest reference sample, the second layer may include positions having a distance of 2 from the nearest reference sample, and the N-th layer may include positions having a distance of N from the nearest reference sample.

Thereafter, the encoding apparatus may scan the transform coefficients in a diagonal scanning order. In other words, the encoding apparatus may scan the transform coefficients of the current block in a direction from top-right to bottom-left and from bottom-right to top-left. Next, the encoding apparatus may rearrange the transform coefficients in the layers in a scanned order. Here, the rearrangement of the transform coefficients may be performed in order of the first layer to the N-th layer. In addition, the transform coefficients may be rearranged based on a transverse-first scan or a longitudinal-first scan in the rearranged layers.

For example, the transform coefficients may be preferentially rearranged from right to left at transverse positions of the top-left position of the rearranged layers, and when longitudinal positions of the top-left positions of the rearranged layers exist, the transform coefficients may be rearranged from top to bottom at the longitudinal positions of the top-left positions of the rearranged layers after rearrangement at the transverse positions. Alternatively, for example, the transform coefficients may be preferentially rearranged from top to bottom at longitudinal positions of the top-left positions of the rearranged layers, and when transverse positions of the top-left positions of the rearranged layers exist, the transform coefficients may be rearranged from left to right at the transverse positions of the top-left positions of the rearranged layers after rearrangement at the longitudinal positions.

Alternatively, for example, the encoding apparatus may set the layers for the current block based on a distance from top reference samples of the current block. For example, when the size of the current block is N×N and an x component and a y component of the top-left sample positions of the current block are 0, the top reference samples may be p[0][−1] to p[2N−1][−1]. When the size of the current block is N×N, the layers may include a first layer to an N-th layer. The N-th layer may be the last layer, and N may be equal to a value of a width or a height of the current block. For example, the first layer may include positions having a distance of 1 from the nearest reference sample, the second layer may include positions having a distance of 2 from the nearest reference sample, and the N-th layer may include positions having a distance of N from the nearest reference sample. In other words, the first layer may be a first row of the current block, the second layer may be a second row of the current block, and the N-th layer may be an N-th row of the current block.

Thereafter, the encoding apparatus may scan the transform coefficients in a diagonal scanning order. In other words, the encoding apparatus may scan the transform coefficients of the current block in a direction from top-right to bottom-left and from bottom-right to top-left. Next, the encoding apparatus may rearrange the transform coefficients in the layers in a scanned order. Here, the rearrangement of the transform coefficients may be performed in order from the first layer to the N-th layer. The rearrangement of the transform coefficients may be performed from the first layer to the N-th layer, and the transform coefficients may be rearranged from right to left at positions of the rearranged layers.

Alternatively, for example, the encoding apparatus may set layers for the current block based on a distance from left reference samples of the current block. For example, when a size of the current block is N×N and an x component and a y component of a top-left sample position of the current block are 0, the left reference samples may be p[−1][0] to p[−1][2N−1]. When the size of the current block is N×N, the layers may include a first layer to an N-th layer. The N-th layer may be the last layer, and N may be equal to a value of a width or a height of the current block. For example, the first layer may include positions having a distance of 1 from the nearest left reference sample, the second layer may include positions having a distance of 2 from the nearest left reference sample, and the N-th layer may include positions having a distance of N from the nearest reference sample. In other words, the first layer may be a first column of the current block, the second layer may be a second column of the current block, and the N-th layer may be an N-th column of the current block.

Thereafter, the encoding apparatus may scan the transform coefficients in a diagonal scanning order. In other words, the encoding apparatus may scan the transform coefficients of the current block in a direction from top-right to bottom-left and from bottom-right to top-left. Next, the encoding apparatus may rearrange the transform coefficients in the layers in a scanned order. Here, the rearrangement of the transform coefficients may be performed in order of the first layer to the N-th layer. The rearrangement of the transform coefficients may be performed in order from a first layer to an N-th layer, and the transform coefficients may be rearranged from top to bottom at positions of the rearranged layers.

Meanwhile, the encoding apparatus may determine whether to rearrange the transform coefficients based on various conditions. Alternatively, the encoding apparatus may derive a rearrangement method applied to the transform coefficients based on various conditions.

As an example, the encoding apparatus may determine whether to rearrange the transform coefficients based on the transform skip flag for the current block. The transform skip flag may indicate whether the transform is applied to the transform coefficients. For example, when the value of the transform skip flag is 1, it may be determined to rearrange the transform coefficients. In other words, when the value of the transform skip flag is 1, the encoding apparatus may rearrange the transform coefficients. When the value of the transform skip flag is 0, it may be determined not to rearrange the transform coefficients. In other words, when the value of the transform skip flag is 0, the encoding apparatus may generate and encode residual information on the current block based on the transform coefficients, without rearranging the transform coefficients.

Alternatively, as another example, whether to rearrange the transform coefficients may be determined based on the number of samples of the current block. For example, when the number of samples of the current block is smaller than a specific value, it may be determined to rearrange the transform coefficients. In other words, when the number of samples of the current block is smaller than the specific value, the encoding apparatus may rearrange the transform coefficients. When the number of samples of the current block is greater than or equal to the specific value, it may be determined not to rearrange the transform coefficients. In other words, when the number of samples of the current block is equal to or greater than the specific value, the encoding apparatus may generate and encode residual information on the current block based on the transform coefficients, without rearranging the transform coefficients. The specific value may be 64.

Alternatively, for example, when the number of samples of the current block is less than 64, the encoding apparatus may rearrange the transform coefficients through a rearrangement method of rotating the transform coefficients by 180 degrees. When the number of samples of the current block is 64 or more, the encoding apparatus may not rearrange the transform coefficients.

Alternatively, as another example, the rearrangement method for the transform coefficients may be determined based on the number of samples of the current block.

For example, when the number of samples of the current block is less than 64, the encoding apparatus may rearrange the transform coefficients through the rearrangement method of rotating the transform coefficients by 180 degrees, and when the number of samples of the current block is 64 or more, the encoding apparatus may rearrange the transform coefficients through a rearrangement method of mirroring the transform coefficients. Alternatively, as another example, for example, when the number of samples of the current block is less than 64, the encoding apparatus may rearrange the transform coefficients through one of the rearrangement methods described above, and when the number of samples of the current block is 64 or more, the encoding apparatus may not rearrange the transform coefficients.

Alternatively, as another example, whether to rearrange the residual coefficients may be determined based on a shape of the current block. For example, when the current block is a square block, it may be determined to rearrange the transform coefficients. In other words, when the current block is a square block, the encoding apparatus may rearrange the transform coefficients. When the current block is a non-square block, it may be determined not to rearrange the transform coefficients. In other words, when the current block is a non-square block, the encoding apparatus may generate and encode residual information on the current block based on the transform coefficients, without rearranging the transform coefficients.

Alternatively, as another example, the rearrangement method for the transform coefficients may be determined based on a shape of the current block. For example, when the current block is a square block, the encoding apparatus may rearrange the transform coefficients through the rearrangement method of mirroring, and when the current block is a non-square block, the encoding apparatus may rearrange the transform coefficients through the rearrangement method or rotating the transform coefficients by 180 degrees.

Alternatively, as another example, whether to rearrange the transform coefficients may be determined based on a ratio of a width to a height of the current block. For example, when the ratio of the width to the height of the current block is 2 or more or ½ or less (i.e., when a value obtained by dividing the width of the current block by the height is 2 or more or ½ or less), the encoding apparatus may rearrange the transform coefficients through the rearrangement method of mirroring, and when the ratio of the width to the height of the current block is less than 2 and greater than ½ (i.e., when a value obtained by dividing the width of the current block by the height is less than 2 and more than ½), the encoding apparatus may generate and encode residual information for the current block based on the transform coefficients, without rearranging the transform coefficients.

Alternatively, as another example, a rearrangement method for the transform coefficients may be determined based on a ratio of a width to a height of the current block. For example, when the ratio of the width to the height of the current block is 2 or more or ½ or less (i.e., when a value obtained by dividing the width of the current block by the height is 2 or more or ½ or less), the encoding apparatus may rearrange the transform coefficients by the rearrangement method of mirroring, and when the ratio of the width to the height of the current block is less than 2 and greater than ½ (i.e., when a value obtained by dividing the width of the current block by the height is less than 2 and more than ½), the encoding apparatus may rearrange the transform coefficients through the rearrangement method of rotating by 180 degrees.

Alternatively, as another example, whether to rearrange the transform coefficients may be determined based on an intra prediction mode for the current block. For example, when a prediction direction of the intra prediction mode for the current block is a horizontal direction or when the intra prediction mode for the current block is an intra prediction mode mainly predicted using a left reference sample, the encoding apparatus may rearrange the transform coefficients through a rearrangement method of vertically flipping, and in other cases, the encoding apparatus may generate and encode residual information for the current block based on the transform coefficients, without rearranging the transform coefficients. Alternatively, for example, when the prediction direction of the intra prediction mode for the current block is a vertical direction or when the intra prediction mode for the current block is an intra prediction mode mainly predicted using a top reference sample, the encoding apparatus may rearrange the transform coefficients through the rearrangement method of vertically flipping, and in other cases, the encoding apparatus may generate and encode residual information for the current block based on the transform coefficients, without rearranging the transform coefficients.

Alternatively, as another example, the rearrangement method for the transform coefficients may be determined based on the intra prediction mode for the current block. For example, when a prediction direction of the intra prediction mode for the current block is a horizontal direction or when the intra prediction mode for the current block is an intra prediction mode mainly predicted using a left reference sample, the encoding apparatus may rearrange the transform coefficients through the rearrangement method of vertical flipping, and when the prediction direction of the intra prediction mode for the current block is a vertical direction or when the intra prediction mode for the current block is an intra prediction mode mainly predicted using a top reference sample, the encoding apparatus may rearrange the transform coefficients through the rearrangement method of vertical flipping.

Alternatively, as another example, whether to rearrange the transform coefficients may be determined based on a flag indicating whether to rearrange the transform coefficients signaled through a high level syntax. For example, the encoding apparatus may signal a flag indicating whether to rearrange the transform coefficients through a sequence parameter set (SPS) or a picture parameter set (PPS), and determine whether the transform coefficients are rearranged based on the flag.

Alternatively, as another example, the rearrangement method for the transform coefficients may be determined based on information indicating the rearrangement method for the transform coefficients signaled through a high level syntax. For example, the encoding apparatus may signal information indicating a rearrangement method for the transform coefficients through a sequence parameter set (SPS) or a picture parameter set (PPS) and determine whether the transform coefficients are rearranged based on the information.

Alternatively, as another example, whether to rearrange the transform coefficients may be determined based on the prediction mode of the current block. For example, when the prediction mode of the current block is intra prediction, it may be determined to rearrange the transform coefficients. In other words, when the prediction mode of the current block is intra prediction, the encoding apparatus may rearrange the transform coefficients. Also, when the prediction mode of the current block is inter prediction, it may be determined not to rearrange the transform coefficients. In other words, when the prediction mode of the current block is inter prediction, the encoding apparatus may generate and encode residual information on the current block based on the transform coefficients, without rearranging the transform coefficients.

Alternatively, as another example, whether to rearrange the transform coefficients may be determined based on whether the transform coefficients are quantized. For example, when quantization is applied to the transform coefficients, it may be determined to rearrange the transform coefficients. In other words, when quantization is applied to the transform coefficients, the encoding apparatus may rearrange the transform coefficients. Also, when quantization is not applied to the transform coefficients, it may be determined not to rearrange the transform coefficients. In other words, when quantization is not applied to the transform coefficients, the encoding apparatus may not rearrange the transform coefficients.

The encoding apparatus derives a specific number of the number of context-coded bins for context syntax elements for the current sub-block (S1720). Here, the specific number may represent the above-described maximum value, and the maximum value may be a maximum value of the sum of the number of context-coded bins of the context syntax elements with respect to transform coefficients related to the current sub-block of the current block.

As an example, the maximum value may be derived in units of transform blocks.

For example, the maximum value may be set to an arbitrary value. When the size of the current sub-block is a 4×4 size, the maximum value may be derived as one of 0 to 64. When the size of the current sub-block is a 2×2 size, the maximum value may be derived as one of 0 to 16. For example, the maximum value may be set to 4.

Alternatively, for example, the maximum value may be derived based on the size of the current block (or the current sub-block in the current block). When the size of the current block (or the current sub-block in the current block) is 4×4, the derived maximum value may be derived as one of 0 to 64, and when the size of the current block (or the current sub-block in the current block) is a 2×2 size, the derived maximum value may be derived as one of 0 to 16.

Alternatively, for example, the maximum value may be derived based on the size of the current block and a position of the current sub-block.

Also, for example, the maximum value may be derived based on position information indicating a position of the last non-zero transform coefficient of the current block. For example, the position of the last non-zero transform coefficient may be derived based on the position information, and a length from the position of a start transform coefficient in the scanning order of the current block to the position of the last non-zero transform coefficient may be derived. The maximum value may be derived based on the length. For example, the maximum value may be derived as a value obtained by multiplying the length by 1.75. Meanwhile, here, the length may correspond to the number of samples of the current block. That is, the length may be the number of samples of the current block. For example, when a transform coefficient having a value of 0 is not included in the arrangement of the transform coefficients of the current block, the length may be the number of samples of the current block. In other words, the maximum value may be derived based on the number of samples of the current block.

For example, the maximum value may be derived as a value obtained by multiplying the number of samples of the current block by 1.75.

The encoding apparatus encodes the context syntax elements based on the specific number (S1730). The encoding apparatus may encode the context syntax elements based on the context based on the maximum value.

For example, the encoding apparatus may encode context syntax elements of the transform coefficient for the current sub-block of the current block based on the context. The context syntax elements may include a significant coefficient flag indicating whether the transform coefficient is a non-zero transform coefficient, a parity level flag for parity of a transform coefficient level for the transform coefficient, and a first transform coefficient level flag for whether the transform coefficient is greater than a first threshold, and a second transform coefficient level flag for whether the transform coefficient level of the transform coefficient is greater than a second threshold. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Or, for example, the context syntax elements may include a significant coefficient flag indicating whether the transform coefficient is a non-zero transform coefficient, a sign flag indicating a sign of the transform coefficient, a first transform coefficient level flag indicating whether the transform coefficient level is greater than the first threshold, and a parity level flag for parity of the transform coefficient level with respect to the transform coefficient. Here, the significant coefficient flag may be sig_coeff_flag, the sine flag may be coeff_sign_flag, the first transform coefficient level flag may be abs_level_gt1_flag, and the parity level flag may be par_level_flag.

Specifically, when the sum of the number of context-coded bins of context syntax elements for transform coefficients in an order preceding the transform coefficient in a scanning order among transform coefficients for the current sub-block reaches the maximum value (i.e., greater than or equal to the maximum value), signaling and encoding of context syntax elements for the transform coefficient may be omitted (i.e., context syntax elements for the transform coefficient may not be signaled) and a bypass syntax element coded based on a bypass for the transform coefficient may be encoded. The value of the transform coefficient may be derived based on the bypass-based coded bypass syntax element.

For example, when the number of context-coded bins for context syntax elements of transform coefficients derived before a specific transform coefficient of the current sub-block reaches the specific number, the bypass syntax element for the specific transform coefficient included in the residual information may be encoded. Signaling and encoding of the context syntax elements for the specific transform coefficient may be omitted. The value of the specific transform coefficient may be derived based on the bypass syntax element.

For example, when the sum of the number of context-coded bins for context syntax elements of the #0 transform coefficient to #n transform coefficient of the current sub-block reaches the maximum value, signaling and encoding of context syntax elements for #n+1 transform coefficient n+1 of the current sub-block may be omitted and a bypass syntax element for #n+1 transform coefficient included in the residual information may be encoded.

That is, for example, when the sum of the number of context-coded bins of the significant coefficient flags, first transform coefficient level flags, parity level flags, and second transform coefficient level flags for #0 transform coefficient to #n transform coefficient determined by the scanning order among the transform coefficients for the current sub-block reaches the maximum value (i.e., greater than or equal to the maximum value), signaling and encoding of the significant coefficient flag for the #n+1 transform coefficient determined by the scanning order; the first transform coefficient level flag, the parity level flag, and the second transform coefficient level flag may be omitted, and the bypass-based coded bypass syntax element for the #n+1 quantized transform coefficient may be encoded.

Alternatively, for example, when the sum of the context-coded bins of the significant coefficient flags, sign flags, first transform coefficient level flags, and parity level flags for #0 transform coefficient to #n transform coefficient determined by the scanning order among the transform coefficients for the current sub-block reaches the maximum value (i.e., greater than or equal to the maximum value), signaling and encoding of the significant coefficient flag, the sine flag, and the first transform coefficient level flag, and the parity level flag for the #n+1 transform coefficient determined by the scanning order may be omitted and the bypass-based coded bypass syntax element for the #n+1 quantized transform coefficient may be encoded.

The encoding apparatus generates a bitstream including residual information on the current block including the encoded context syntax elements (S1740). For example, the encoding apparatus may output image information including the residual information as a bitstream.

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gtX_flag, abs_remainder, coeff_sign_flag, dec_abs_level and/or mts_idx.

Specifically, for example, the residual information may include a transform skip flag for the current block. The transform skip flag may indicate whether transform is applied to transform coefficients of the current block. That is, the transform skip flag may indicate whether transform is applied to the transform coefficients. The syntax element representing the transform skip flag may be the transform_skip_flag described above.

Also, for example, the residual information may include position information indicating a position of the last non-zero transform coefficient in the transform coefficient array of the current block. That is, the residual information may include position information indicating the position of the last non-zero transform coefficient in a scanning order of the current block. The position information may include information indicating a prefix of a column position of the last non-zero coefficient, information indicating a prefix of a row position of the last non-zero coefficient, information indicating a suffix of the column position of the last non-zero coefficient, and information indicating a suffix of the row position of the last non-zero coefficient. The syntax elements for the position information may be last_sig_coeff_x_prefix, last_sig_coeff_y_prefix, last_sig_coeff_x_suffix, and last_sig_coeff_y_suffix. Meanwhile, the non-zero transform coefficient may be referred to as a significant coefficient.

Also, for example, the residual information may include context syntax elements for a transform coefficient in the current sub-block of the current block. The context syntax elements may include a significant coefficient flag indicating whether the transform coefficient is a non-zero transform coefficient, a parity level flag for parity of a transform coefficient level for the transform coefficient, and a first transform coefficient level flag regarding whether the transform coefficient level is greater than a first threshold, and a second transform coefficient level flag regarding whether the transform coefficient level of the transform coefficient is greater than a second threshold. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Alternatively, for example, the context syntax elements may include a significant coefficient flag indicating whether the transform coefficient is a non-zero transform coefficient, a sign flag indicating a sign of the transform coefficient, a first transform coefficient level flag indicating whether the transform coefficient level is greater than the first threshold, and a parity level flag for parity of the transform coefficient level for the transform coefficient. Here, the significant coefficient flag may be sig_coeff_flag, the sine flag may be coeff_sign_flag, the first transform coefficient level flag may be abs_level_gt1_flag, and the parity level flag may be par_level_flag.

Also, for example, the residual information may include a bypass syntax element coded based on a bypass for a transform coefficient in the current sub-block of the current block. The bypass syntax element may include coefficient value related information on a value of the transform coefficient. The coefficient value related information may be abs_remainder and/or dec_abs_level.

Meanwhile, the bitstream may include prediction information for the current block. The prediction information may include information on an inter prediction mode or an intra prediction mode performed on the current block. The encoding apparatus may generate and encode prediction information for the current block.

Meanwhile, the bitstream may be transmitted to the decoding apparatus through a network or a (digital) storage medium. Here, the network may include a broadcasting network and/or a communication network, and the digital storage medium may include various storage mediums such as USB, SD, CD, DVD, Blu-ray, HDD, and SSD.

Figure 18:
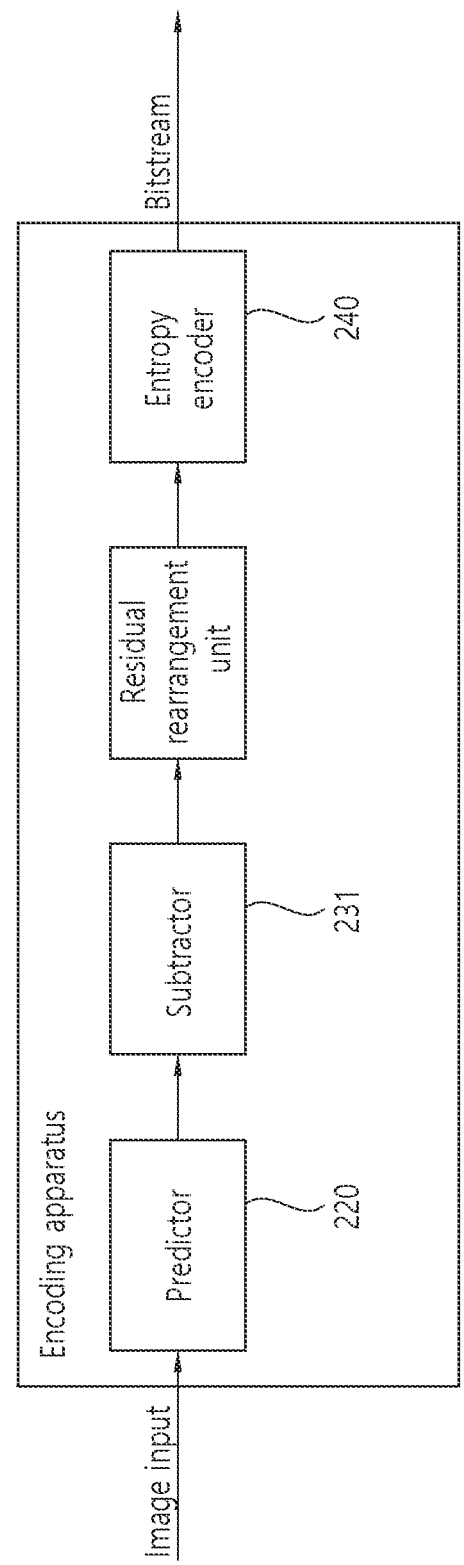
FIG. 18 schematically shows an encoding apparatus for performing an image encoding method according to this document.

FIG. 18 schematically shows an encoding apparatus for performing an image encoding method according to this document. The method disclosed in FIG. 17 may be performed by the encoding apparatus disclosed in FIG. 18. Specifically, for example, the subtractor of the encoding apparatus of FIG. 18 may perform S1700 of FIG. 17, the transformer and the quantizer of the encoding apparatus of FIG. 18 may perform S1710 of FIG. 17, the entropy encoder of the encoding apparatus of FIG. 18 may perform S1720 to S1740 of FIG. 17. In addition, although not shown, a process of deriving a prediction sample may be performed by a predictor of the encoding apparatus, a process of deriving reconstructed samples for the current block based on residual samples and prediction samples of the current block may be performed by an adder of the encoding apparatus, and a process of encoding the prediction information for the current block may be performed by the entropy encoder of the encoding apparatus.

Figure 19:
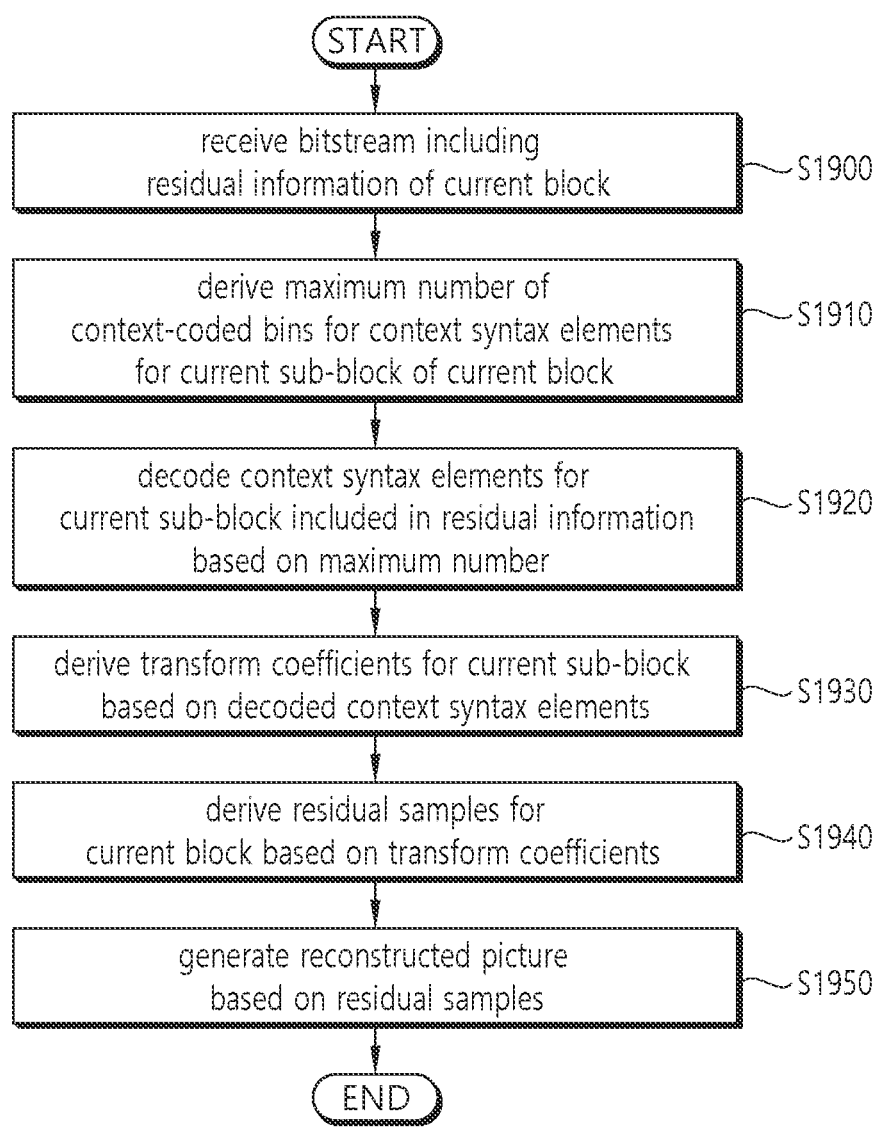
FIG. 19 schematically shows an image decoding method by a decoding apparatus according to this document.

FIG. 19 schematically shows an image decoding method by a decoding apparatus according to this document. The method disclosed in FIG. 19 may be performed by the decoding apparatus disclosed in FIG. 3. Specifically, for example, S1900 to S1930 of FIG. 19 may be performed by the entropy decoder of the decoding apparatus, S1940 may be performed by a dequantizer and an inverse transformer of the decoding apparatus, and S1950 may be performed by the adder of the decoding apparatus. Also, although not shown, the process of deriving a prediction sample may be performed by the predictor of the decoding apparatus.

The decoding apparatus receives a bitstream including residual information for the current block (S1900). The decoding apparatus may receive image information including residual information on the current block through a bitstream. Here, the current block may be a coding block (CB) or a transform block (TB). The residual information may include syntax elements for a current sub-block in the current block. Here, the syntax elements may include context syntax elements and a bypass element. That is, the residual information may include the context syntax elements and the bypass syntax element for the current sub-block. The context syntax elements may indicate context-based coded syntax elements, and the bypass syntax element may indicate a bypass-coded syntax element (i.e., a syntax element coded based on a uniform probability distribution).

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub__block__flag, sig_coeff_flag, par_level_flag, abs_level_gt1__flag, abs_level_gtX_flag, abs_remainder, coeff_sign_flag, dec_abs_level and/or mts_idx.

Specifically, for example, the residual information may include a transform skip flag for the current block. The transform skip flag may indicate whether transform is applied to transform coefficients of the current block. That is, the transform skip flag may indicate whether transform is applied to the transform coefficients. The syntax element representing the transform skip flag may be the transform_skip_flag described above.

Also, for example, the residual information may include position information indicating a position of the last non-zero transform coefficient in the transform coefficient array of the current block. That is, the residual information may include position information indicating the position of the last non-zero transform coefficient in a scanning order of the current block. The position information may include information indicating a prefix of a column position of the last non-zero coefficient, information indicating a prefix of a row position of the last non-zero coefficient, information indicating a suffix of the column position of the last non-zero coefficient, and information indicating a suffix of the row position of the last non-zero coefficient. The syntax elements for the position information may be last_sig_coeff_x_prefix, last_sig_coeff_y_prefix, last_sig_coeff_x_suffix, and last_sig_coeff_y_suffix. Meanwhile, the non-zero transform coefficient may be referred to as a significant coefficient.

Also, for example, the residual information may include context syntax elements for a transform coefficient in the current sub-block of the current block. The context syntax elements may include a significant coefficient flag indicating whether the transform coefficient is a non-zero transform coefficient, a parity level flag for parity of a transform coefficient level for the transform coefficient, and a first transform coefficient level flag regarding whether the transform coefficient level is greater than a first threshold, and a second transform coefficient level flag regarding whether the transform coefficient level of the transform coefficient is greater than a second threshold. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Alternatively, for example, the context syntax elements may include a significant coefficient flag indicating whether the transform coefficient is a non-zero transform coefficient, a sign flag indicating a sign of the transform coefficient, a first transform coefficient level flag indicating whether the transform coefficient level is greater than the first threshold, and a parity level flag for parity of the transform coefficient level for the transform coefficient. Here, the significant coefficient flag may be sig_coeff_flag, the sine flag may be coeff_sign_flag, the first transform coefficient level flag may be abs_level_gt1_flag, and the parity level flag may be par_level_flag.

Also, for example, the residual information may include a bypass syntax element coded based on a bypass for a transform coefficient in the current sub-block of the current block. The bypass syntax element may include coefficient value related information on a value of the transform coefficient. The coefficient value related information may be abs_remainder and/or dec_abs_level.

Meanwhile, the bitstream may include prediction information for the current block. The prediction information may include information on an inter prediction mode or an intra prediction mode performed on the current block. The decoding apparatus may perform inter prediction or intra prediction on the current block based on the prediction information received through the bitstream, and may derive prediction samples of the current block.

The decoding apparatus derives a specific number of the number of context-coded bins for context syntax elements for the current sub-block of the current block (S1910). Here, the specific number may represent the above-described maximum value. That is, the maximum value may be a maximum value of the sum of the number of context-coded bins of the context syntax elements with respect to transform coefficients related to the current sub-block of the current block.

As an example, the maximum value may be derived in units of transform blocks.

For example, the maximum value may be set to an arbitrary value. When the size of the current sub-block is a 4×4 size, the maximum value may be derived as one of 0 to 64. When the size of the current sub-block is a 2×2 size, the maximum value may be derived as one of 0 to 16. For example, the maximum value may be set to 4.

Alternatively, for example, the maximum value may be derived based on the size of the current block (or the current sub-block in the current block). When the size of the current block (or the current sub-block in the current block) is 4×4, the derived maximum value may be derived as one of 0 to 64, and when the size of the current block (or the current sub-block in the current block) is a 2×2 size, the derived maximum value may be derived as one of 0 to 16.

Alternatively, for example, the maximum value may be derived based on the size of the current block and a position of the current sub-block.

Also, for example, the maximum value may be derived based on position information indicating a position of the last non-zero transform coefficient of the current block. For example, the position of the last non-zero transform coefficient may be derived based on the position information, and a length from the position of a start transform coefficient in the scanning order of the current block to the position of the last non-zero transform coefficient may be derived. The maximum value may be derived based on the length. For example, the maximum value may be derived as a value obtained by multiplying the length by 1.75. Meanwhile, here, the length may correspond to the number of samples of the current block. That is, the length may be the number of samples of the current block. For example, when a transform coefficient having a value of 0 is not included in the arrangement of the transform coefficients of the current block, the length may be the number of samples of the current block. In other words, the maximum value may be derived based on the number of samples of the current block. For example, the maximum value may be derived as a value obtained by multiplying the number of samples of the current block by 1.75.

The decoding apparatus decodes the context syntax elements for the current sub-block included in the residual information based on the specific number (S1920). The decoding apparatus may decode the context syntax elements based on the context based on the maximum value.

For example, the decoding apparatus may decode the context syntax elements of the transform coefficient for the current sub-block of the current block based on the context. The context syntax elements may include a significant coefficient flag indicating whether the transform coefficient is a non-zero transform coefficient, a parity level flag for parity of a transform coefficient level for the transform coefficient, and a first transform coefficient level flag for whether the transform coefficient is greater than a first threshold, and a second transform coefficient level flag for whether the transform coefficient level of the transform coefficient is greater than a second threshold. Here, the significant coefficient flag may be sig_coeff_flag, the parity level flag may be par_level_flag, the first transform coefficient level flag may be abs_level_gt1_flag, and the second transform coefficient level flag may be abs_level_gt3_flag or abs_level_gtx_flag.

Or, for example, the context syntax elements may include a significant coefficient flag indicating whether the transform coefficient is a non-zero transform coefficient, a sign flag indicating a sign of the transform coefficient, a first transform coefficient level flag indicating whether the transform coefficient level is greater than the first threshold, and a parity level flag for parity of the transform coefficient level with respect to the transform coefficient. Here, the significant coefficient flag may be sig_coeff_flag, the sine flag may be coeff_sign_flag, the first transform coefficient level flag may be abs_level_gt1_flag, and the parity level flag may be par_level_flag.

Specifically, when the sum of the number of context-coded bins of context syntax elements for transform coefficients in an order preceding the transform coefficient in a scanning order among transform coefficients for the current sub-block reaches the maximum value (i.e., greater than or equal to the maximum value), signaling and decoding of context syntax elements for the transform coefficient may be omitted (i.e., context syntax elements for the transform coefficient may not be signaled) and a bypass syntax element coded based on a bypass for the transform coefficient may be decoded, and the value of the transform coefficient may be derived based on the decoded bypass syntax element.

For example, when the number of context-coded bins for context syntax elements of transform coefficients derived before a specific transform coefficient of the current sub-block reaches the specific number, the bypass syntax element for the specific transform coefficient included in the residual information may be decoded. Signaling and decoding of the context syntax elements for the specific transform coefficient may be omitted. The value of the specific transform coefficient may be derived based on the bypass syntax element.

For example, when the sum of the number of context-coded bins for context syntax elements of the #0 transform coefficient to #n transform coefficient of the current sub-block reaches the maximum value, signaling and decoding of context syntax elements for #n+1 transform coefficient n+1 of the current sub-block may be omitted and a bypass syntax element for #n+1 transform coefficient included in the residual information may be decoded.

That is, for example, when the sum of the number of context-coded bins of the significant coefficient flags, first transform coefficient level flags, parity level flags, and second transform coefficient level flags for #0 transform coefficient to #n transform coefficient determined by the scanning order among the transform coefficients for the current sub-block reaches the maximum value (i.e., greater than or equal to the maximum value), signaling and decoding of the significant coefficient flag for the #n+1 transform coefficient determined by the scanning order; the first transform coefficient level flag, the parity level flag, and the second transform coefficient level flag may be omitted, the bypass-based coded bypass syntax element for the #n+1 quantized transform coefficient may be decoded, and the value of the #n+1 quantized transform coefficient may be derived based on the value of the bypass syntax element.

Alternatively, for example, when the sum of the context-coded bins of the significant coefficient flags, sign flags, first transform coefficient level flags, and parity level flags for #0 transform coefficient to #n transform coefficient determined by the scanning order among the transform coefficients for the current sub-block reaches the maximum value (i.e., greater than or equal to the maximum value), signaling and decoding of the significant coefficient flag, the sine flag, and the first transform coefficient level flag, and the parity level flag for the #n+1 transform coefficient determined by the scanning order may be omitted, the bypass-based coded bypass syntax element for the #n+1 quantized transform coefficient may be decoded, and the value of the #n+1 quantized transform coefficient may be derived based on the value of the element.

The decoding apparatus derives transform coefficients for the current sub-block based on the decoded context syntax elements (S1930).

The decoding apparatus may derive the value of the transform coefficient based on values of the entropy-decoded context syntax elements for the transform coefficient. Also, the residual information may include a sine flag indicating a sign of the transform coefficient. The decoding apparatus may derive the sign of the transform coefficient based on the sine flag. The syntax element representing the sign flag may be coeff_sign_flag. For example, the decoding apparatus may derive the transform coefficient based on the value and the sign of the transform coefficient.

The decoding apparatus derives residual samples for the current block based on the transform coefficients (S1940). For example, the decoding apparatus may derive the residual samples for the current block based on the transform coefficients. That is, the decoding apparatus may derive residual samples of the current sub-block in the current block based on the transform coefficients.

For example, when the value of the transform skip flag for the current block is 1, the decoding apparatus may derive the residual samples of the current block based on the transform coefficients. For example, when the value of the transform skip flag for the current block is 1, the decoding apparatus may dequantize the transform coefficients to derive the residual samples of the current block.

Alternatively, for example, when the value of the transform skip flag for the current block is 1, the decoding apparatus may rearrange the transform coefficients and derive the rearranged transform coefficients as residual samples of the current block. For example, the decoding apparatus may rearrange the transform coefficients through various rearrangement methods. That is, the decoding apparatus may move the transform coefficients from the derived positions to other positions through various rearrangement methods.

As an example, the decoding apparatus may rearrange the transform coefficients through a rearrangement method of rotating by 180 degrees. Specifically, for example, the decoding apparatus may rearrange the transform coefficients of the current block to positions symmetrical with respect to a center of the current block.

Alternatively, as an example, the decoding apparatus may rearrange the transform coefficients through a rearrangement method of antidiagonal mirroring. Specifically, for example, the decoding apparatus may rearrange the transform coefficients to positions symmetrical with respect to the right-upward diagonal of the current block. Here, the right-upward diagonal may represent a right-upward diagonal passing through the center of the current block.

Alternatively, as an example, the decoding apparatus may rearrange the transform coefficients through a rearrangement method of main diagonal mirroring. Specifically, for example, the decoding apparatus may rearrange the transform coefficients to positions symmetrical with respect to the top-leftward diagonal of the current block. Here, the top-leftward diagonal may indicate a top-leftward diagonal passing through the center of the current block.

Alternatively, as an example, the decoding apparatus may rearrange the transform coefficients through a rearrangement method of vertical flipping. Specifically, for example, the decoding apparatus may rearrange the transform coefficients of the current block to positions symmetrical with respect to a vertical axis of the current block. Here, the vertical axis may be a vertical line passing through the center of the current block.

Alternatively, as an example, the decoding apparatus may rearrange the transform coefficients through a rearrangement method of horizontal flipping. The decoding apparatus may rearrange the transform coefficients of the current block to positions symmetrical with respect to a horizontal axis of the current block. Here, the horizontal axis may be a horizontal line passing through the center of the current block.

Alternatively, as an example, the decoding apparatus may rearrange the transform coefficients through a method of deriving layers distinguished based on the distance from the reference sample of the current block and rearranging the layers according to a reverse raster order.

For example, the decoding apparatus may set layers for the current block based on a distance from reference samples of the current block. Here, the reference samples may include top reference samples and left reference samples of the current block. For example, when a size of the current block is N×N and an x component and a y component of a top-left sample position of the current block are 0, the left reference samples may be $p[-1][0]$ to $p[-1][2N-1]$ and the top reference samples may be $p[0][-1]$ to $p[2N-1][-1]$. When the size of the current block is N×N, the layers may include a first layer to an N-th layer. The N-th layer may be the last layer, and N may be equal to a value of a width or a height of the current block. For example, the first layer may include positions having a distance of 1 from the nearest reference sample, the second layer may include positions having a distance of 2 from the nearest reference sample, and the N-th layer may include positions having a distance of N from the nearest reference sample.

Thereafter, the decoding apparatus may scan the transform coefficients in a reverse raster order. In other words, the decoding apparatus may scan the transform coefficients of the current block in a direction from right to left and from bottom to top. Next, the decoding apparatus may rearrange the transform coefficients in the layers in a scanned order. Here, the rearrangement of the transform coefficients may be performed in order of the first layer to the N-th layer. In addition, the transform coefficients may be rearranged based on a transverse-first scan or a longitudinal-first scan in the rearranged layers.

For example, the transform coefficients may be preferentially rearranged from right to left at transverse positions of the top-left position of the rearranged layers, and when longitudinal positions of the top-left positions of the rearranged layers exist, the transform coefficients may be rearranged from top to bottom at the longitudinal positions of the top-left positions of the rearranged layers after rearrangement at the transverse positions. Alternatively, for example, the transform coefficients may be preferentially rearranged from top to bottom at longitudinal positions of the top-left positions of the rearranged layers, and when transverse positions of the top-left positions of the rearranged layers exist, the transform coefficients may be rearranged from left to right at the transverse positions of the top-left positions of the rearranged layers after rearrangement at the longitudinal positions.

Alternatively, as an example, the decoding apparatus may rearrange the transform coefficients through a method of deriving layers distinguished based on the distance from the reference sample of the current block and rearranging the layers according to a diagonal scanning order For example, the decoding apparatus may set layers for the current block based on the distance from reference samples of the current block. Here, the reference samples may include top reference samples and left reference samples of the current block. For example, when the size of the current block is N×N and an x component and a y component of the top-left sample positions of the current block are 0, the left reference samples may be p[−1][0] to p[−1][2N−1] and the top reference samples may be p[0][−1] to p[2N−1][−1]. When the size of the current block is N×N, the layers may include a first layer to an N-th layer. The N-th layer may be the last layer, and N may be equal to a value of a width or a height of the current block. For example, the first layer may include positions having a distance of 1 from the nearest reference sample, the second layer may include positions having a distance of 2 from the nearest reference sample, and the N-th layer may include positions having a distance of N from the nearest reference sample.

Thereafter, the decoding apparatus may scan the transform coefficients in a diagonal scanning order. In other words, the decoding apparatus may scan the transform coefficients of the current block in a direction from top-right to bottom-left and from bottom-right to top-left. Next, the decoding apparatus may rearrange the transform coefficients in the layers in a scanned order. Here, the rearrangement of the transform coefficients may be performed in order of the first layer to the N-th layer. In addition, the transform coefficients may be rearranged based on a transverse-first scan or a longitudinal-first scan in the rearranged layers.

For example, the transform coefficients may be preferentially rearranged from right to left at transverse positions of the top-left position of the rearranged layers, and when longitudinal positions of the top-left positions of the rearranged layers exist, the transform coefficients may be rearranged from top to bottom at the longitudinal positions of the top-left positions of the rearranged layers after rearrangement at the transverse positions. Alternatively, for example, the transform coefficients may be preferentially rearranged from top to bottom at longitudinal positions of the top-left positions of the rearranged layers, and when transverse positions of the top-left positions of the rearranged layers exist, the transform coefficients may be rearranged from left to right at the transverse positions of the top-left positions of the rearranged layers after rearrangement at the longitudinal positions.

Alternatively, for example, the decoding apparatus may set the layers for the current block based on a distance from top reference samples of the current block. For example, when the size of the current block is N×N and an x component and a y component of the top-left sample positions of the current block are 0, the top reference samples may be p[0][−1] to p[2N−1][−1]. When the size of the current block is N×N, the layers may include a first layer to an N-th layer. The N-th layer may be the last layer, and N may be equal to a value of a width or a height of the current block. For example, the first layer may include positions having a distance of 1 from the nearest reference sample, the second layer may include positions having a distance of 2 from the nearest reference sample, and the N-th layer may include positions having a distance of N from the nearest reference sample. In other words, the first layer may be a first row of the current block, the second layer may be a second row of the current block, and the N-th layer may be an N-th row of the current block.

Thereafter, the decoding apparatus may scan the transform coefficients in a diagonal scanning order. In other words, the decoding apparatus may scan the transform coefficients of the current block in a direction from top-right to bottom-left and from bottom-right to top-left. Next, the decoding apparatus may rearrange the transform coefficients in the layers in a scanned order. Here, the rearrangement of the transform coefficients may be performed in order from the first layer to the N-th layer. The rearrangement of the transform coefficients may be performed from the first layer to the N-th layer, and the transform coefficients may be rearranged from right to left at positions of the rearranged layers.

Alternatively, for example, the decoding apparatus may set layers for the current block based on a distance from left reference samples of the current block. For example, when a size of the current block is N×N and an x component and a y component of a top-left sample position of the current block are 0, the left reference samples may be p[−1][0] to p[−1][2N−1]. When the size of the current block is N×N, the layers may include a first layer to an N-th layer. The N-th layer may be the last layer, and N may be equal to a value of a width or a height of the current block. For example, the first layer may include positions having a distance of 1 from the nearest left reference sample, the second layer may include positions having a distance of 2 from the nearest left reference sample, and the N-th layer may include positions having a distance of N from the nearest reference sample. In other words, the first layer may be a first column of the current block, the second layer may be a second column of the current block, and the N-th layer may be an N-th column of the current block.

Thereafter, the decoding apparatus may scan the transform coefficients in a diagonal scanning order. In other words, the decoding apparatus may scan the transform coefficients of the current block in a direction from top-right to bottom-left and from bottom-right to top-left. Next, the decoding apparatus may rearrange the transform coefficients in the layers in a scanned order. Here, the rearrangement of the transform coefficients may be performed in order of the first layer to the N-th layer. The rearrangement of the transform coefficients may be performed in order from a first layer to an N-th layer, and the transform coefficients may be rearranged from top to bottom at positions of the rearranged layers.

Meanwhile, the decoding apparatus may determine whether to rearrange the transform coefficients based on various conditions. Alternatively, the decoding apparatus may derive a rearrangement method applied to the transform coefficients based on various conditions.

As an example, the decoding apparatus may receive the transform skip flag for the current block and determine whether to rearrange the transform coefficients based on the transform skip flag for the current block. The transform skip flag may indicate whether the transform is applied to the transform coefficients. For example, when the value of the transform skip flag is 1, it may be determined to rearrange the transform coefficients. In other words, when the value of the transform skip flag is 1, the decoding apparatus may rearrange the transform coefficients. When the value of the transform skip flag is 0, it may be determined not to rearrange the transform coefficients. In other words, when the value of the transform skip flag is 0, the decoding apparatus may derive residual samples of the current block based on the transform coefficients, without rearranging the transform coefficients.

Alternatively, as another example, whether to rearrange the transform coefficients may be determined based on the number of samples of the current block. For example, when the number of samples of the current block is smaller than a specific value, it may be determined to rearrange the transform coefficients. In other words, when the number of samples of the current block is smaller than the specific value, the decoding apparatus may rearrange the transform coefficients. When the number of samples of the current block is greater than or equal to the specific value, it may be determined not to rearrange the transform coefficients. In other words, when the number of samples of the current block is equal to or greater than the specific value, the decoding apparatus may generate and encode residual information on the current block based on the transform coefficients, without rearranging the transform coefficients. The specific value may be 64.

Alternatively, for example, when the number of samples of the current block is less than 64, the decoding apparatus may rearrange the transform coefficients through a rearrangement method of rotating the transform coefficients by 180 degrees. When the number of samples of the current block is 64 or more, the decoding apparatus may not rearrange the transform coefficients.

Alternatively, as another example, the rearrangement method for the transform coefficients may be determined based on the number of samples of the current block.

For example, when the number of samples of the current block is less than 64, the decoding apparatus may rearrange the transform coefficients through the rearrangement method of rotating the transform coefficients by 180 degrees, and when the number of samples of the current block is 64 or more, the decoding apparatus may rearrange the transform coefficients through a rearrangement method of mirroring the transform coefficients. Alternatively, as another example, for example, when the number of samples of the current block is less than 64, the decoding apparatus may rearrange the transform coefficients through one of the rearrangement methods described above, and when the number of samples of the current block is 64 or more, the decoding apparatus may not rearrange the transform coefficients.

Alternatively, as another example, whether to rearrange the residual coefficients may be determined based on a shape of the current block. For example, when the current block is a square block, it may be determined to rearrange the transform coefficients. In other words, when the current block is a square block, the decoding apparatus may rearrange the transform coefficients. When the current block is a non-square block, it may be determined not to rearrange the transform coefficients. In other words, when the current block is a non-square block, the decoding apparatus may derive residual samples of the current block based on the transform coefficients, without rearranging the transform coefficients.

Alternatively, as another example, the rearrangement method for the transform coefficients may be determined based on a shape of the current block. For example, when the current block is a square block, the decoding apparatus may rearrange the transform coefficients through the rearrangement method of mirroring, and when the current block is a non-square block, the decoding apparatus may rearrange the transform coefficients through the rearrangement method or rotating the transform coefficients by 180 degrees.

Alternatively, as another example, whether to rearrange the transform coefficients may be determined based on a ratio of a width to a height of the current block. For example, when the ratio of the width to the height of the current block is 2 or more or ½ or less (i.e., when a value obtained by dividing the width of the current block by the height is 2 or more or ½ or less), the decoding apparatus may rearrange the transform coefficients through the rearrangement method of mirroring, and when the ratio of the width to the height of the current block is less than 2 and greater than ½ (i.e., when a value obtained by dividing the width of the current block by the height is less than 2 and more than ½), the decoding apparatus may derive residual samples of the current block based on the transform coefficients, without rearranging the transform coefficients.

Alternatively, as another example, a rearrangement method for the transform coefficients may be determined based on a ratio of a width to a height of the current block. For example, when the ratio of the width to the height of the current block is 2 or more or ½ or less (i.e., when a value obtained by dividing the width of the current block by the height is 2 or more or ½ or less), the decoding apparatus may rearrange the transform coefficients by the rearrangement method of mirroring, and when the ratio of the width to the height of the current block is less than 2 and greater than ½ (i.e., when a value obtained by dividing the width of the current block by the height is less than 2 and more than ½), the decoding apparatus may rearrange the transform coefficients through the rearrangement method of rotating by 180 degrees.

Alternatively, as another example, whether to rearrange the transform coefficients may be determined based on an intra prediction mode for the current block. For example, when a prediction direction of the intra prediction mode for the current block is a horizontal direction or when the intra prediction mode for the current block is an intra prediction mode mainly predicted using a left reference sample, the decoding apparatus may rearrange the transform coefficients through a rearrangement method of vertically flipping, and in other cases, the decoding apparatus may derive residual samples of the current block based on the transform coefficients, without rearranging the transform coefficients. Alternatively, for example, when the prediction direction of the intra prediction mode for the current block is a vertical direction or when the intra prediction mode for the current block is an intra prediction mode mainly predicted using a top reference sample, the decoding apparatus may rearrange the transform coefficients through the rearrangement method of vertically flipping, and in other cases, the decoding apparatus may derive residual samples of the current block based on the transform coefficients, without rearranging the transform coefficients.

Alternatively, as another example, the rearrangement method for the transform coefficients may be determined based on the intra prediction mode for the current block. For example, when a prediction direction of the intra prediction mode for the current block is a horizontal direction or when the intra prediction mode for the current block is an intra prediction mode mainly predicted using a left reference sample, the decoding apparatus may rearrange the transform coefficients through the rearrangement method of vertical flipping, and when the prediction direction of the intra prediction mode for the current block is a vertical direction or when the intra prediction mode for the current block is an intra prediction mode mainly predicted using a top reference sample, the decoding apparatus may rearrange the transform coefficients through the rearrangement method of vertical flipping.

Alternatively, as another example, whether to rearrange the transform coefficients may be determined based on a flag indicating whether to rearrange the transform coefficients received through a high level syntax. For example, the decoding apparatus may receive a flag indicating whether to rearrange the transform coefficients through a sequence parameter set (SPS) or a picture parameter set (PPS), and determine whether the transform coefficients are rearranged based on the flag.

Alternatively, as another example, the rearrangement method for the transform coefficients may be determined based on information indicating the rearrangement method for the transform coefficients received through a high level syntax. For example, the decoding apparatus may signal information indicating a rearrangement method for the transform coefficients through a sequence parameter set (SPS) or a picture parameter set (PPS) and determine whether the transform coefficients are rearranged based on the information.

Alternatively, as another example, whether to rearrange the transform coefficients may be determined based on the prediction mode of the current block. For example, when the prediction mode of the current block is intra prediction, it may be determined to rearrange the transform coefficients. In other words, when the prediction mode of the current block is intra prediction, the decoding apparatus may rearrange the transform coefficients. Also, when the prediction mode of the current block is inter prediction, it may be determined not to rearrange the transform coefficients. In other words, when the prediction mode of the current block is inter prediction, the decoding apparatus may derive residual samples of the current block based on the transform coefficients, without rearranging the transform coefficients.

Alternatively, as another example, whether to rearrange the transform coefficients may be determined based on whether the transform coefficients are quantized. For example, when quantization is applied to the transform coefficients, it may be determined to rearrange the transform coefficients. In other words, when quantization is applied to the transform coefficients, the decoding apparatus may rearrange the transform coefficients. Also, when quantization is not applied to the transform coefficients, it may be determined not to rearrange the transform coefficients. In other words, when quantization is not applied to the transform coefficients, the decoding apparatus may derive residual samples of the current block based on the transform coefficients, without rearranging the transform coefficients.

Alternatively, for example, when the value of the transform skip flag for the current block is 0, the decoding apparatus may inverse transform the transform coefficients to derive the residual samples of the current block. Or, for example, when the value of the transform skip flag for the current block is 0, the decoding apparatus may dequantize the transform coefficients and inverse-transform the dequantized coefficients to derive the residual samples of the current block.

The decoding apparatus generates a reconstructed picture based on the residual samples (S1950). For example, the decoding apparatus may derive a prediction sample by performing an inter prediction mode or an intra prediction mode on the current block based on the prediction information received through a bitstream, and may generate the reconstructed picture by adding the prediction sample and the residual sample. For example, the prediction information may include information indicating an intra prediction mode of the current block. Alternatively, the prediction information may include motion related information for the current block.

Thereafter, an in-loop filtering procedure such as deblocking filtering, SAO and/or ALF procedures may be applied to the reconstructed picture as necessary in order to improve subjective/objective picture quality as described above.

Figure 20:
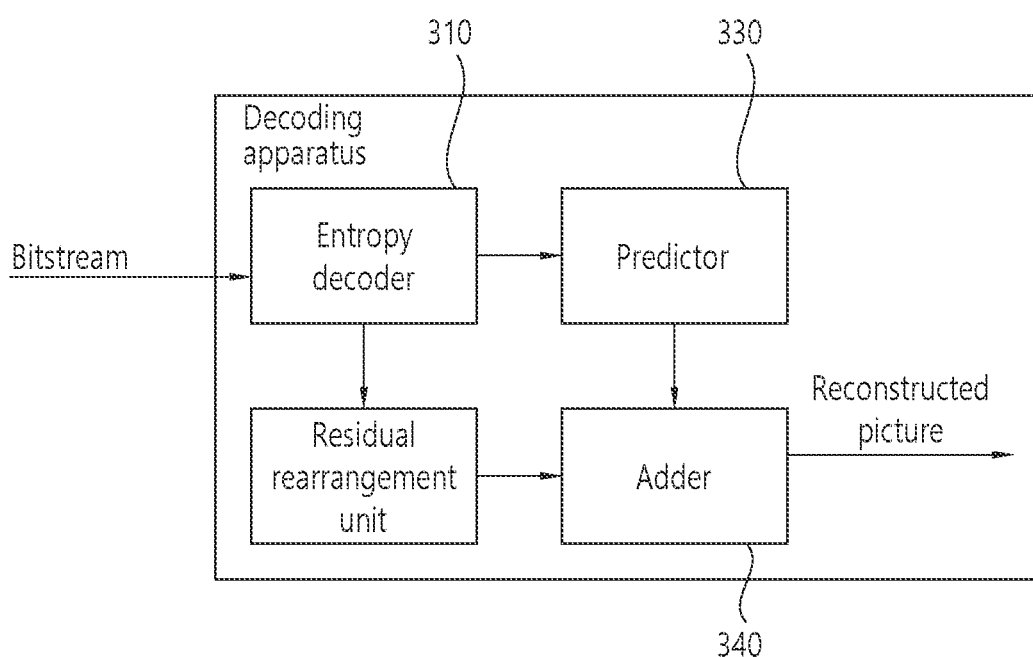
FIG. 20 schematically shows a decoding apparatus for performing an image decoding method according to this document.

FIG. 20 schematically shows a decoding apparatus for performing an image decoding method according to this document. The method disclosed in FIG. 19 may be performed by the decoding apparatus disclosed in FIG. 20. Specifically, for example, the entropy decoder of the decoding apparatus of FIG. 20 may perform S1900 to S1930 of FIG. 19, and the dequantizer and inverse transformer of the decoding apparatus of FIG. 20 may perform S1940 of FIG. 19, the adder of the decoding apparatus of FIG. 20 may perform S1950 of FIG. 19. Also, although not shown, the process of obtaining prediction information of the current block through the bitstream may be performed by the entropy decoder of the decoding apparatus of FIG. 20, and the process of deriving the prediction sample for the current block based on the prediction information may be performed by the predictor of the decoding apparatus of FIG. 20.

According to this document described above, efficiency of residual coding may be improved.

In addition, according to this document, context-based coded data may be reduced by limiting the sum of the number of context-coded bins of context syntax elements for the transform coefficients in the current block included in the residual information to a predetermined maximum value or less.

In addition, according to this document, in adjusting the number of context-coded bins for the current sub-block, it is determined as the sum of the number of context-coded bins of the context syntax elements without determining for each context syntax element coding, whereby residual coding complexity may be reduced and overall coding efficiency may be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 21:
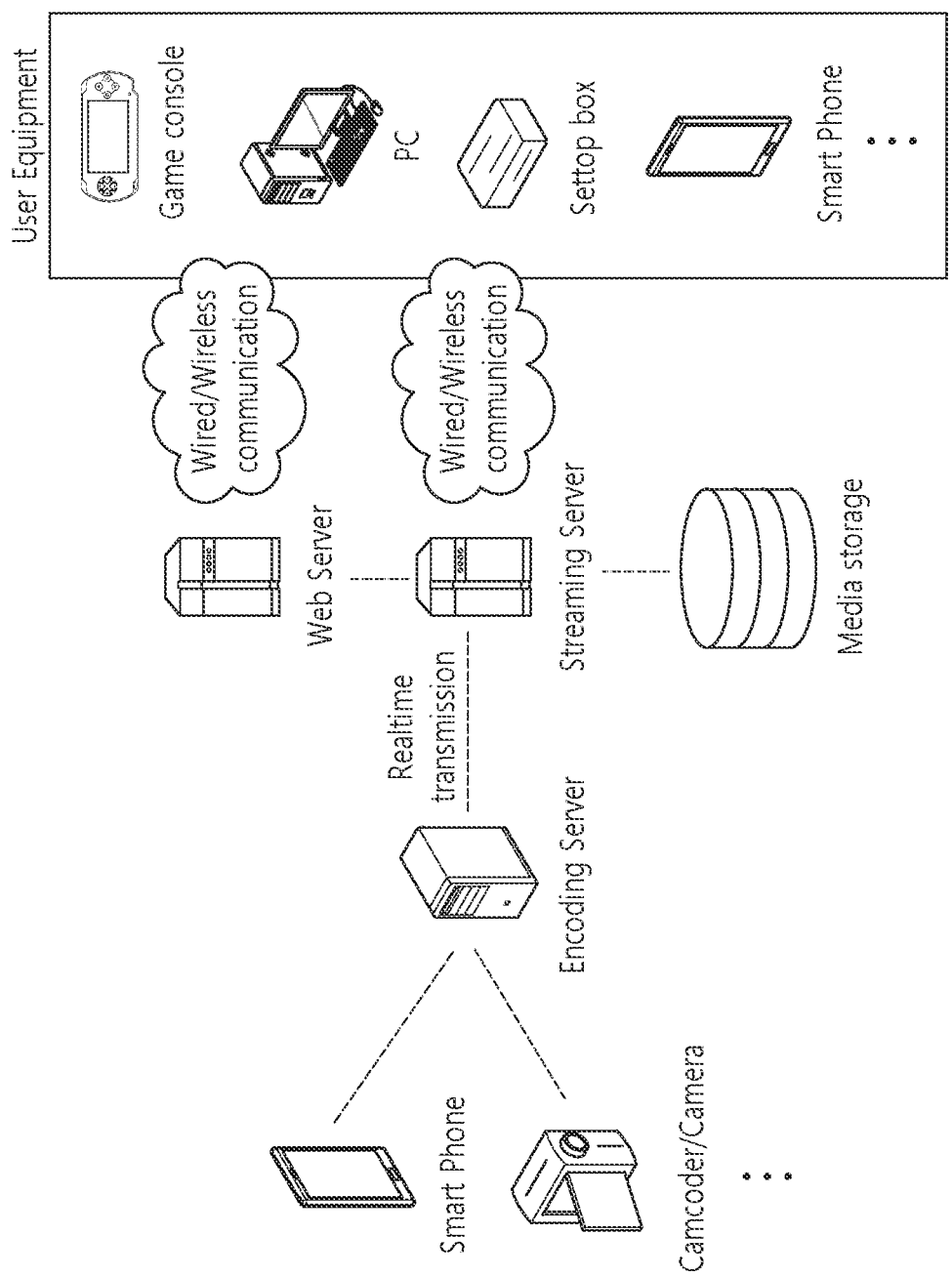
FIG. 21 illustrates a structural diagram of a contents streaming system to which the present disclosure is applied.

FIG. 21 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

What is claimed is:
1. An image decoding method performed by a decoding apparatus, comprising:
    obtaining a transform skip flag of a current block from a bitstream;
    obtaining residual information of the current block from the bitstream based on the transform skip flag, wherein the residual information is residual information on transform skip;
    deriving a specific number of context-coded bins for context syntax elements for a current sub-block of the current block;
    decoding the context syntax elements for the current sub-block included in the residual information based on the specific number;
    deriving transform coefficients for the current sub-block based on the decoded context syntax elements;
    deriving residual samples for the current block based on the transform coefficients; and
    generating a reconstructed picture based on the residual samples,
        wherein when a number of context coded bins for context syntax elements of transform coefficients derived before a specific transform coefficient of the current sub-block reaches the specific number, a bypass syntax element for the specific transform coefficient included in the residual information is decoded.

2. The image decoding method of claim 1, wherein the context syntax elements for the specific transform coefficient include a significant coefficient flag indicating whether the specific transform coefficient is a non-zero transform coefficient, a sign flag indicating a sign of the specific transform coefficient, a first transform coefficient level flag for whether a transform coefficient level for the specific transform coefficient is greater than a first threshold, a parity level flag for parity of the transform coefficient level and a second transform coefficient level flag for whether the transform coefficient level is greater than a second threshold, wherein decoding of the context syntax elements for the specific transform coefficient is omitted, and wherein the bypass syntax element for the specific transform coefficient is decoded regardless of the second transform coefficient level flag.

3. The image decoding method of claim 1, wherein the context syntax elements include a significant coefficient flag indicating whether a transform coefficient is a non-zero transform coefficient, a parity level flag for a parity of a transform coefficient level for the transform coefficient, a first transform coefficient level flag for whether the transform coefficient level is greater than a first threshold, and a second transform coefficient level flag for whether the transform coefficient level of the transform coefficient is greater than a second threshold.

4. The image decoding method of claim 1, wherein the context syntax elements include a significant coefficient flag indicating whether a transform coefficient is a non-zero transform coefficient, a sign flag indicating a sign of the transform coefficient, a first transform coefficient level flag for whether a transform coefficient level for the transform coefficient is greater than a first threshold, and a parity level flag for a parity of the transform coefficient level.

5. The image decoding method of claim 1, wherein the specific number is set based on a size of the current block.

6. The image decoding method of claim 1, wherein a value of the specific transform coefficient is derived based on only a value of the decoded bypass syntax element.

7. The image decoding method of claim 1, wherein the deriving the residual samples for the current block based on the transform coefficients comprises:
rearranging the transform coefficients when a value of the transform skip flag is 1; and
deriving the residual samples based on the rearranged transform coefficients.

8. The image decoding method of claim 7, wherein the rearranging the transform coefficients comprises:
rearranging the transform coefficients of the current block to positions symmetrical based on a vertical axis of the current block.

9. The image decoding method of claim 7, wherein the rearranging the transform coefficients comprises:
rearranging the transform coefficients of the current block to positions symmetrical based on a horizontal axis of the current block.

10. The image decoding method of claim 7, wherein the rearranging the transform coefficients comprises:
setting layers for the current block based on a distance to reference samples of the current block;
scanning the transform coefficients in a diagonal scanning order; and
rearranging the transform coefficients in the layers in the scanned order,
wherein the reference samples include top reference samples and left reference samples of the current block.

11. An image encoding method performed by an encoding apparatus, comprising:
deriving residual samples for a current block;
deriving a transform skip flag for whether transform is applied to the current block;
deriving transform coefficients in a current sub-block of the current block based on the residual samples and the transform skip flag;
deriving a specific number of context-coded bins for context syntax elements for the current sub-block;
encoding the context syntax elements based on the specific number; and
generating a bitstream including the transform skip flag and residual information for the current block including the encoded context syntax elements, wherein the residual information is residual information on transform skip,
wherein when a number of context coded bins for context syntax elements of transform coefficients derived before a specific transform coefficient of the current sub-block reaches the specific number, a bypass syntax element for the specific transform coefficient included in the residual information is encoded.

12. The image encoding method of claim 11, wherein the context syntax elements include a significant coefficient flag indicating whether a transform coefficient is a non-zero transform coefficient, a parity level flag for a parity of a transform coefficient level for the transform coefficient, a first transform coefficient level flag regarding whether the transform coefficient level is greater than a first threshold, and a second transform coefficient level flag regarding whether the transform coefficient level of the transform coefficient is greater than a second threshold.

13. The image encoding method of claim 11,
wherein context syntax elements for the specific transform coefficient include a significant coefficient flag indicating whether the specific transform coefficient is a non-zero transform coefficient, a sign flag indicating a sign of the specific transform coefficient, a first transform coefficient level flag for whether a transform coefficient level for the specific transform coefficient is greater than a first threshold, a parity level flag for parity of the transform coefficient level and a second transform coefficient level flag for whether the transform coefficient level is greater than a second threshold,
wherein encoding of the context syntax elements for the specific transform coefficient is omitted, and
wherein the bypass syntax element for the specific transform coefficient is encoded regardless of the second transform coefficient level flag.

14. The image encoding method of claim 11, wherein the specific number is set based on a size of the current block.

15. A non-transitory computer-readable storage medium storing a video data generated by a method, the method comprising:
deriving residual samples for a current block;
deriving a transform skip flag for whether transform is applied to the current block;
deriving transform coefficients in a current sub-block of the current block based on the residual samples and the transform skip flag;

deriving a specific number of context-coded bins for context syntax elements for the current sub-block;

encoding the context syntax elements based on the specific number; and generating the video data including the transform skip flag and residual information for the current block including the encoded context syntax elements, wherein the residual information is residual information on transform skip, wherein when a number of context coded bins for context syntax elements of transform coefficients derived before a specific transform coefficient of the current sub-block reaches the specific number, a bypass syntax element for the specific transform coefficient included in the residual information is encoded.

* * * * *